(12) United States Patent
Jeong et al.

(10) Patent No.: US 12,299,246 B2
(45) Date of Patent: *May 13, 2025

(54) ELECTRONIC APPARATUS

(71) Applicant: SAMSUNG DISPLAY CO., LTD., Yongin-si (KR)

(72) Inventors: Joo-Hyeon Jeong, Suwon-si (KR); Taejoon Kim, Seongnam-si (KR); Hyun-Wook Cho, Seongnam-si (KR); Jaewoo Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,708

(22) Filed: Dec. 11, 2023

(65) Prior Publication Data

US 2024/0126396 A1 Apr. 18, 2024

Related U.S. Application Data

(63) Continuation of application No. 18/062,003, filed on Dec. 5, 2022, now Pat. No. 11,842,021, which is a (Continued)

(30) Foreign Application Priority Data

Nov. 23, 2018 (KR) .......................... 10-2018-0146521

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0443* (2019.05)

(58) Field of Classification Search
None
See application file for complete search history.

(56) References Cited

U.S. PATENT DOCUMENTS 8,633,915 B2 1/2014 Hotelling et al.
11,853,520 B2 * 12/2023 Seo ........................ G06F 3/0443
(Continued)

FOREIGN PATENT DOCUMENTS

CN 108132732 A 6/2018
KR 10-1517458 B1 5/2015
(Continued)

OTHER PUBLICATIONS

EPO Partial Search Report dated Apr. 17, 2020, for European Patent Application No. 19208669.2 (9 pages).
(Continued)

*Primary Examiner* — Fred Tzeng
(74) *Attorney, Agent, or Firm* — Womble Bond Dickinson (US) LLP

(57) ABSTRACT

An electronic apparatus includes an electronic panel including a plurality of sensing groups spaced apart from each other, and an electronic module overlapping with the electronic panel in a plan view. Each of the sensing groups includes a first sensing electrode extending in a second direction, and second sensing electrodes spaced apart from each other in the second direction, located on the same layer as the first sensing electrode, and face the first sensing electrode in a first direction. An opening overlapping with the electronic module and penetrating a first sensing group of the sensing groups is defined in the electronic panel, and at least one selected from the first sensing electrode and the second sensing electrodes of the first sensing group extends along an edge of the opening.

20 Claims, 32 Drawing Sheets

Related U.S. Application Data continuation of application No. 16/667,785, filed on Oct. 29, 2019, now Pat. No. 11,520,449.

(56) References Cited

U.S. PATENT DOCUMENTS

| | | |
|---|---|---|
| 2015/0091859 A1 | 4/2015 | Rosenberg et al. |
| 2015/0160758 A1 | 6/2015 | Chen |
| 2016/0216838 A1 | 7/2016 | Aina et al. |
| 2016/0291780 A1 | 10/2016 | Namkung |
| 2017/0162637 A1 | 6/2017 | Choi et al. |
| 2017/0185224 A1 | 6/2017 | Nagata et al. |
| 2017/0287992 A1 | 10/2017 | Kwak et al. |
| 2017/0293378 A1 | 10/2017 | Ahn et al. |
| 2018/0032196 A1 | 2/2018 | Lin et al. |
| 2018/0081219 A1 | 3/2018 | Kim |
| 2018/0107330 A1 | 4/2018 | Meng |
| 2018/0173349 A1 | 6/2018 | Cho et al. |
| 2018/0190734 A1 | 7/2018 | Kang et al. |
| 2018/0196564 A1 | 7/2018 | Lin et al. |
| 2018/0315357 A1 | 11/2018 | Nam et al. |
| 2019/0018257 A1 | 1/2019 | Namkung |
| 2019/0079622 A1 | 3/2019 | Choi et al. |
| 2019/0235265 A1 | 8/2019 | Namkung |
| 2019/0339816 A1 | 11/2019 | Hsu et al. |
| 2020/0159369 A1 | 5/2020 | Seo et al. |
| 2020/0167041 A1 | 5/2020 | Jeong et al. |
| 2021/0026498 A1 | 1/2021 | Moy et al. |
| 2021/0132740 A1 | 5/2021 | Seo et al. |
| 2022/0005878 A1* | 1/2022 | Lee ............... G06F 3/0412 |
| 2023/0091647 A1 | 3/2023 | Park et al. |
| 2023/0100476 A1* | 3/2023 | Jeong ............ G06F 3/0448 |
| | | 345/174 |
| 2023/0292572 A1* | 9/2023 | Lee ................ H10K 59/131 |
| 2024/0126396 A1* | 4/2024 | Jeong ............ G06F 1/1684 |
| 2024/0134489 A1* | 4/2024 | Seo ................. G06F 1/16 |
| 2024/0173949 A1* | 5/2024 | Takahashi ............ B32B 7/06 |

FOREIGN PATENT DOCUMENTS

| | | |
|---|---|---|
| KR | 10-2016-0095594 A | 8/2016 |
| KR | 10-2017-0111827 A | 10/2017 |
| KR | 20180082976 A | 7/2018 |

OTHER PUBLICATIONS

US Office Action dated Nov. 1, 2021, issued in U.S. Appl. No. 17/140,993 (16 pages).

US Office Action dated Feb. 6, 2023, issued in U.S. Appl. No. 17/751,515 (8 pages).

US Notice of Allowance dated Apr. 19, 2023, issued in U.S. Appl. No. 17/751,515 (8 pages).

US Office Action dated Oct. 18, 2024, issued in U.S. Appl. No. 18/395,425 (11 pages).

* cited by examiner

ELECTRONIC APPARATUS

CROSS-REFERENCE TO RELATED APPLICATIONS

This application is a continuation of U.S. patent application Ser. No. 18/062,003, filed Dec. 5, 2022, which is a continuation of U.S. patent application Ser. No. 16/667,785, filed Oct. 29, 2019, now U.S. Pat. No. 11,520,449, which claims priority to and the benefit of Korean Patent Application No. 10-2018-0146521, filed Nov. 23, 2018, the entire content of all of which is incorporated herein by reference.

BACKGROUND

1. Field

The present disclosure herein relates to an electronic apparatus, and more particularly, to an electronic apparatus having a through opening and capable of sensing an external input.

2. Description of the Related Art

An electronic apparatus is activated by an electrical signal. The electronic apparatus may include various electronic components such as a display unit for displaying an image and/or a sensing unit for sensing an external input. The electronic components may be electrically connected to each other through signal lines variously arranged.

The display unit may include a light emitting element for generating an image. The sensing unit may include sensing electrodes for sensing an external input. The sensing electrodes may be disposed in an active area. The sensing unit may be designed to provide uniform sensitivity in the whole active area (e.g., in the entire active area).

SUMMARY

An aspect according to embodiments of the present disclosure is directed toward an electronic apparatus capable of providing uniform sensitivity to an external input in an entire active area.

In an embodiment of the present disclosure, an electronic apparatus includes an electronic panel including a plurality of sensing groups spaced apart from each other and arranged in a first direction and a second direction crossing the first direction, and sensing lines connected to the plurality of sensing groups and including a first sensing line and second sensing lines different from the first sensing line, and an electronic module overlapping with the electronic panel when viewed in a plan view. Each of the plurality of sensing groups includes a first sensing electrode extending in the second direction and connected to the first sensing line, and second sensing electrodes spaced apart from each other in the second direction, on the same layer as the first sensing electrode, facing the first sensing electrode in the first direction, and respectively connected to the second sensing lines. The electronic panel has an opening overlapping with the electronic module, the opening being defined to penetrate a first sensing group of the plurality of sensing groups, and at least one selected from the first sensing electrode and the second sensing electrodes of the first sensing group extends along an edge of the opening.

In an embodiment, the at least one selected from the first sensing electrode and the second sensing electrodes of the first sensing group may include a main pattern spaced apart from the opening, and an opening pattern between the main pattern and the opening, extending along the edge of the opening, and having a different shape from a shape of the main pattern. The opening pattern and the main pattern may be configured to receive substantially the same electrical signal.

In an embodiment, the opening pattern may have a closed loop shape surrounding the opening when viewed in a plan view.

In an embodiment, the opening pattern may have a polygonal shape extending along a portion of the edge of the opening and having at least one curved side when viewed in a plan view.

In an embodiment, the second sensing electrodes of the first sensing group may include a first electrode connected to a first one of the second sensing lines, a second electrode connected to a second one of the second sensing lines and spaced apart from the first electrode in the second direction with the opening interposed therebetween, and a third electrode between the first electrode and the second electrode, extending along the edge of the opening, and having a different shape from shapes of the first and second electrodes.

In an embodiment, the third electrode may be connected to one selected from the first electrode and the second electrode.

In an embodiment, the third electrode may include a first pattern connected to the first electrode, and a second pattern connected to the second electrode. The first pattern may be connected to the first electrode through a first connection pattern, and the second pattern may be connected to the second electrode through a second connection pattern.

In an embodiment, the third electrode may have a closed loop shape surrounding the opening when viewed in a plan view.

In an embodiment, the third electrode may be connected to a third one of the second sensing lines different from the first one and the second one of the second sensing lines.

In an embodiment, the main pattern and the opening pattern may be on the same layer.

In an embodiment, the opening may penetrate the first sensing group and a second sensing group adjacent to the first sensing group in the first direction, and one of the second sensing electrodes of the first sensing group and a portion of the first sensing electrode of the second sensing group may both extend along the edge of the opening.

In an embodiment, the one of the second sensing electrodes of the first sensing group may include a first opening pattern facing the opening, and the first sensing electrode of the second sensing group may include a second opening pattern facing the opening. The first opening pattern and the second opening pattern may be spaced apart from each other with the opening interposed therebetween.

In an embodiment, the opening may penetrate the first sensing group and a second sensing group adjacent to the first sensing group in the second direction, and a portion of the first sensing electrode of the first sensing group and a portion of the first sensing electrode of the second sensing group may extend along the edge of the opening.

In an embodiment of the present disclosure, an electronic apparatus includes an electronic panel including a plurality of sensing groups spaced apart from each other and arranged in a first direction and a second direction crossing the first direction, and an electronic module overlapping with the electronic panel when viewed in a plan view. Each of the plurality of sensing groups includes a first sensing electrode extending in the second direction, and a plurality of second sensing electrodes spaced apart from each other in the second direction. Each of the second sensing electrodes faces the first sensing electrode in the first direction. The electronic panel has an opening overlapping with the electronic module and a line area surrounding the opening, the opening being defined to penetrate a first sensing group of the sensing groups. At least one selected from the first sensing electrode and the second sensing electrodes of the first sensing group includes a main pattern spaced apart from the opening and extending in the second direction, and an opening pattern in the line area, extending along an edge of the opening, and having a different shape from a shape of the main pattern.

In an embodiment, the opening pattern may be electrically connected to the main pattern.

In an embodiment, the opening pattern may include a plurality of opening patterns connected to each other, and the plurality of opening patterns may be configured to transmit and/or receive a different electrical signal from an electrical signal of the main pattern.

In an embodiment, the plurality of opening patterns may face each other with the opening interposed therebetween.

In an embodiment, the main pattern and the opening pattern may be optically transparent.

In an embodiment, the opening may penetrate the first sensing group and a second sensing group adjacent to the first sensing group in the second direction. The opening pattern may include a first opening pattern in the first sensing electrode of the first sensing group, and a second opening pattern in the first sensing electrode of the second sensing group.

In an embodiment, the opening pattern may further include a third opening pattern connected to at least one of the second sensing electrodes of the first sensing group, and a fourth opening pattern connected to at least one of the second sensing electrodes of the second sensing group.

In an embodiment, the opening may penetrate the first sensing group and a second sensing group adjacent to the first sensing group in the first direction. The opening pattern may include a first opening pattern in one of the second sensing electrodes of the first sensing group, and a second opening pattern in the first sensing electrode of the second sensing group.

In an embodiment, the electronic apparatus may further include a light blocking layer in the line area.

In an embodiment, the opening pattern may have an arc shape extending along a portion of the edge of the opening.

In an embodiment, the opening pattern may have a closed loop shape surrounding the opening when viewed in a plan view.

In an embodiment of the present disclosure, an electronic apparatus includes an electronic panel including a plurality of pixels configured to display an image and a plurality of sensing groups configured to sense an external input, and an electronic module overlapping with the electronic panel when viewed in a plan view. The sensing groups are spaced apart from each other and are arranged in a first direction and a second direction crossing the first direction. The electronic panel includes a first area in which the image is displayed and the pixels are located, and a second area adjacent to the first area and having a light transmittance higher than that of the first area. Each of the plurality of sensing groups includes a first sensing electrode extending in the second direction, and a plurality of second sensing electrodes spaced apart from each other in the second direction. Each of the second sensing electrodes faces the first sensing electrode in the first direction. The second area overlaps with a first sensing group of the plurality of sensing groups. At least one selected from the first sensing electrode and the second sensing electrodes of the first sensing group includes a main pattern spaced apart from the second area when viewed in a plan view, and an opening pattern between the main pattern and the second area, extending along an edge of the second area, and having a different shape from a shape of the main pattern, the opening pattern is to receive the same electrical signal as the main pattern.

In an embodiment, the second area has an opening penetrating the electronic panel, and the electronic module may overlap with the opening when viewed in a plan view.

In an embodiment, the electronic panel may include at least one non-light emitting pixel in the second area, and a structure of the non-light emitting pixel may correspond to a structure of the plurality of pixels and with at least one component of the plurality of pixels removed.

In an embodiment, each of the pixels may include a thin film transistor and a light emitting element connected to the thin film transistor. The thin film transistor and/or the light emitting element may not be in the second area.

In an embodiment, the plurality of pixels may not overlap with the second area when viewed in a plan view.

In an embodiment, the main pattern and the opening pattern may be on the same layer.

In an embodiment, the main pattern and the opening pattern may be optically transparent.

In an embodiment, a planar shape of the edge of the second area may have a circular shape, an elliptical shape, a polygonal shape, or a polygonal shape and of which at least one side is curved.

In an embodiment, the opening pattern may have a closed loop shape surrounding the edge of the second area.

In an embodiment, the opening pattern may have a polygonal shape extending along a portion of the edge of the second area and including a curved side.

In an embodiment, each of the first sensing electrode and the second sensing electrode may include the main pattern and the opening pattern. The opening pattern of the first sensing electrode may extend along a portion of the edge of the second area, and the opening pattern of the second sensing electrode may extend along another portion of the edge of the second area.

BRIEF DESCRIPTION OF THE DRAWINGS

The accompanying drawings are included to provide a further understanding of the subject matter of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Figure 1A:
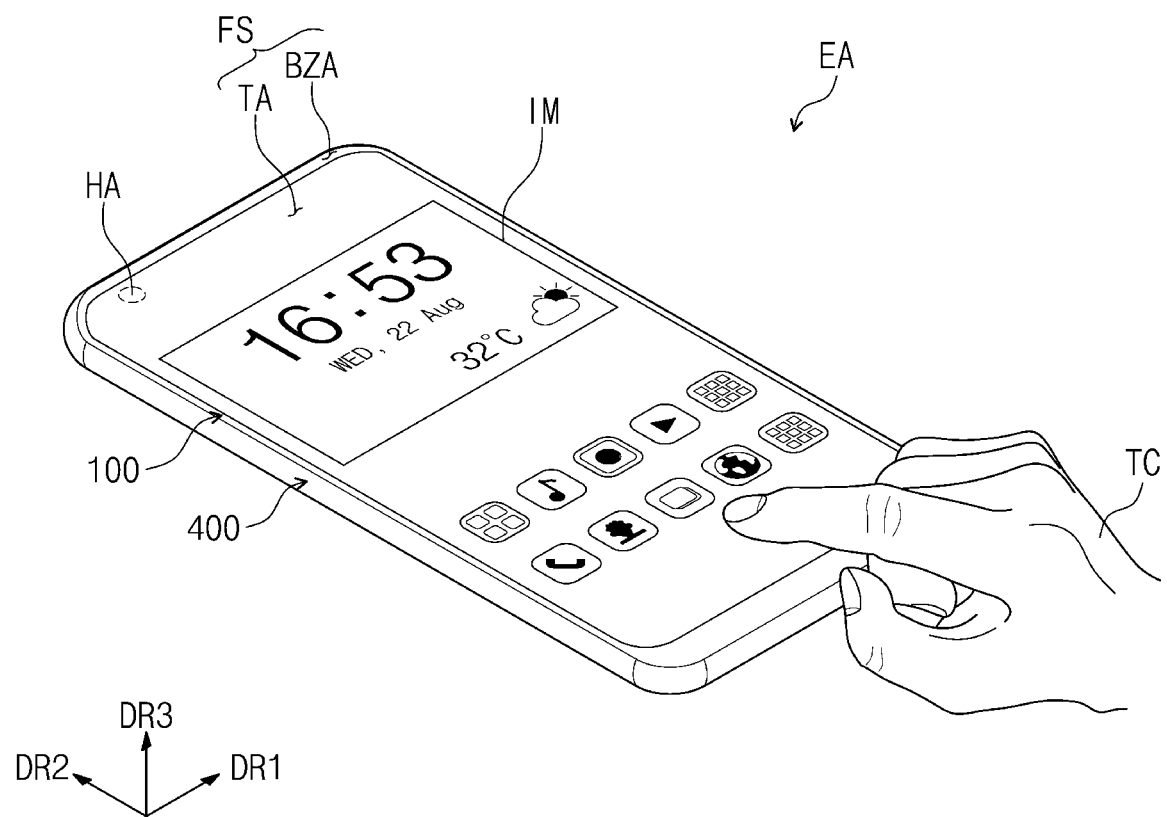
FIG. 1A is an assembled perspective view illustrating an electronic apparatus according to an embodiment of the present disclosure.

The subject matter of the present disclosure now will be described more fully hereinafter with reference to the accompanying drawings, in which various embodiments are shown. The subject matter of the present disclosure may, however, be embodied in many different forms, and should not be construed as limited to the embodiments set forth herein. Rather, these embodiments are provided so that this disclosure will be thorough and complete, and will fully convey the scopes of the present disclosure to those skilled in the art. Like reference numerals refer to like elements throughout.

It will be understood that when an element such as a layer, region or substrate is referred to as being "on" another element, it can be directly on the other element or intervening elements may be present. In contrast, the term "directly" indicates that there are no intervening elements. As used herein, the term "and/or" includes any and all combinations of one or more of the associated listed items.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises," "comprising," "includes" and/or "including," when used in this specification, specify the presence of stated features, regions, integers, steps, operations, elements, components, and/or groups, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein should be interpreted accordingly.

It will be understood that, although the terms first, second, etc., may be used herein to describe various elements, components, regions, layers and/or sections, these elements, components, regions, layers and/or sections should not be limited by these terms. These terms are only used to distinguish one element, component, region, layer or section from another elements, components, region, layer or section. Thus, a first element, component, region, layer or section discussed below could be termed a second element, component, region, layer or section without departing from the teachings herein.

The terms "about", "substantially", and "approximately" as used herein are used as terms of approximation and not as terms of degree, and are intended to be inclusive of the stated value and means within an acceptable range of deviation for the particular value as determined by one of ordinary skill in the art, considering the measurement in question and the error associated with measurement of the particular quantity (i.e., the limitations of the measurement system). Also, the term "omitted" refers to that an element or feature is not included in a device structure, an element or feature included in a device structure is not illustrated in a drawing figure, or a description of an element or feature in a device structure is not repeated in this disclosure.

Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of exemplary embodiments.

Hereinafter, exemplary embodiments of the present disclosure will be described in more detail with reference to the accompanying drawings.

Figure 1B:
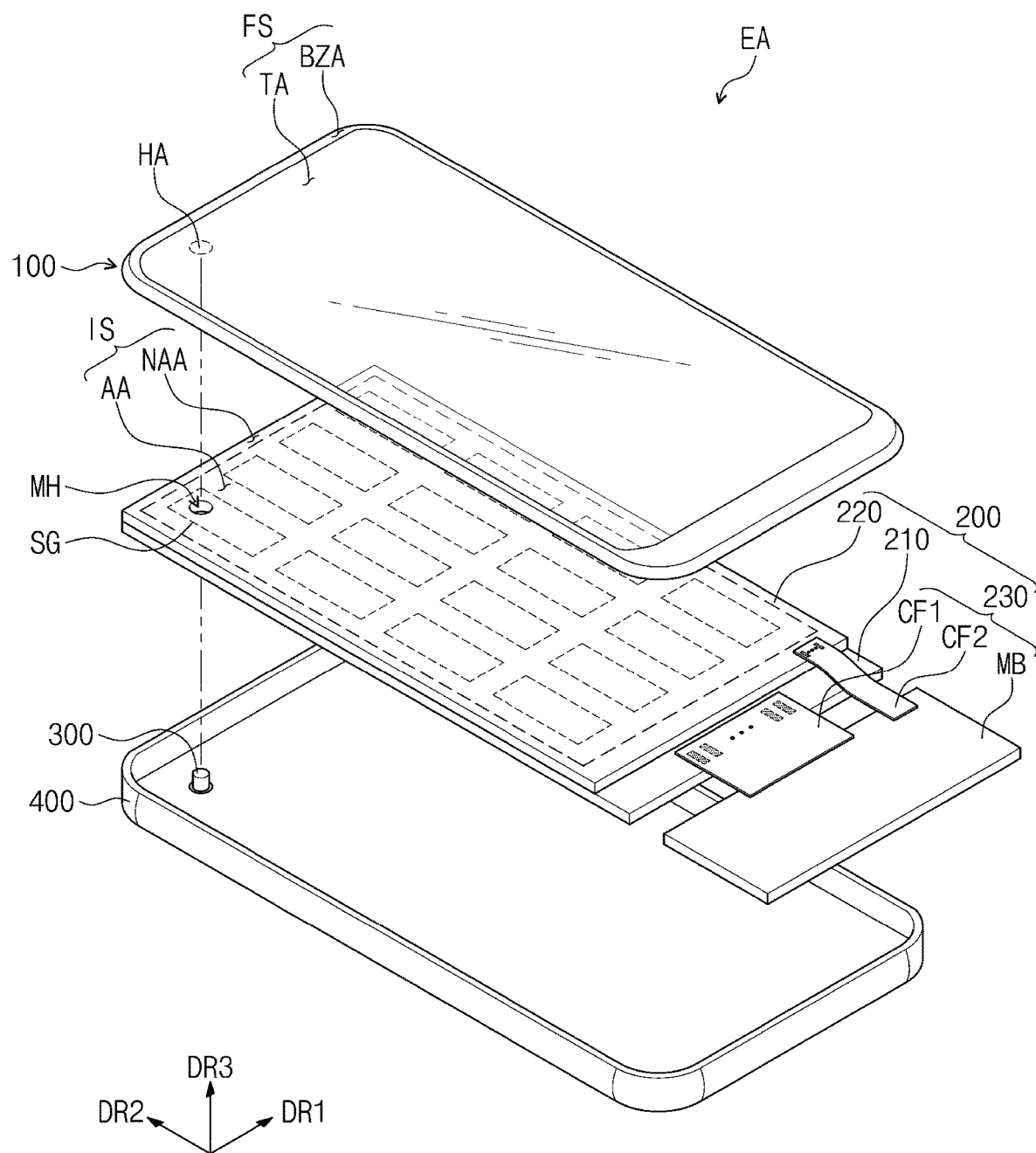
FIG. 1B is an exploded perspective view illustrating the electronic apparatus of FIG. 1A.
Figure 2:
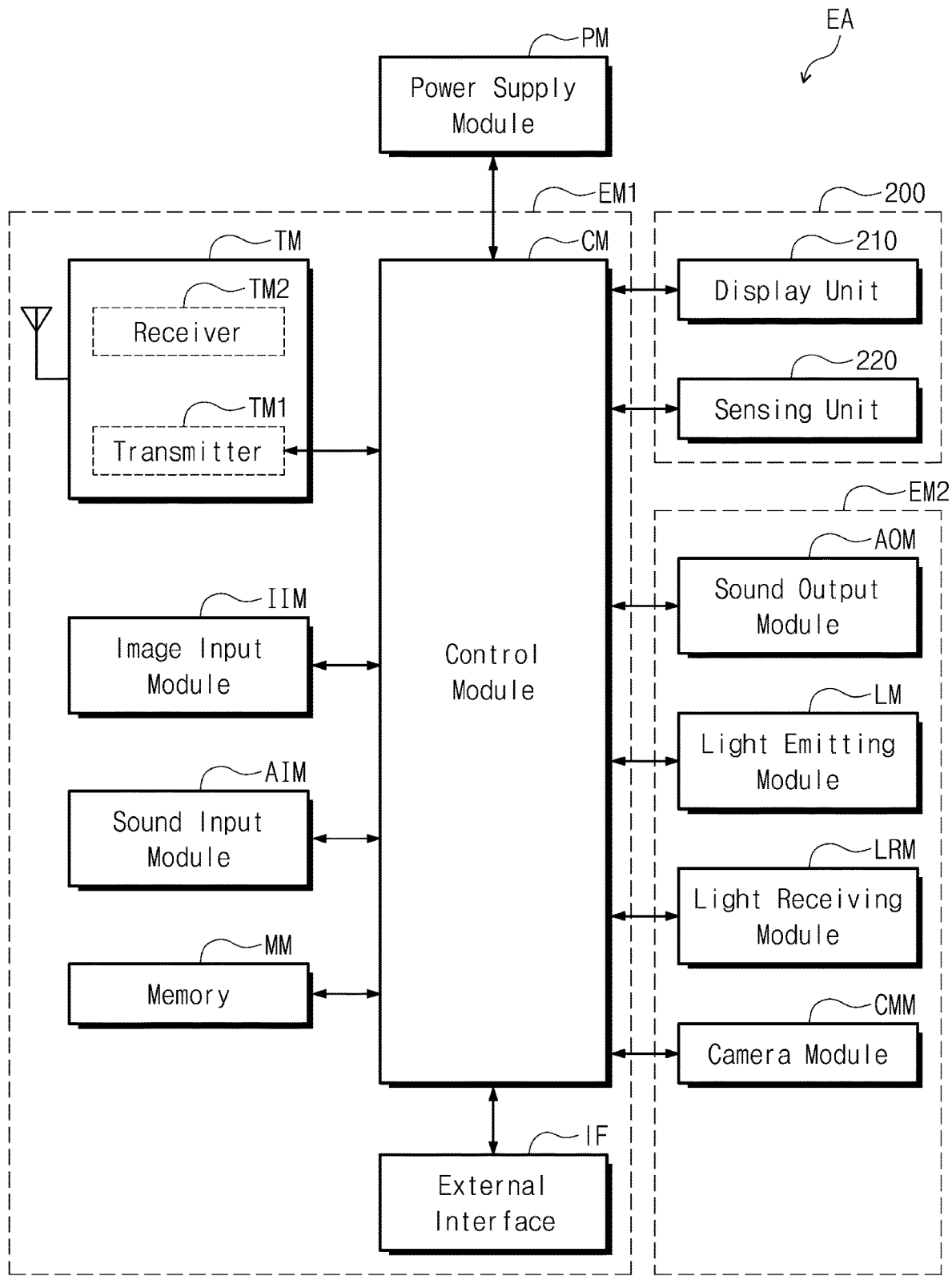
FIG. 2 is a block diagram of the electronic apparatus of FIG. 1A.

FIG. 1A is an assembled perspective view illustrating an electronic apparatus according to an embodiment of the present disclosure. FIG. 1B is an exploded perspective view illustrating the electronic apparatus of FIG. 1A. FIG. 2 is a block diagram of the electronic apparatus of FIG. 1A. Hereinafter, embodiments of the present disclosure will be described with reference to FIGS. 1A, 1B and 2.

An electronic apparatus EA may be activated by an electrical signal. The electronic apparatus EA may be realized as various embodiments. For example, the electronic apparatus EA may be (e.g., may be realized as) a tablet, a notebook computer, a personal computer, a smart television, and/or a smart phone. In the present embodiment, the smart phone is illustrated as an example of the electronic apparatus EA.

The electronic apparatus EA may display an image IM on a display surface parallel to first and second directions DR1 and DR2 in a third direction DR3. That is, the electronic apparatus EA may display an image IM on a display surface parallel to first and second directions DR1 and DR2 and crossing a third direction DR3. The display surface on which the image IM is displayed may correspond to a front surface of the electronic apparatus EA and may correspond to a front surface FS of a window 100. Hereinafter, the display surface, the front surface of the electronic apparatus EA and the front surface of the window 100 will be indicated by the same reference designator, i.e., "FS". The image IM may include a dynamic image and a static image. A clock image and a plurality of icons are illustrated as an example of the image IM in FIG. 1A.

In the present embodiment, a front surface (or a top surface) and a rear surface (or a bottom surface) of each member may be defined based on a direction (e.g., the third direction DR3) in which the image IM is displayed. The front surface and the rear surface may be opposite to each other in the third direction DR3, and a normal direction of each of the front surface and the rear surface may be parallel to the third direction DR3. However, directions indicated by the first to third directions DR1, DR2 and DR3 may be relative concepts and may be changed into other directions. Hereinafter, the first to third directions are the directions indicated by the first to third directions DR1, DR2 and DR3 illustrated in FIG. 1, respectively.

In some embodiments, the electronic apparatus EA may sense an external input TC applied from the outside. For example, the external input TC may include at least one of various kinds of external inputs such as a part (e.g., a finger) of the body of a user, light, heat, and pressure. In FIG. 1A, the hand of a user applied to the front surface is illustrated as an example of the external input TC. However, embodiments of the present disclosure are not limited thereto. In other words, the external input TC may be provided in various suitable forms, as described above. In certain embodiments, the electronic apparatus EA may also sense the external input TC applied to a side surface and/or a rear surface of the electronic apparatus EA, on the basis of a structure of the electronic apparatus EA.

The electronic apparatus EA may include the window 100, an electronic panel 200, an electronic module 300, and a housing unit 400. In the present embodiment, the window 100 and the housing unit 400 may be coupled to each other to form the exterior of the electronic apparatus EA.

The window 100 may include an insulating panel. For example, the window 100 may include glass, plastic, or a combination thereof. The window 100 may include the front surface FS exposed to the outside. The image IM displayed in the electronic panel 200 may be visible to the outside through the front surface FS. The front surface FS of the window 100 may form the front surface of the electronic apparatus EA. The front surface FS of the window 100 may be divided into a transmission area TA and a bezel area BZA when viewed in a plan view.

The transmission area TA may transmit light incident thereto. The transmission area TA may have a shape corresponding to a shape of an active area AA. For example, the transmission area TA may overlap with a whole or at least a portion of the active area AA. The image IM displayed in the active area AA of the electronic panel 200 may be visible to the outside through the transmission area TA.

A light transmittance of the bezel area BZA may be less than a light transmittance of the transmission area TA. The bezel area BZA may define the shape of the transmission area TA. The bezel area BZA may be adjacent to the transmission area TA and may surround the transmission area TA in a plan view.

The bezel area BZA may have a set or predetermined color. The bezel area BZA may cover a peripheral area NAA of the electronic panel 200 to avoid or prevent the peripheral area NAA from being visible to the outside. However, embodiments of the present disclosure are not limited thereto. In another embodiment of the present disclosure, the bezel area BZA may be omitted (e.g., may not be included) in the window 100.

In the present embodiment, an opening area HA may be defined in the transmission area TA. The opening area HA may overlap with an opening MH penetrating the electronic panel 200 and may overlap with the electronic module 300. The electronic apparatus EA may receive an external signal required for the electronic module 300 through the opening area HA and/or may provide a signal outputted from the electronic module 300 to the outside through the opening area HA.

According to the embodiment of the present disclosure, because the opening area HA overlaps with the transmission area TA, an additional area in addition to the transmission area TA for providing the opening area HA may be omitted. Thus, an area (or size) of the bezel area BZA may be reduced.

The electronic panel 200 may display the image IM and may sense the external input TC. The electronic panel 200 may include a front surface IS including the active area AA and the peripheral area NAA. The active area AA may be an area that is activated by an electrical signal.

In the present embodiment, the active area AA may be an area in which the image IM is displayed and may also be an area in which the external input TC is sensed. The transmission area TA may overlap with at least the active area AA. For example, the transmission area TA may overlap with the whole or at least a portion of the active area AA. Thus, a user may view the image IM through the transmission area TA and/or may provide the external input TC through the transmission area TA. However, embodiments of the present disclosure are not limited thereto. In another embodiment, an area for displaying the image IM and an area for sensing the external input TC may be separated from each other in the active area AA.

The peripheral area NAA may be covered by the bezel area BZA. The peripheral area NAA may be adjacent to the active area AA. The peripheral area NAA may surround the active area AA when viewed in a plan view. A driving circuit and/or driving lines for driving the active area AA may be disposed in the peripheral area NAA.

In the present embodiment, the electronic panel 200 may be assembled in a flat state where the active area AA and the peripheral area NAA face the window 100. However, embodiments of the present disclosure are not limited thereto. In another embodiment, a portion of the peripheral area NAA of the electronic panel 200 may be bent. In this case, a portion of the peripheral area NAA may face the rear surface of the electronic apparatus EA, and thus the bezel area BZA (e.g., the size of the bezel area BZA) in the front surface of the electronic apparatus EA may be reduced. In still another embodiment, the electronic panel 200 may be assembled in a state where a portion of the active area AA is also bent. In yet another embodiment, the peripheral area NAA may be omitted in the electronic panel 200.

The electronic panel 200 may include a display unit 210, a sensing unit 220, and a driving circuit 230.

The display unit 210 may be a component which substantially generates the image IM. The image IM generated by the display unit 210 may be displayed on the display surface FS through the transmission area TA and thus may be visible to a user (e.g., viewed by a user).

The sensing unit 220 may sense the external input TC applied from the outside. As described above, the sensing unit 220 may sense the external input TC provided to the window 100.

The sensing unit 220 may include a plurality of sensing groups SG. The sensing groups SG may be arranged in the first direction DR1 and/or the second direction DR2. The sensing unit 220 may sense the external input TC through the sensing groups SG.

Each of the sensing groups SG may include sensing electrodes having the same arrangement. Each of the sensing groups SG may be a minimum unit of an electrode array having regularity. That is, each of the sensing groups SG may be the smallest repeating unit of an electrode array. This will be described later in more detail. In the present embodiment, the sensing groups SG are disposed in the active area AA. However, embodiments of the present disclosure are not limited thereto. The sensing groups SG may be disposed in other various suitable areas for sensing the external input TC.

The driving circuit 230 may be electrically connected to the display unit 210 and the sensing unit 220. The driving circuit 230 may include a main circuit board MB, a first circuit board CF1, and a second circuit board CF2.

The first circuit board CF1 may be electrically connected to the display unit 210. The first circuit board CF1 may connect the display unit 210 and the main circuit board MB. In the present embodiment, the first circuit board CF1 may be a flexible circuit film. However, embodiments of the present disclosure are not limited thereto. In other embodiments, the first circuit board CF1 may not be connected to the main circuit board MB, and/or the first circuit board CF1 may be a rigid board.

The first circuit board CF1 may be connected to pads (display pads) of the display unit 210, which are disposed in the peripheral area NAA. The first circuit board CF1 may provide electrical signals for driving the display unit 210 to the display unit 210. The electrical signals may be generated in the first circuit board CF1 or may be generated in the main circuit board MB.

The second circuit board CF2 may be electrically connected to the sensing unit 220. The second circuit board CF2 may connect the sensing unit 220 and the main circuit board MB. In the present embodiment, the second circuit board CF2 may be a flexible circuit film. However, embodiments of the present disclosure are not limited thereto. In other embodiments, the second circuit board CF2 may not be connected to the main circuit board MB, and/or the second circuit board CF2 may be a rigid board.

The second circuit board CF2 may be connected to pads (sensing pads) of the sensing unit 220, which are disposed in the peripheral area NAA. The second circuit board CF2 may provide electrical signals for driving the sensing unit 220 to the sensing unit 220. The electrical signals may be generated in the second circuit board CF2 or may be generated in the main circuit board MB.

The main circuit board MB may include various suitable kinds of driving circuits for driving the electronic panel 200 and/or a connector for supplying power. The first circuit board CF1 and the second circuit board CF2 may be connected to the main circuit board MB. According to the embodiment of the present disclosure, the electronic panel 200 may be (e.g., easily) controlled through one main circuit board MB.

However, embodiments of the present disclosure are not limited thereto. In other embodiments, the display unit 210 and the sensing unit 220 may be connected to different main circuit boards, one of the first and second circuit boards CF1 and CF2 may not be connected to the main circuit board MB, and/or at least one of the first and second circuit boards CF1 and CF2 may be omitted. The structure of the electronic panel 200 according to the present disclosure may be variously suitably modified or changed and may not be limited to one embodiment.

According to the embodiment of the present disclosure, a through opening MH (hereinafter, referred to as the opening MH penetrating the electronic panel 200 may be defined in the electronic panel 200. The opening MH may penetrate the display unit 210 and the sensing unit 220.

The opening MH may be defined in the active area AA and may penetrate the electronic panel 200. Because the opening MH is defined in the active area AA, the opening area HA may be provided in the transmission area TA. An edge of the opening area HA may surround an edge of the opening MH when viewed in a plan view. In other words, in the present embodiment, a planar area of the opening area HA may be equal to or greater than a planar area of the opening MH.

In the present embodiment, the opening MH may penetrate at least one of the sensing groups SG. The opening area HA may overlap with at least one of the sensing groups SG when viewed in a plan view. At least a portion of one or more of the sensing electrodes of the sensing groups SG may be removed by (e.g., due to) the opening MH. This will be described later in more detail.

The electronic module 300 may be disposed under the window 100. The electronic module 300 may overlap with the opening MH and the opening area HA when viewed in a plan view. The electronic module 300 may include various functional modules for operating the electronic apparatus EA. The electronic module 300 may be electrically connected to the electronic panel 200 through a connector. For example, the electronic module 300 may include a camera, a speaker, and/or a sensor for sensing light or heat.

In the present embodiment, at least a portion of the electronic module 300 may be received in the opening MH. Alternatively, the electronic module 300 may be disposed on the rear surface of the electronic panel 200 and may overlap with the opening MH when viewed in a plan view. The electronic module 300 may receive an external input transferred through the opening MH and/or may provide an output signal through the opening MH. According to the embodiment of the present disclosure, because the electronic module 300 overlaps with the active area AA, an increase in the bezel area BZA may be prevented or avoided.

Referring to FIG. 2, the electronic apparatus EA may include the electronic panel 200, a power supply module PM, a first electronic module EM1, and a second electronic module EM2. The electronic panel 200, the power supply module PM, the first electronic module EM1 and the second electronic module EM2 may be electrically connected to each other. The display unit 210 and the sensing unit 220 (of the components) of the electronic panel 200 are illustrated in FIG. 2.

The power supply module PM may supply power (e.g., necessary) for overall operations of the electronic apparatus EA. The power supply module PM may include a battery module.

The first electronic module EM1 and the second electronic module EM2 may include various suitable functional modules for operating the electronic apparatus EA. The first electronic module EM1 may be mounted directly on a motherboard electrically connected to the electronic panel 200. Alternatively, the first electronic module EM1 may be mounted on an additional board so as to be electrically connected to the motherboard through a connector.

The first electronic module EM1 may include a control module CM, a wireless communication module TM, an image input module IIM, a sound input module AIM, a memory MM, and an external interface IF. In an embodiment, some of the components (i.e., the modules) may not be mounted on the motherboard but may be electrically connected to the motherboard through a flexible circuit board.

The control module CM may control overall operations of the electronic apparatus EA. The control module CM may include a microprocessor. For example, the control module CM may activate or deactivate the electronic panel 200. The control module CM may control other module(s) (e.g., the image input module IIM, the sound input module AIM, etc.) on the basis of (e.g., according to) a touch signal received from the electronic panel 200.

The wireless communication module TM may transmit/receive a wireless signal to/from other terminal(s) by utilizing Bluetooth or Wi-Fi. The wireless communication module TM may transmit/receive a voice signal by utilizing a general communication line. The wireless communication module TM may include a transmitter TM1 which is configured to modulate a signal to be transmitted and to transmit the modulated signal, and a receiver TM2 which is configured to demodulate a received signal.

The image input module IIM may process image signals to convert the image signals into image data usable in the electronic panel 200. The sound input module AIM may receive an external sound signal through a microphone in a recording mode or a voice recognition mode and may convert the received sound signal into electrical sound data.

The external interface IF may be connected to and interface with an external charger, a cable/wireless data port, and/or a card socket (e.g., a memory card or a SIM/UIM card).

The second electronic module EM2 may include a sound output module AOM, a light emitting module LM, a light receiving module LRM, and a camera module CMM. The components of the second electronic module EM2 may be mounted directly on the motherboard or may be mounted on an additional board so as to be electrically connected to the electronic panel 200 and/or the first electronic module EM1 through a connector.

The sound output module AOM may convert sound data received from the wireless communication module TM and/or sound data stored in the memory MM and may output the converted sound data to the outside.

The light emitting module LM may generate light and may output the generated light. The light emitting module LM may output infrared light. The light emitting module LM may include a light emitting diode (LED) element. The light receiving module LRM may sense (e.g., detect or measure the intensity of) infrared light. The light receiving module LRM may be activated when sensing the infrared light of a set or predetermined level or more. The light receiving module LRM may include a CMOS sensor. After the infrared light generated in the light emitting module LM is outputted, the infrared light may be reflected by an external object (e.g., a finger or a face of a user), and the reflected infrared light may be incident to the light receiving module LRM. The camera module CMM may acquire (e.g., capture) an external image.

The electronic module 300 according to some embodiments of the present disclosure may include at least one of the components of the first and second electronic modules EM1 and EM2. For example, the electronic module 300 may include at least one of the camera, the speaker, the light sensing sensor, or the heat sensing sensor. The electronic module 300 may sense an external object through the opening area HA and/or may provide a sound signal (e.g., a voice) to the outside through the opening area HA. In certain embodiments, the electronic module 300 may include a plurality of components. However, the subject matter of the present disclosure is not limited to any specific embodiment.

Referring again to FIGS. 1A and 1B, the housing unit 400 may be coupled to the window 100. The housing unit 400 and the window 100 may be coupled to each other to provide an inner space. The electronic panel 200 and the electronic module 300 may be received (e.g., located) in the inner space.

The housing unit 400 may be formed of a material having relatively high rigidity. For example, the housing unit 400 may include glass, plastic, and/or a metal; or may include a plurality of frames and/or plates formed of glass, plastic, a metal, or a combination thereof. The housing unit 400 may stably protect the components of the electronic apparatus EA received in the inner space from an external impact.

According to the embodiment of the present disclosure, the opening MH for the electronic module 300 may be provided in the electronic panel 200. As a result, the area (or size) of the bezel area BZA may be reduced, and thus the aesthetics of the electronic apparatus EA may be improved.

Figure 3A:
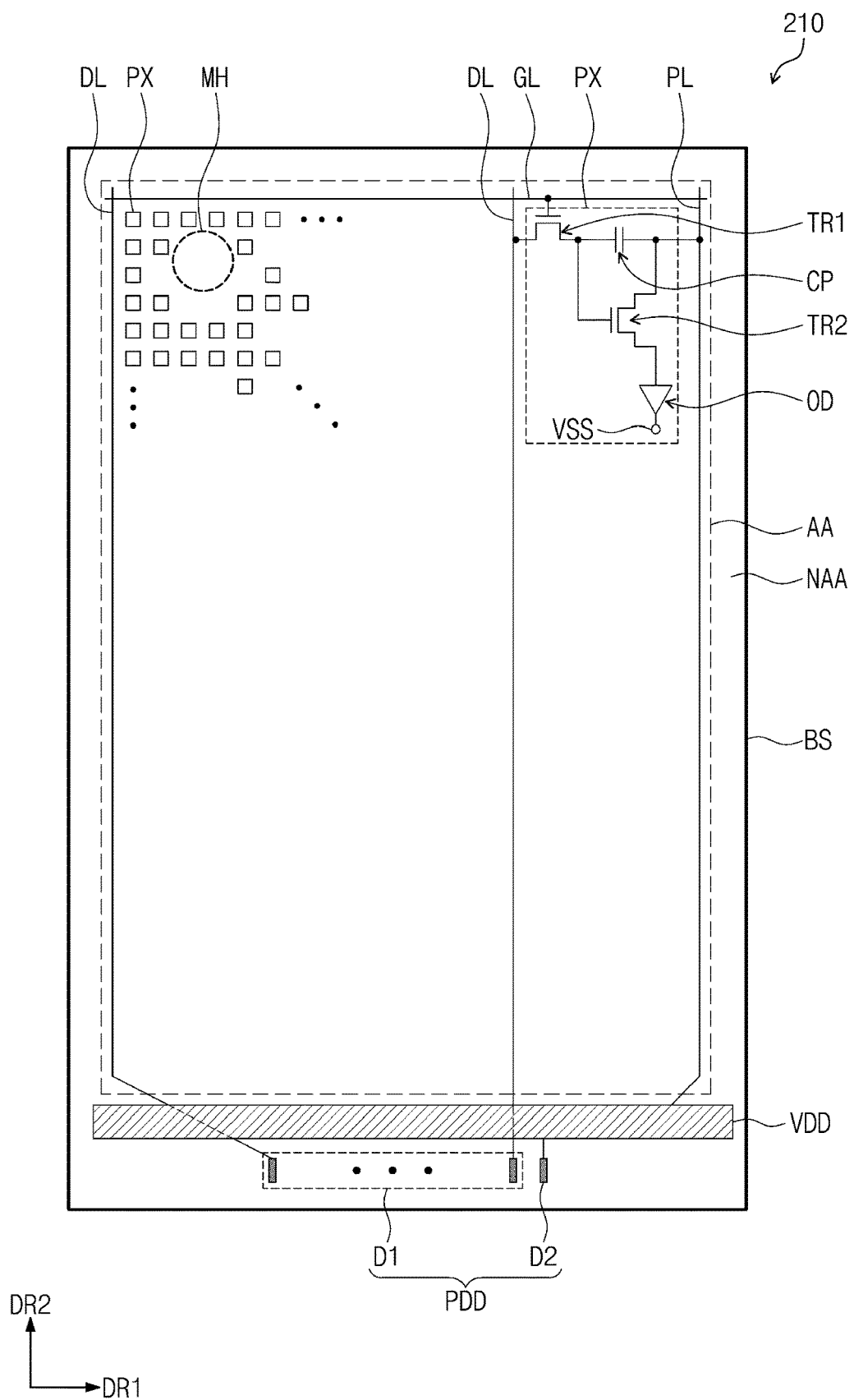
FIG. 3A is a plan view illustrating a display unit according to an embodiment of the present disclosure.
Figure 3B:
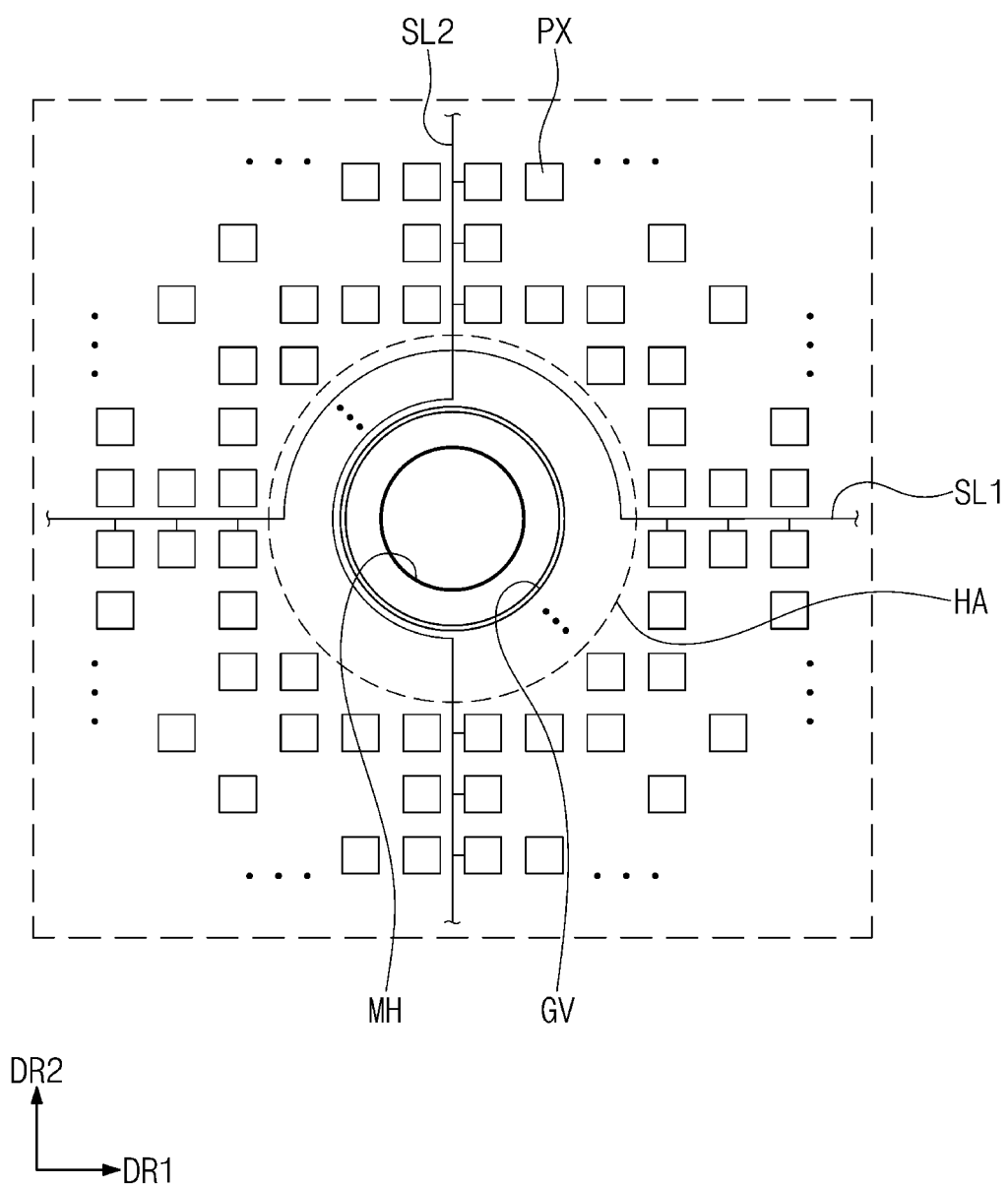
FIG. 3B is an enlarged plan view illustrating a portion of FIG. 3A.

FIG. 3A is a plan view illustrating a display unit according to an embodiment of the present disclosure, and FIG. 3B is an enlarged plan view illustrating a portion of FIG. 3A.

Figure 4A:
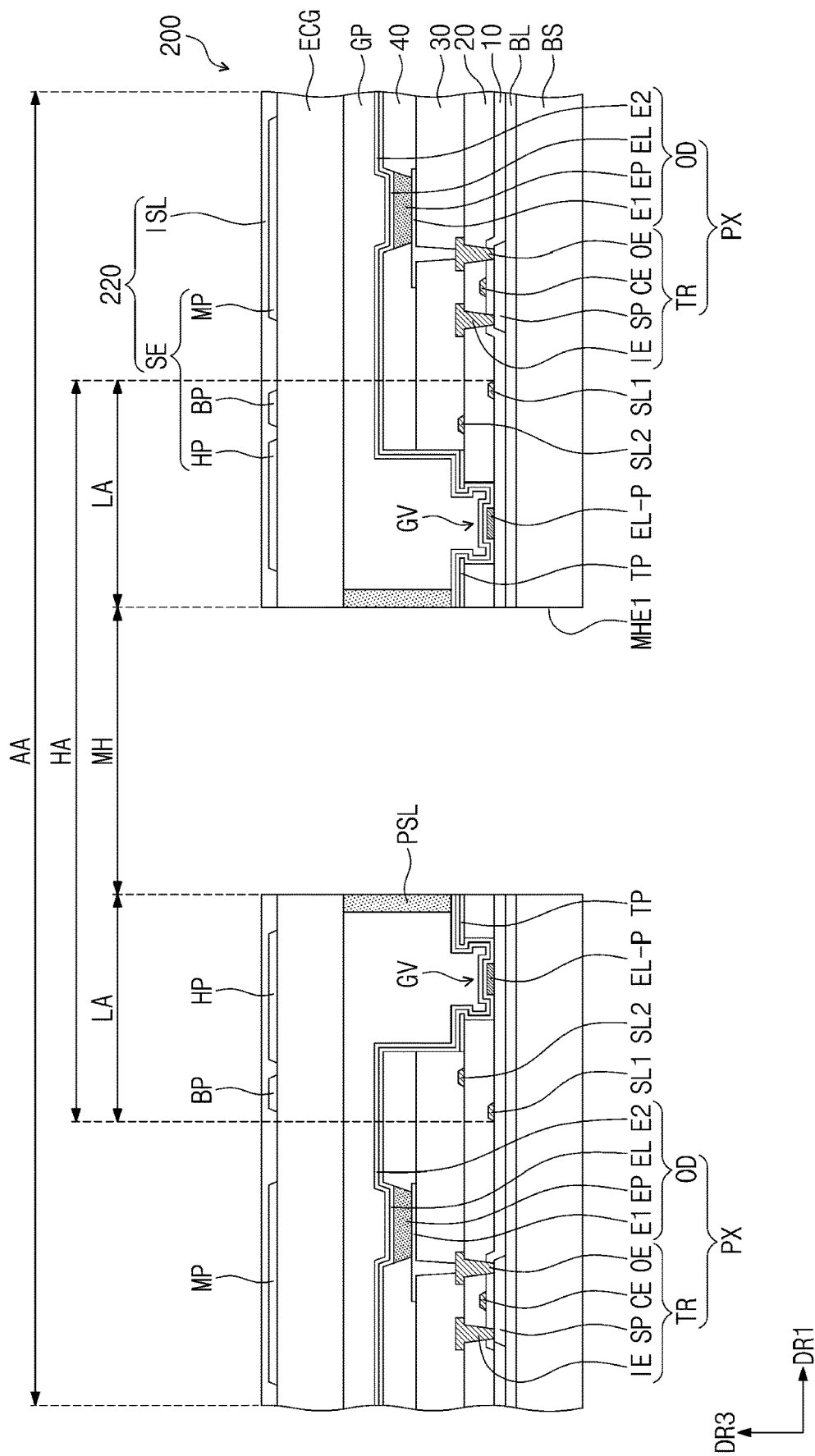
FIGS. 4A and 4B are cross-sectional views illustrating electronic panels according to some embodiments of the present disclosure.
Figure 4B:
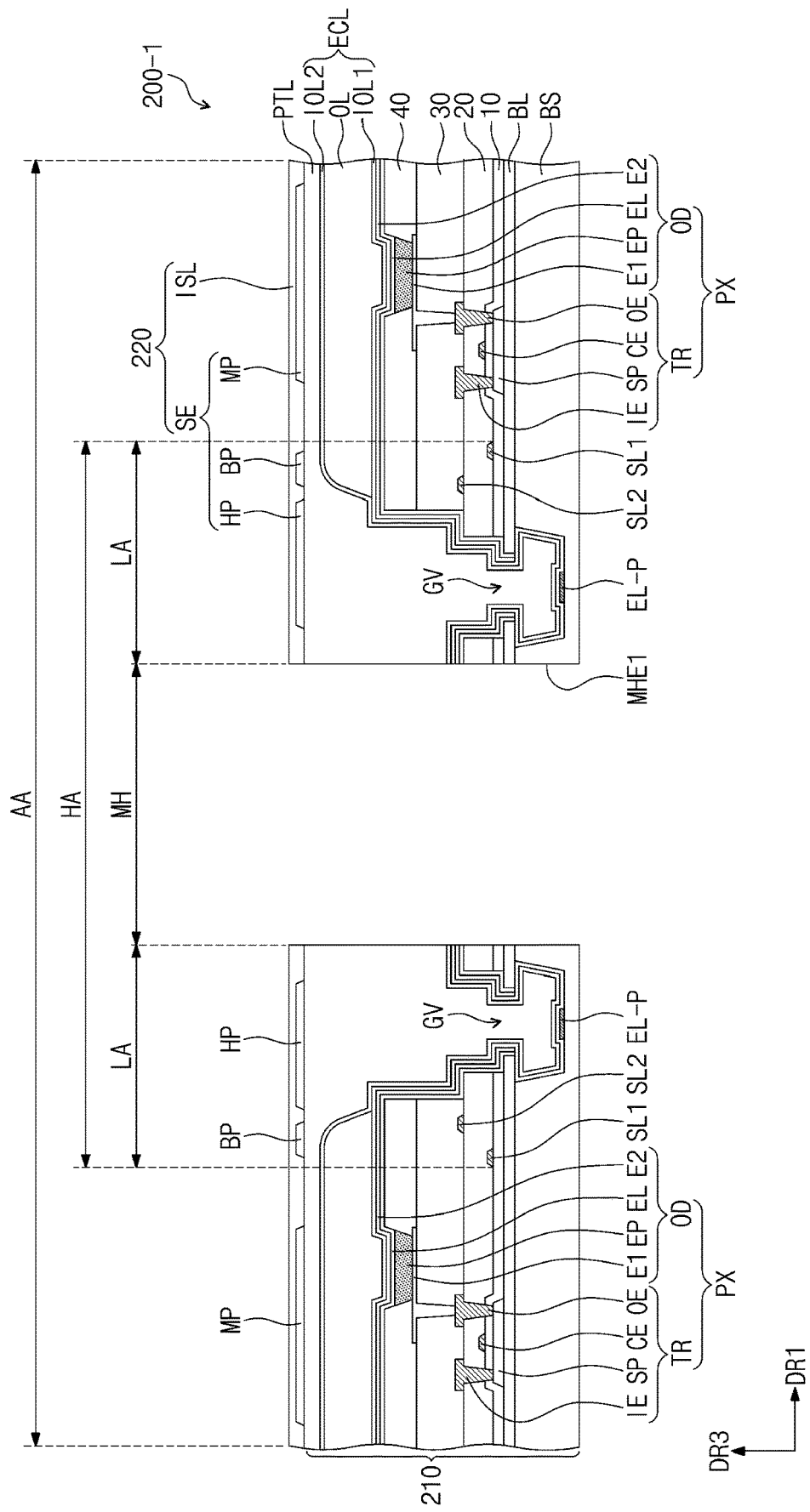

FIGS. 4A and 4B are cross-sectional views illustrating electronic panels according to some embodiments of the present disclosure.

An area in which the opening MH is disposed is schematically illustrated in FIG. 3B. FIG. 4A illustrates a cross-sectional view of the electronic panel 200 of FIG. 1B, and FIG. 4B illustrates a cross-sectional view of an electronic panel 200-1 according to an embodiment of the present disclosure. FIGS. 4A and 4B are cross-sectional views illustrating areas of the electronic panels 200 and 200-1, in which the openings MH are defined. Hereinafter, embodiments of the present disclosure will be described with reference to FIGS. 3A-4B.

The display unit 210 may include a base substrate BS, a plurality of pixels PX, a plurality of signal lines GL, DL and PL, and a plurality of display pads PDD. The active area AA and the peripheral area NAA may be areas provided by the base substrate BS. The base substrate BS may include an insulating substrate. For example, the base substrate BS may include a glass substrate, a plastic substrate, or a combination thereof.

The signal lines GL, DL and PL may be connected to the pixels PX and may transmit electrical signals to the pixels PX. A scan line GL, a data line DL and a power line PL of the signal lines included in the display unit 210 are illustrated as an example. However, embodiments of the present disclosure are not limited thereto. In other embodiments, the signal lines GL, DL and PL may further include at least one of an initialization voltage line or an emission control line.

The pixels PX may be disposed in the active area AA. In the present embodiment, an enlarged circuit diagram of one of the pixels PX is illustrated as an example in FIG. 3A. The pixel PX may include a first thin film transistor TR1, a capacitor CP, a second thin film transistor TR2, and a light emitting element OD. The first thin film transistor TR1 may be a switching element configured to control on/off of the pixel PX. The first thin film transistor TR1 may transmit or block a data signal provided through the data line DL in response to a scan signal provided through the scan line GL.

The capacitor CP may be connected to the first thin film transistor TR1 and the power line PL. The capacitor CP may be charged with charges corresponding to a difference between the data signal transmitted from the first thin film transistor TR1 and a first power source signal provided through the power line PL.

The second thin film transistor TR2 may be connected to the first thin film transistor TR1, the capacitor CP, and the light emitting element OD. The second thin film transistor TR2 may control a driving current, flowing through the light emitting element OD, in response to the amount of charges stored in the capacitor CP. A turn-on time of the second thin film transistor TR2 may be determined depending on the amount of the charges stored in the capacitor CP. The second thin film transistor TR2 may provide the first power source signal transmitted through the power line PL to the light emitting element OD for the turn-on time.

The light emitting element OD may be connected to a power source terminal VSS and may receive a power source signal (hereinafter, referred to as a second power source signal) different from the first power source signal provided from the power line PL. A driving current corresponding to a difference between the second power source signal and the electrical signal provided from the second thin film transistor TR2 may flow through the light emitting element OD, and the light emitting element OD may generate light corresponding to the driving current. However, embodiments of the present disclosure are not limited thereto. The components of the pixel PX may be variously suitably modified or changed and may be variously suitably arranged.

The opening MH may be defined in the active area AA. Thus, some of the pixels PX may be disposed adjacent to the opening MH. Some of the pixels PX may surround the opening MH when viewed in a plan view.

Referring to FIGS. 3B and 4A, the opening area HA is illustrated for the purpose of ease and convenience in description. Hereinafter, an embodiment of the present disclosure will be described in more detail with reference to FIGS. 3B and 4A.

An area (or size) of the opening area HA may be greater than an area (or size) of the opening MH. Thus, the edge (indicated by a dotted line) of the opening area HA may surround the edge of the opening MH when viewed in a plan view.

An area of the opening area HA outside the opening MH may be defined as a line area LA. In the present embodiment, the opening area HA may correspond to an area including the opening MH and the line area LA.

The electronic panel 200 may include the base substrate BS, an auxiliary layer BL, the pixel PX, a plurality of insulating layers 10, 20, 30 and 40, an encapsulation substrate ECG, and the sensing unit 220, as illustrated in FIG. 4A. The base substrate BS may include an insulating material. For example, the base substrate BS may include glass, a resin film, or a stack film (e.g., a multilayered film) in which organic layers and inorganic layers are alternately stacked.

The auxiliary layer BL may include an inorganic material. The auxiliary layer BL may include a barrier layer and/or a buffer layer. Thus, the auxiliary layer BL may prevent or substantially prevent oxygen and/or moisture provided (e.g., permeated) through the base substrate BS from permeating into the pixels PX, and/or may provide surface energy lower than surface energy of the base substrate BS to stably form the pixels PX.

Also, at least one of the base substrate BS or the auxiliary layer BL may be provided in plurality, and the base substrates BS and the auxiliary layers BL may be alternately stacked. In some embodiments, at least one selected from the barrier layer and the buffer layer of the auxiliary layer BL may be provided in plurality or may be omitted.

A plurality of signal lines SL1 and SL2 connected to the pixels PX may be disposed in the opening area HA. The signal lines SL1 and SL2 may be connected to the pixels PX via the opening area HA. A first signal line SL1 and a second signal line SL2 of the plurality of signal lines connected to the pixels PX are illustrated as an example in FIG. 3B for the purpose of ease and convenience in description.

The pixels PX may be connected to the first signal line SL1 and the second signal line SL2. However, embodiments of the present disclosure are not limited thereto. In another embodiment, the pixels PX may be additionally connected to at least one of other various suitable signal lines. Hereinafter, one pixel PX will be mainly described as a representative of the pixels PX.

The first signal line SL1 may extend in the first direction DR1. The first signal line SL1 may be connected to the pixels PX which are arranged in the first direction DR1 to constitute the same row (e.g., to form a row of pixels). For example, the first signal line SL1 may correspond to the scan line GL.

Some of the pixels PX connected to the first signal line SL1 may be disposed at a left side of the opening MH, and others thereof may be disposed at a right side of the opening MH. Thus, the pixels PX in the same row connected to the first signal line SL1 may be turned on/off by substantially the same scan signal even though one or more pixels in the same row are omitted (e.g., replaced) by the opening MH.

The second signal line SL2 may extend in the second direction DR2. The second signal line SL2 may be connected to the pixels PX which are arranged in the second direction DR2 to constitute the same column (e.g., to form a column of pixels). For example, the second signal line SL2 may correspond to the data line DL.

Some of the pixels PX connected to the second signal line SL2 may be disposed at a top side of the opening MH, and others thereof may be disposed at a bottom side of the opening MH. Thus, the pixels PX in the same column connected to the second signal line SL2 may receive the data signal through the same line even though one or more pixels in the same column are omitted (e.g., replaced) by the opening MH.

Also, in certain embodiments, the electronic panel 200 may further include a connecting pattern disposed in the opening area HA. In this case, the first signal line SL1 overlapping with the opening area HA may be cut (e.g., removed). The cut portions of the first signal line SL1 may be connected to each other through the connecting pattern. Likewise, the second signal line SL2 overlapping with the opening area HA may be cut (e.g., removed), and the cut portions of the second signal line SL2 may be connected to each other through the connecting pattern.

The pixel PX may be disposed in the active area AA. In the present embodiment, the second thin film transistor (hereinafter, referred to as a thin film transistor TR) and the light emitting element OD (of the components) of the pixel PX in the circuit diagram of FIG. 3A are illustrated as an example in FIG. 4A. Each of the first to fourth insulating layers 10, 20, 30 and 40 may include an organic material and/or an inorganic material and may have a single-layered or multi-layered structure.

The thin film transistor TR may include a semiconductor pattern SP, a control electrode CE, an input electrode IE, and an output electrode OE. The semiconductor pattern SP may be disposed on the auxiliary layer BL. The semiconductor pattern SP may include a semiconductor material. The control electrode CE may be spaced apart from the semiconductor pattern SP with the first insulating layer 10 interposed therebetween. The control electrode CE may be connected to the first thin film transistor TR1 (see FIG. 3A) and one electrode of the capacitor CP (see FIG. 3A).

The input electrode IE and the output electrode OE may be spaced apart from the control electrode CE with the second insulating layer 20 interposed therebetween. The input electrode IE and the output electrode OE of the thin film transistor TR may penetrate the first and second insulating layers 10 and 20 so as to be connected to one side portion and another side portion of the semiconductor pattern SP, respectively.

The third insulating layer 30 may be disposed on the second insulating layer 20 to cover the input electrode IE and the output electrode OE. In another embodiment, the semiconductor pattern SP may be disposed on the control electrode CE in the thin film transistor TR. In still another embodiment, the semiconductor pattern SP may be disposed on the input electrode IE and the output electrode OE. In yet another embodiment, the input electrode IE and the output electrode OE may be disposed on the same layer as the semiconductor pattern SP and may be connected directly to the semiconductor pattern SP. The thin film transistor TR according to embodiments of the present disclosure may have any one of various suitable structures and is not limited to a specific embodiment.

The light emitting element OD may be disposed on the third insulating layer 30. The light emitting element OD may include a first electrode E1, an emission pattern EP, a control layer EL, and a second electrode E2.

The first electrode E1 may penetrate (e.g., may extend through) the third insulating layer 30 so as to be connected to the thin film transistor TR. In one embodiment, the electronic panel 200 may further include a connection electrode disposed between the first electrode E1 and the thin film transistor TR. In this case, the first electrode E1 may be electrically connected to the thin film transistor TR through the connection electrode.

The fourth insulating layer 40 may be disposed on the third insulating layer 30. The fourth insulating layer 40 may include an organic material and/or an inorganic material and may have a single-layered or multi-layered structure. An opening may be defined in the fourth insulating layer 40. The opening may expose at least a portion of the first electrode E1. The fourth insulating layer 40 may be a pixel defining layer.

The emission pattern EP may be disposed in the opening and may be disposed on the first electrode E1 exposed by the opening. The emission pattern EP may include a light emitting material. For example, the emission pattern EP may include at least one material capable of emitting red light, green light and/or blue light. In an embodiment, the emission pattern EP may include a fluorescent material and/or a phosphorescent material. The emission pattern EP may include an organic light emitting material and/or an inorganic light emitting material. The emission pattern EP may emit light in response to a potential difference between the first electrode E1 and the second electrode E2.

The control layer EL may be disposed between the first electrode E1 and the second electrode E2. The control layer EL may be disposed adjacent to the emission pattern EP. The control layer EL may control movement of charges to improve luminous efficiency and life span of the light emitting element OD. The control layer EL may include at least one of a hole transfer (e.g., hole transport) material, a hole injection material, an electron transfer (e.g., electron transport) material, or an electron injection material.

In the present embodiment, the control layer EL is disposed between the emission pattern EP and the second electrode E2. However, embodiments of the present disclosure are not limited thereto. In other embodiments, the control layer EL may be disposed between the emission pattern EP and the first electrode E1, or the control layer EL may include a plurality of layers stacked in the third direction DR3 with the emission pattern EP interposed therebetween.

The control layer EL may have a single unitary body shape extending from the active area AA into the peripheral area NAA. The control layer EL may be provided in common in the plurality of pixels PX.

The second electrode E2 may be disposed on the emission pattern EP. The second electrode E2 may be opposite to the first electrode E1. The second electrode E2 may have a single unitary body shape extending from the active area AA into the peripheral area NAA. The second electrode E2 may be provided in common in the plurality of pixels PX. The light emitting element OD of each of the pixels PX may receive a common power source signal (i.e., the second power source signal) through the second electrode E2.

The second electrode E2 may include a transparent conductive material or a semi-transparent conductive material. Thus, light generated from the emission pattern EP may (e.g., easily) exit in the third direction DR3 through the second electrode E2. However, embodiments of the present disclosure are not limited thereto. In another embodiment, the first electrode E1 may include a transparent or semi-transparent conductive material, and the light emitting element OD may be driven in a rear surface light emitting type (e.g., to emit light through a rear surface). In still another embodiment, the light emitting element OD may be driven in a both surface light emitting type (e.g., kind) in which light exits (e.g., is emitted) through both a front surface and a rear surface.

The encapsulation substrate ECG may include an insulating material. For example, the encapsulation substrate ECG may include a glass substrate and/or a plastic substrate. An optical member may be disposed on the encapsulation substrate ECG. According to the embodiment of the present disclosure, because the electronic panel 200 includes the encapsulation substrate ECG, the electronic panel 200 may have improved reliability against an external impact.

The encapsulation substrate ECG may be spaced apart from the second electrode E2 in the third direction DR3. A space GP between the encapsulation substrate ECG and the second electrode E2 may be filled with air and/or an inert gas.

The encapsulation substrate ECG may be coupled to the base substrate BS through a sealing member PSL to seal the pixels PX. The sealing member PSL may maintain a set or predetermined distance between the base substrate BS and the encapsulation substrate ECG disposed over the base substrate BS.

The sealing member PSL may be a component defining an inner surface of the opening MH. The sealing member PSL may include an organic material (such as a photocurable resin and/or a photoplastic resin) and/or may include an inorganic material (such as frit seal). However, embodiments of the present disclosure are not limited thereto.

The sensing unit 220 may be disposed on the encapsulation substrate ECG. The sensing unit 220 may include a sensing electrode SE and a sensing insulating layer ISL.

The sensing electrode SE may be disposed on the encapsulation substrate ECG. However, embodiments of the present disclosure are not limited thereto. In another embodiment, an insulating layer may be additionally disposed between the sensing electrode SE and the encapsulation substrate ECG.

The sensing electrode SE may be disposed in the active area AA. The sensing electrode SE may be included in each of the sensing groups SG described above. The sensing electrode SE may include a conductive material.

The sensing electrode SE may include a main pattern MP, an opening pattern HP, and a connection pattern BP. The main pattern MP may be spaced apart from the opening area HA. The main pattern MP may overlap with the light emitting element OD when viewed in a plan view.

The main pattern MP may be optically transparent. For example, the sensing electrode SE may include a transparent conductive oxide (TCO). Alternatively, the main pattern MP may have a metal mesh structure which has an opening overlapping with the light emitting element OD. Thus, it is possible to reduce or minimize the influence of the main pattern MP on luminous efficiency of light emitted from the light emitting element OD.

The opening pattern HP may be disposed in the opening area HA. The opening pattern HP may be spaced apart from the main pattern MP. The opening pattern HP may be disposed in the line area LA and may be adjacent to the opening MH.

The connection pattern BP may be connected to the opening pattern HP. The connection pattern BP may electrically connect the opening pattern HP disposed in the opening area HA to the main pattern MP disposed outside the opening area HA through the opening area HA (in particular, the line area LA). Alternatively, when the opening pattern HP is provided in plurality, the connection pattern BP may connect the opening patterns HP adjacent to each other in the opening area HA. This will be described later in more detail.

In the present embodiment, the opening pattern HP and the main pattern MP may be disposed on the same layer. In an embodiment, the opening pattern HP may be formed of the same material as the main pattern MP. In addition, the connection pattern BP may be disposed on the same layer as the opening pattern HP and the main pattern MP and may be formed of the same material as the opening pattern HP and the main pattern MP. As a result, the opening pattern HP, the connection pattern BP and the main pattern MP may be formed utilizing one mask at the same time (e.g., concurrently), and thus processes may be simplified and process costs may be reduced. However, embodiments of the present disclosure are not limited thereto. In other embodiments, the connection pattern BP may be disposed on a different layer from a layer on which the opening pattern HP is disposed, and/or the opening pattern HP may be formed of a different material from that of the main pattern MP.

The sensing insulating layer ISL may be disposed on the encapsulation substrate ECG to cover the sensing electrode SE. The sensing insulating layer ISL may include an insulating material. The sensing insulating layer ISL may include an organic material and/or an inorganic material and may have a single-layered or multi-layered structure.

Referring to FIG. 4B, in the electronic panel 200-1, the encapsulation substrate ECG may be replaced with an encapsulation layer ECL. The encapsulation layer ECL may be disposed on the light emitting element OD to encapsulate the light emitting element OD. The encapsulation layer ECL may be provided in common on the plurality of pixels PX. In one embodiment, a capping layer covering the second electrode E2 may be disposed between the second electrode E2 and the encapsulation layer ECL.

The encapsulation layer ECL may include a first inorganic layer IOL1, an organic layer OL and a second inorganic layer IOL2, which are sequentially stacked in the third direction D3. However, embodiments of the present disclosure are not limited thereto. In another embodiment, the encapsulation layer ECL may further include a plurality of inorganic layers and/or organic layers.

The first inorganic layer IOL1 may cover the second electrode E2. The first inorganic layer IOL1 may prevent or substantially prevent external moisture and/or oxygen from permeating into the light emitting element OD. For example, the first inorganic layer IOL1 may include silicon nitride, silicon oxide, silicon oxynitride, or a combination thereof. The first inorganic layer IOL1 may be formed by a deposition process.

The organic layer OL may be disposed on the first inorganic layer IOL1 and may be in contact with the first inorganic layer IOL1. The organic layer OL may provide a flat surface on the first inorganic layer IOL1. The organic layer OL may cover a bent portion (e.g., an uneven portion) of a top surface of the first inorganic layer IOL1 and/or a particle existing on the first inorganic layer IOL1, and thus it is possible to block or reduce the influence of the state of the top surface of the first inorganic layer IOL1 on components formed on the organic layer OL. In addition, the organic layer OL may relax or release stress between layers in contact with the organic layer OL. The organic layer OL may include an organic material and may be formed by a solution process such as a spin coating process, a slit coating process, and/or an inkjet process.

The second inorganic layer IOL2 may be disposed on the organic layer OL to cover the organic layer OL. The second inorganic layer IOL2 may be stably formed on a top surface of the organic layer OL, which is relatively flat as compared with the top surface of the first inorganic layer IOL1. The second inorganic layer IOL2 may encapsulate moisture outputted from the organic layer OL to prevent or substantially prevent the moisture from being provided to the outside. For example, the second inorganic layer IOL2 may include silicon nitride, silicon oxide, silicon oxynitride, or a combination thereof. The second inorganic layer IOL2 may be formed by a deposition process.

The electronic panel 200-1 may further include a cover layer PTL. The cover layer PTL may be disposed on the encapsulation layer ECL. The cover layer PTL may cover at least a portion of the encapsulation layer ECL. The cover layer PTL may function as a planarization layer providing a flat top surface and/or may function as a protective layer protecting the encapsulation layer ECL.

The sensing unit 220 may be disposed on the cover layer PTL. In the present embodiment, an inner surface MHE1 of the opening MH may be defined by cut end surfaces (or side surfaces) of the base substrate BS, the auxiliary layer BL, the first insulating layer 10, the second insulating layer 20, the first inorganic layer IOL1, the second inorganic layer IOL2, the cover layer PTL and the sensing insulating layer ISL.

Also, a recess pattern GV may be defined in the opening area HA. The recess pattern GV may block a path of moisture and/or oxygen permeating to the pixels PX through the opening MH. The recess pattern GV may extend along the edge of the opening MH when viewed in a plan view. In the present embodiment, the recess pattern GV is illustrated in a circular ring shape surrounding the opening MH, as illustrated in FIG. 3B.

However, embodiments of the present disclosure are not limited thereto. In other embodiments, the recess pattern GV may have a different shape from that of the opening MH, or the recess pattern GV may have a polygonal shape, an elliptical shape, or a closed loop shape and of which at least a portion is curved. Alternatively, the recess pattern GV may have a shape including a plurality of patterns separated from each other.

The recess pattern GV may be recessed from the front surface of the display unit 210 and may be formed by removing portions of some of the components of the display unit 210. Also, the recess pattern GV may not penetrate the display unit 210, unlike the opening MH. Thus, a rear surface of the base substrate BS overlapping with the recess pattern GV may not be opened by the recess pattern GV. That is, the recess pattern GV may not penetrate through the rear surface of the base substrate BS.

As illustrated in FIG. 4A, the recess pattern GV may be defined on the base substrate BS in the electronic panel 200. The recess pattern GV may be formed by a through-region which is formed in the second insulating layer 20 to expose the first insulating layer 10. Here, a tip portion TP forming an undercut may be provided on the second insulating layer 20 and may laterally protrude from an inner surface of the through-region formed in the second insulating layer 20. An inner surface of the recess pattern GV may be formed by at least one of the control layer EL or the second electrode E2, which covers the tip portion TP and the inner surface of the through-region formed in the second insulating layer 20. In the present embodiment, the inner surface of the recess pattern GV may be provided by the second electrode E2.

Here, an organic pattern EL-P may overlap with the recess pattern GV. The organic pattern EL-P may be disposed in the through-region formed in the second insulating layer 20 and may be covered by at least one of the control layer EL or the second electrode E2. The organic pattern EL-P may include the same material as the control layer EL. Alternatively, the organic pattern EL-P may include the same material as the second electrode E2 or the capping layer. The organic pattern EL-P may have a single-layered or multi-layered structure.

As illustrated in FIG. 4B, the recess pattern GV may also be defined in the base substrate BS in the electronic panel 200-1. The recess pattern GV may penetrate the components disposed under the encapsulation layer ECL and adjacent to the opening MH while leaving a portion of the base substrate BS (untouched). In the present embodiment, the recess pattern GV may be formed by a through-region formed in the auxiliary layer BL and a recess region formed in the base substrate BS. The through-region and the recess region may be connected to each other. An inner surface of the recess pattern GV may be formed by the first inorganic layer IOL1 and the second inorganic layer IOL2, which cover an inner surface of the through-region formed in the auxiliary layer BL and an inner surface of the recess region formed in the base substrate BS. In the present embodiment, the inner surface of the recess pattern GV may be provided by the second inorganic layer IOL2.

In the present embodiment, a portion of the auxiliary layer BL may laterally protrude from the inner surface of the recess region formed in the base substrate BS, thereby forming the tip portion TP. However, embodiments of the present disclosure are not limited thereto. In other embodiments, the electronic panel 200-1 may have other various suitable layer structures forming the tip portion TP at the recess pattern GV.

According to the present embodiment, the organic pattern EL-P may be spaced apart from the control layer EL and the second electrode E2 and may be disposed in the recess region formed in the base substrate BS. The organic pattern EL-P may be covered by the first inorganic layer IOL1 and thus may not be exposed to the outside.

According to the embodiments of the present disclosure, the recess pattern GV may block (e.g., break) continuity of the control layer EL from the side surface of the opening MH to the active area AA. The control layer EL may be cut (e.g., removed) in an area overlapping with the recess pattern GV. The control layer EL may be a path through which an external contaminant (e.g., moisture and/or air) moves. The recess pattern GV may block a path in which moisture and/or air flows from a layer (e.g., the control layer EL) exposed by the opening MH into the pixels PX through the opening area HA. Thus, reliability of the electronic panels 200 and 200-1 having the openings MH may be improved.

In an embodiment, the recess pattern GV may be provided in plurality in the line area LA of the electronic panel 200 or 200-1. The plurality of recess patterns GV may be arranged and spaced apart from each other in the line area LA. In an embodiment, the recess pattern GV may be filled with a portion of the organic layer OL. In an embodiment, the recess pattern GV may be omitted in the display unit 210.

However, the subject matter of the present disclosure is not limited to a specific embodiment.

Referring again to FIG. 3A, a power pattern VDD may be disposed in the peripheral area NAA. In the present embodiment, the power pattern VDD may be connected to a plurality of the power lines PL. Because the display unit 210 includes the power pattern VDD, the same first power source signal may be provided to the plurality of pixels PX.

The display pads PDD may include a first pad D1 and a second pad D2. The first pad D1 may be provided in plurality, and the plurality of first pads D1 may be connected to the data lines DL, respectively. The second pad D2 may be connected to the power pattern VDD and thus may be electrically connected to the power lines PL. The display unit 210 may provide electrical signals provided from the outside to the pixels PX through the display pads PDD. In an embodiment, the display pads PDD may further include pads for receiving other electrical signals in addition to the first pad D1 and the second pad D2. However, the subject matter of the present disclosure is not limited to one embodiment.

Figure 5A:
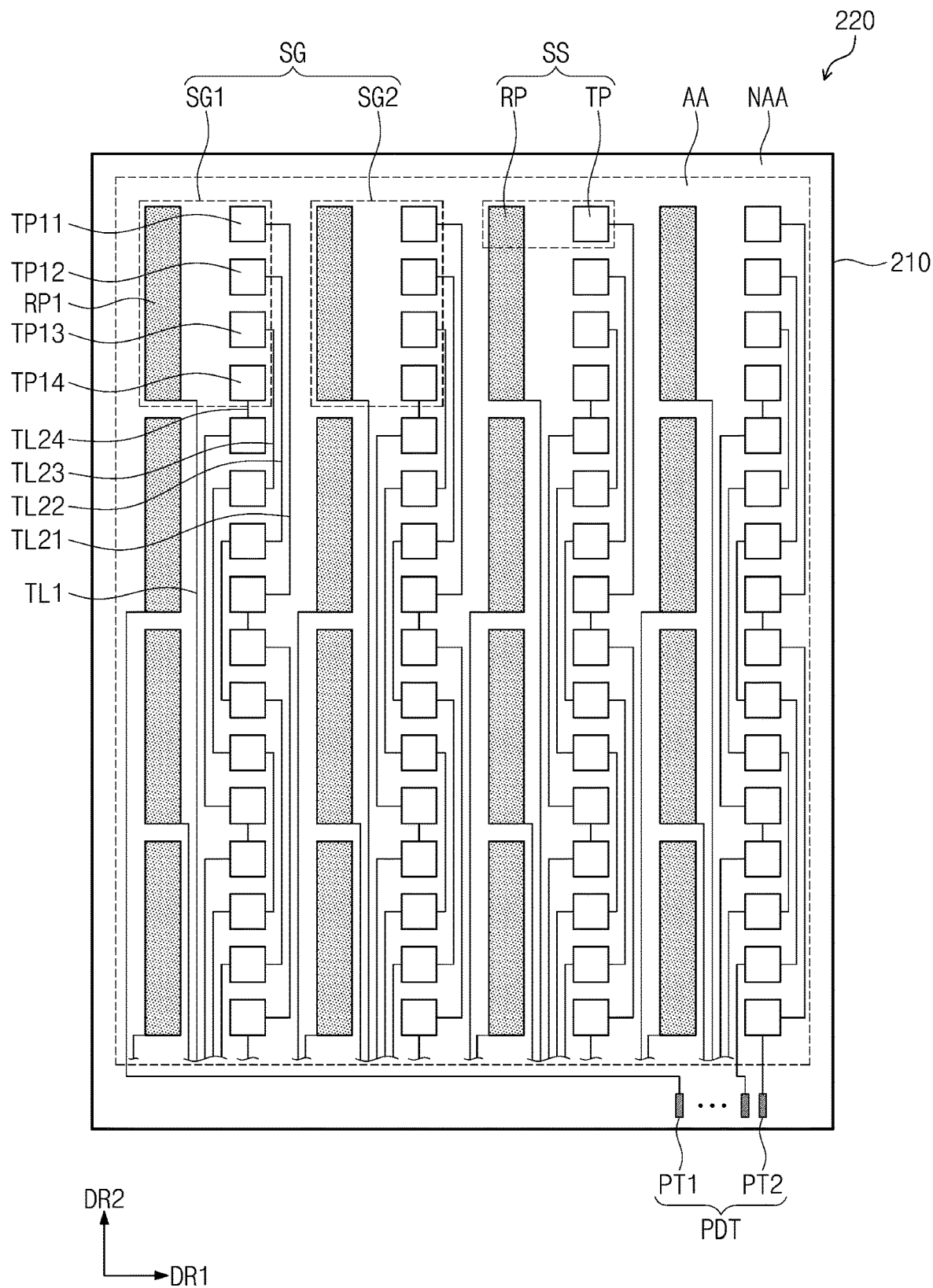
FIG. 5A is a plan view illustrating a sensing unit according to an embodiment of the present disclosure.
Figure 5B:
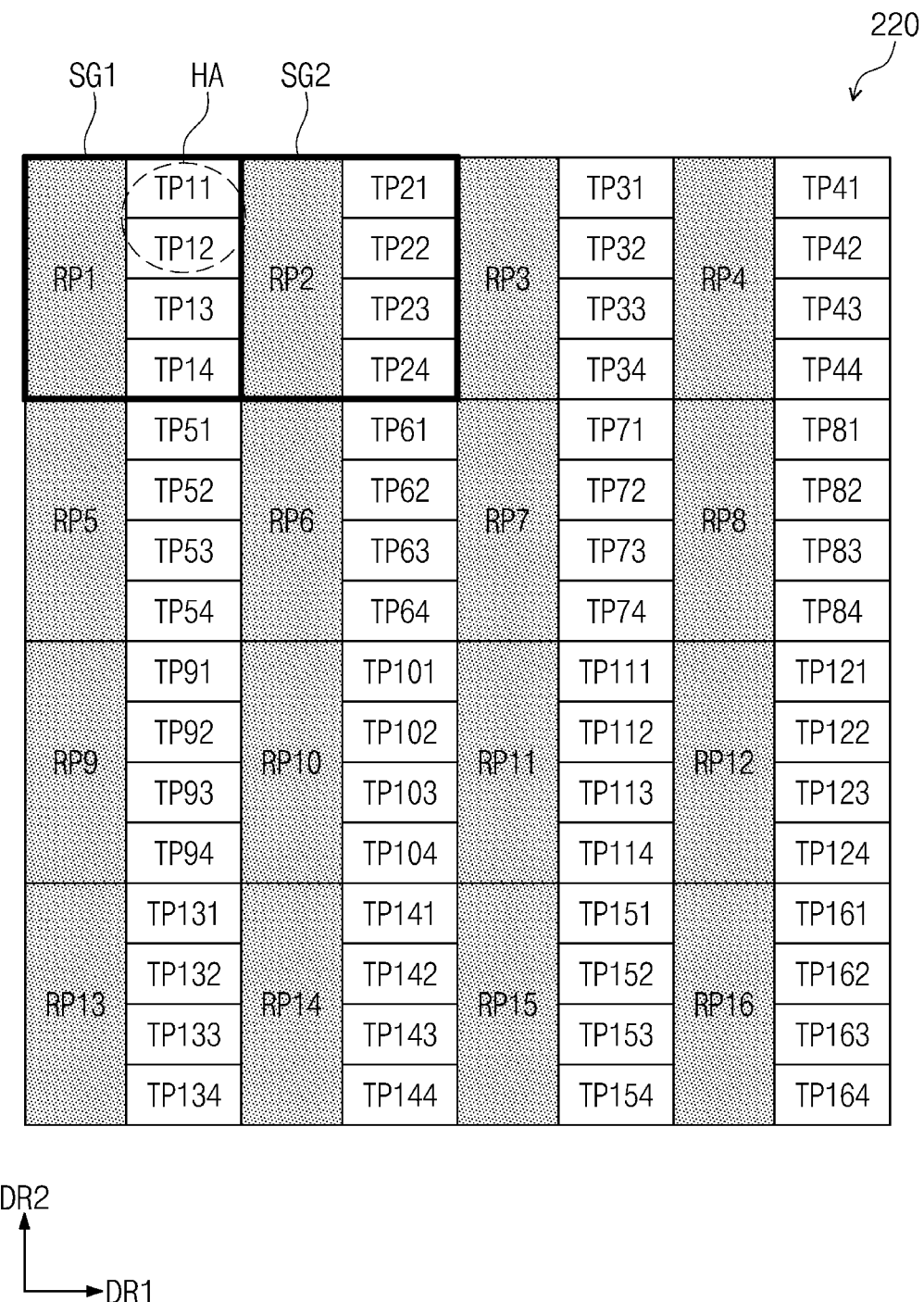
FIG. 5B is a plan view schematically illustrating a sensing unit according to an embodiment of the present disclosure.
Figure 5C:
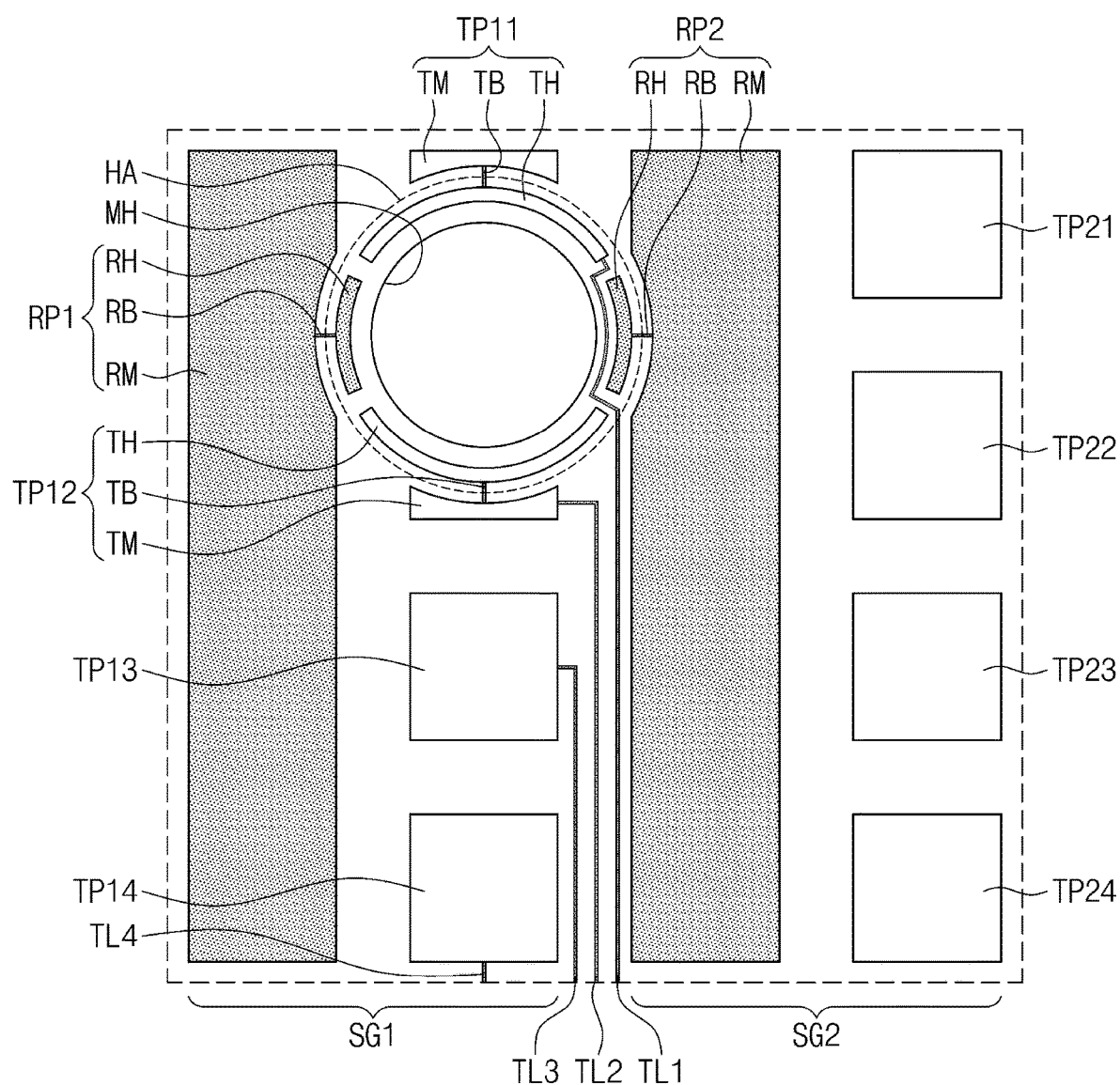
FIG. 5C is an enlarged plan view illustrating a portion of FIG. 5A.

FIG. 5A is a plan view illustrating a sensing unit according to an embodiment of the present disclosure. FIG. 5B is a plan view schematically illustrating a sensing unit according to an embodiment of the present disclosure. FIG. 5C is an enlarged plan view illustrating a portion of FIG. 5A. FIG. 5B schematically illustrates sensing groups SG of FIG. 5A, and FIG. 5C illustrates an area in which the opening MH is disposed. Some components are omitted (e.g., not illustrated) in FIG. 5C for the purpose of ease and convenience in description and illumination.

Hereinafter, an embodiment of the present disclosure will be described with reference to FIGS. 5A-5C. Also, the same components as described with reference to FIGS. 1A-4B will be indicated by the same reference numerals or designators, and the descriptions thereto will be omitted (e.g., will not be repeated) for the purpose of ease and convenience in description.

The sensing unit 220 may include the plurality of sensing groups SG and a plurality of sensing lines TL1, TL21, TL22, TL23 and TL24. In the present embodiment, a top surface (i.e., the front surface) of the display unit 210, on which the sensing groups SG are disposed, is illustrated for the purpose of ease and convenience in description.

The sensing groups SG may be arranged in the first direction DR1 and/or the second direction DR2. In the present embodiment, the sensing groups SG may be arranged in a matrix form. The sensing lines TL1, TL21, TL22, TL23 and TL24 may include a first sensing line TL1 and second sensing lines TL21, TL22, TL23 and TL24. The first sensing line TL1 and the second sensing lines TL21, TL22, TL23 and TL24 may be isolated from each other.

The sensing unit 220 may include n first sensing electrodes and k second sensing electrodes. The value of n and k may be suitably selected. As illustrated in FIGS. 5A and 5B, each of the sensing groups SG may have one first sensing electrode and four second sensing electrodes.

The sensing unit 220 may include 16 first sensing electrodes RP1 to RP16 and 64 second sensing electrodes TP11 to TP164 and may include 16 sensing groups SG. However, embodiments of the present disclosure are not limited thereto. In certain embodiments, the number of the sensing electrodes included in each of the sensing groups may be variously suitably designed.

In FIG. 5A, a first sensing group SG1 and a second sensing group SG2 adjacent to each other in the first direction DR1 are indicated by dotted lines and the opening MH is omitted (e.g., not illustrated), for the purpose of ease and convenience in description and illustration. The first sensing group SG1 may include one first sensing electrode RP1 and four second sensing electrodes TP11, TP12, TP13 and TP14. Connection relationship of the first sensing group SG1 to be described hereinafter may also be applied to other sensing groups.

The first sensing electrode RP1 may be spaced apart from the second sensing electrodes TP11, TP12, TP13 and TP14 when viewed in a plan view. The first sensing electrode RP1 may have a bar shape extending in the second direction DR2. The first sensing electrodes RP1 to RP16 of the sensing groups SG may be electrically isolated from each other. In other words, the first sensing electrode RP1 of the first sensing group SG1 and the first sensing electrode RP2 of the second sensing group SG2 may be connected to the first sensing lines isolated from each other and may transmit/receive electrical signals independent of each other.

The second sensing electrodes TP11, TP12, TP13 and TP14 may be arranged in the second direction DR2. Each of the second sensing electrodes TP11, TP12, TP13 and TP14 may face the first sensing electrode RP1 in the first direction DR1.

One of the second sensing electrodes TP11, TP12, TP13 and TP14 and a portion of the first sensing electrode RP1, which face each other, may form one sensor SS. The sensor SS may be a minimum (e.g., the smallest) unit forming a capacitance, and the sensing unit 220 may sense information on a position and/or strength of the external input TC (see FIG. 1A) by utilizing (e.g., based on) a change in capacitance of the sensor SS.

In the present embodiment, a length of the first sensing electrode RP1 in the second direction DR2 may be equal to or greater than a sum of lengths of the second sensing electrodes TP11, TP12, TP13 and TP14 in the second direction DR2. Also, the arrangement relationship between the first sensing electrode RP1 and the second sensing electrodes TP11, TP12, TP13 and TP14 may be suitably modified or changed.

The second sensing electrodes TP11, TP12, TP13 and TP14 may be electrically isolated (i.e., insulated) from each other. The second sensing electrodes TP11, TP12, TP13 and TP14 may be connected to the second sensing lines TL21, TL22, TL23 and TL24, respectively. Thus, the second sensing electrodes TP11, TP12, TP13 and TP14 may transmit/receive signals independent of each other.

Also, in the present embodiment, second sensing electrodes, disposed in the same column, of the second sensing electrodes TP11 to TP164 may be connected to each other on the basis of a set or predetermined rule. For example, each of the second sensing electrodes TP11, TP12, TP13 and TP14 of the first sensing group, second sensing electrodes TP51, TP52, TP53 and TP54 of a fifth sensing group, second sensing electrodes TP91, TP92, TP93 and TP94 of a ninth sensing group and second sensing electrodes TP131, TP132, TP133 and TP134 of a thirteenth sensing group, which are disposed in the same column, may be connected to corresponding second sensing electrodes in the same column.

For example, the second sensing electrodes TP11, TP12, TP13 and TP14 of the first sensing group SG1 may be connected to the second sensing electrodes TP51, TP52, TP53 and TP54 of the fifth sensing group through the second sensing lines TL21, TL22, TL23 and TL24, respectively. Here, the second sensing electrodes TP11, TP12, TP13 and TP14 of the first sensing group SG1 (hereinafter, referred to as first to fourth row sensing electrodes of the first sensing group) and the second sensing electrodes TP51, TP52, TP53 and TP54 of the fifth sensing group (hereinafter, referred to as first to fourth row sensing electrodes of the fifth sensing group) may be connected in various suitable forms. For example, the first to fourth row sensing electrodes TP11, TP12, TP13 and TP14 of the first sensing group SG1 may be connected to the fourth to first row sensing electrodes TP54, TP53, TP52 and TP51 of the fifth sensing group, respectively.

Likewise, the first to fourth row sensing electrodes TP51, TP52, TP53 and TP54 of the fifth sensing group may be connected to the second sensing electrodes TP91, TP92, TP93 and TP94 of the ninth sensing group (hereinafter, first to fourth row sensing electrodes of the ninth sensing group). For example, the fourth to first row sensing electrodes TP54, TP53, TP52 and TP51 of the fifth sensing group may be connected to the first to fourth row sensing electrodes TP91, TP92, TP93 and TP94 of the ninth sensing group, respectively.

Likewise, the first to fourth row sensing electrodes TP91, TP92, TP93 and TP94 of the ninth sensing group may be connected to the second sensing electrodes TP131, TP132, TP133 and TP134 of the thirteenth sensing group (hereinafter, first to fourth row sensing electrodes of the thirteenth sensing group). For example, the first to fourth row sensing electrodes TP91, TP92, TP93 and TP94 of the ninth sensing group may be connected to the fourth to first row sensing electrodes TP134, TP133, TP132 and TP131 of the thirteenth sensing group, respectively.

According to the embodiments of the present disclosure, an $n^{th}$ row sensing electrode may be electrically connected to a $(5-n)^{th}$ row sensing electrode in two adjacent sensing groups arranged in a column direction (i.e., the second direction DR2). Thus, the sensing groups SG and the sensors SS may be controlled independently of each other without an increase in the sensing lines or pads. However, embodiments of the present disclosure are not limited thereto. The connection relationship between the sensing groups SG may be variously suitably modified or changed.

The sensing unit 220 may include sensing pads PDT. The sensing pads PDT may be connected to the first sensing line TL1 and the second sensing lines TL21 to TL24, respectively. In the present embodiment, the sensing pads PDT may be concentrically disposed in a bottom right portion of the sensing unit 220 when viewed in a plan view. However, embodiments of the present disclosure are not limited thereto. Positions and/or widths of the sensing pads PDT may be variously suitably modified depending on a width and/or a position of the second circuit board CF2 (see FIG. 1B) described above.

In the sensing unit 220 according to an embodiment of the present disclosure, the opening area HA may overlap with the active area AA. The opening area HA in which the opening MH is defined (e.g., located) may be defined at one of various suitable positions in the active area AA and may overlap with at least one of the sensing groups SG.

Referring to FIGS. 5B and 5C, the opening area HA may overlap with the first sensing group SG1 and the second sensing group SG2. In more detail, the opening area HA may overlap with the first sensing electrode RP1 of the first sensing group SG1, the first row sensing electrode TP11 of the first sensing group SG1, the second row sensing electrode TP12 of the first sensing group SG1, and the first sensing electrode RP2 of the second sensing group SG2. Thus, a portion of each of the first sensing electrode RP1 of the first sensing group SG1, the first row sensing electrode TP11 of the first sensing group SG1, the second row sensing electrode TP12 of the first sensing group SG1 and the first sensing electrode RP2 of the second sensing group SG2 may be removed by (e.g., due to) the opening MH.

The first sensing electrode RP1 of the first sensing group SG1 may overlap with the opening area HA at a left side of the opening MH. The first sensing electrode RP1 of the first sensing group SG1 may include a main pattern RM (hereinafter, referred to as a main pattern of the first sensing electrode), an opening pattern RH (hereinafter, referred to as an opening pattern of the first sensing electrode), and a connection pattern RB (hereinafter, referred to as a connection pattern of the first sensing electrode).

The main pattern RM of the first sensing electrode may be spaced apart from the opening MH and may be spaced apart from the opening area HA. The main pattern RM of the first sensing electrode may be an embodiment of the main pattern MP illustrated in FIG. 4A.

A shape of the main pattern RM of the first sensing electrode may correspond to a shape where a portion of the first sensing electrode RP overlapping with the opening area HA is removed. An area of the main pattern RM of the first sensing electrode may be less than an area of another first sensing electrode RP not overlapping with the opening area HA.

The opening pattern RH of the first sensing electrode may be spaced apart from the main pattern RM of the first sensing electrode and may be disposed in the opening area HA. The opening pattern RH of the first sensing electrode may be an embodiment of the opening pattern HP illustrated in FIG. 4A. The opening pattern RH of the first sensing electrode may face the opening MH. The opening pattern RH of the first sensing electrode may have a shape extending along at least a portion of the edge of the opening MH. In the present embodiment, the opening pattern RH of the first sensing electrode may have an arc shape.

The opening pattern RH of the first sensing electrode may be disposed on the same layer as the main pattern RM of the first sensing electrode. In addition, the opening pattern RH of the first sensing electrode may be formed of the same material as the main pattern RM of the first sensing electrode. Thus, the opening pattern RH of the first sensing electrode may be formed by the same process as the main pattern RM of the first sensing electrode, thereby simplifying processes and reducing process costs.

The connection pattern RB of the first sensing electrode may connect the main pattern RM of the first sensing electrode and the opening pattern RH of the first sensing electrode via the opening area HA. The connection pattern RB of the first sensing electrode may be an embodiment of the connection pattern BP illustrated in FIG. 4A.

The connection pattern RB of the first sensing electrode may be disposed on the same layer as the opening pattern RH of the first sensing electrode and/or the main pattern RM of the first sensing electrode. Thus, the connection pattern RB of the first sensing electrode may be connected directly to the opening pattern RH of the first sensing electrode and/or the main pattern RM of the first sensing electrode without an additional contact opening. However, embodiments of the present disclosure are not limited thereto. In another embodiment, the connection pattern RB of the first sensing electrode may be disposed on a different layer from a layer on which the opening pattern RH and/or the main pattern RM of the first sensing electrode is disposed.

According to embodiments of the present disclosure, the main pattern RM of the first sensing electrode may be connected to the opening pattern RH of the first sensing electrode through the connection pattern RB of the first sensing electrode, and thus it is possible to compensate the area of the main pattern RM of the first sensing electrode, which is reduced by (e.g., due to) the opening MH.

The first row sensing electrode TP11 of the first sensing group SG1 may overlap with the opening area HA at a top side of the opening MH. The first row sensing electrode TP11 of the first sensing group SG1 may include a main pattern TM (hereinafter, referred to as a main pattern of the second sensing electrode), an opening pattern TH (hereinafter, referred to as an opening pattern of the second sensing electrode), and a connection pattern TB (hereinafter, referred to as a connection pattern of the second sensing electrode). The main pattern TM of the second sensing electrode may correspond to the main pattern RM of the first sensing electrode, the opening pattern TH of the second sensing electrode may correspond to the opening pattern RH of the first sensing electrode, and the connection pattern TB of the second sensing electrode may correspond to the connection pattern RB of the first sensing electrode.

Thus, the first row sensing electrode TP11 of the first sensing group SG1 may include the opening pattern TH of the second sensing electrode, which is disposed in the opening area HA and extends along the edge of the opening MH. As a result, it is possible to compensate an area of the main pattern TM of the second sensing electrode, which is reduced by the opening MH.

The second row sensing electrode TP12 of the first sensing group SG1 may overlap with the opening area HA at a bottom side of the opening MH. The second row sensing electrode TP12 of the first sensing group SG1 may have a shape corresponding (e.g., similar) to that of the first row sensing electrode TP11 of the first sensing group SG1. In other words, the second row sensing electrode TP12 of the first sensing group SG1 may include a main pattern TM of the second sensing electrode which is spaced apart from the opening area HA, an opening pattern TH of the second sensing electrode which is disposed in the opening area HA and extends along the edge of the opening MH, and a connection pattern TB of the second sensing electrode which connects the main pattern TM of the second sensing electrode and the opening pattern TH of the second sensing electrode.

The first sensing electrode RP2 of the second sensing group SG2 may overlap with the opening area HA at a right side of the opening MH. The first sensing electrode RP2 of the second sensing group SG2 may have a shape corresponding to that of the first sensing electrode RP1 of the first sensing group SG1. In other words, the first sensing electrode RP2 of the second sensing group SG2 may include a main pattern RM of the first sensing electrode which is spaced apart from the opening area HA, an opening pattern RH of the first sensing electrode which is disposed in the opening area HA and extends along the edge of the opening MH, and a connection pattern RB of the first sensing electrode which connects the main pattern RM of the first sensing electrode and the opening pattern RH of the first sensing electrode.

Because the sensing unit 220 according to the present embodiment includes the opening patterns RH and TH overlapping with the opening area HA and extending along the edge of the opening MH, it is possible to compensate the areas (or sizes) of the first sensing electrodes RP1 and RP2 and the second sensing electrodes TH11 and TH12, which are reduced by the opening MH. Thus, even though the opening MH is provided in the active area AA, it is possible to reduce or prevent a reduction in sensitivity to an external input in the opening area HA. As a result, the sensing unit 220 according to the embodiments of the present disclosure may provide substantially uniform sensitivity in the whole active area AA (e.g., the entire active area AA).

The sensing unit 220 may further include a light blocking pattern disposed in the opening area HA. The light blocking pattern exposes the opening MH and has a shape of a circle ring which extends surrounding (e.g., around) the opening MH. The light blocking pattern may include a black matrix or opaque metal. The opening patterns RH may not be seen from outside of the sensing unit 220 due to be covered (e.g., due to the coverage) by the light blocking pattern. However, embodiments of the present disclosure are not limited thereto. In another embodiment of the present disclosure, the light blocking pattern may be omitted in the opening area HA.

Figure 6A:
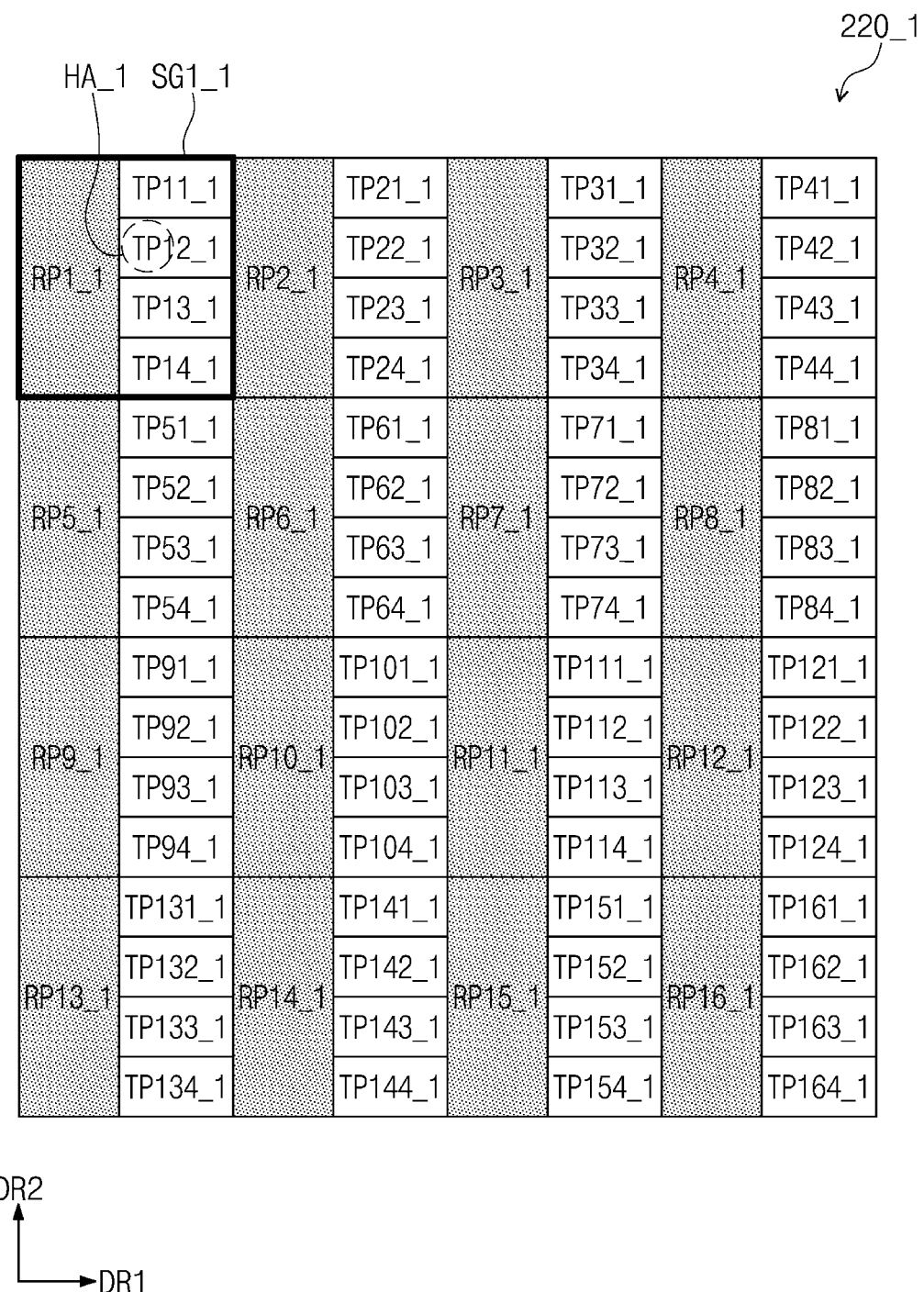
FIG. 6A is a plan view schematically illustrating a sensing unit according to an embodiment of the present disclosure.
Figure 6B:
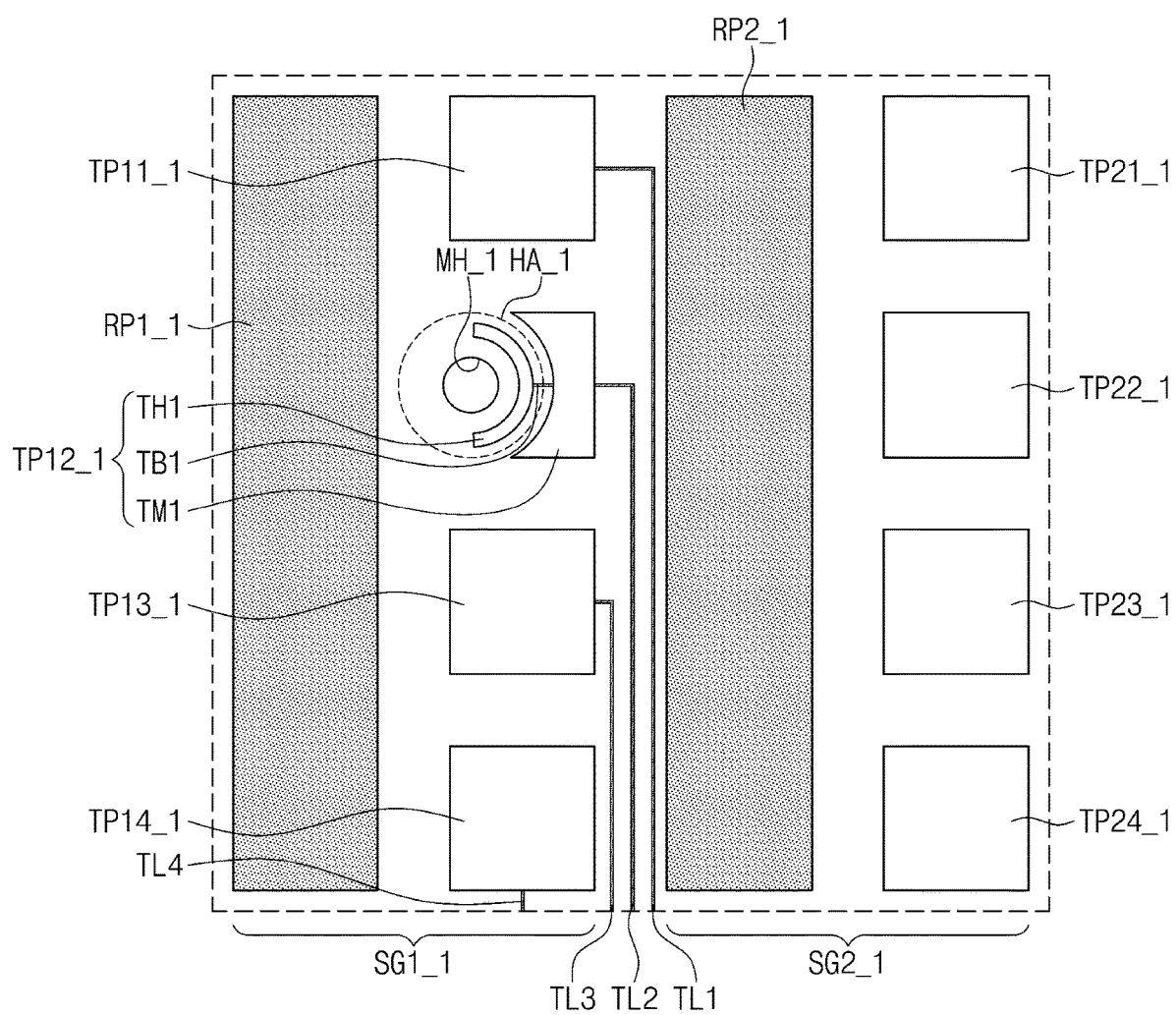
FIG. 6B is an enlarged plan view illustrating a portion of FIG. 6A.

FIG. 6A is a plan view schematically illustrating a sensing unit according to an embodiment of the present disclosure. FIG. 6B is an enlarged plan view illustrating a portion of FIG. 6A. FIG. 6A illustrates a schematic view corresponding to FIG. 5B. FIG. 6B illustrates a partial area in which an opening area HA_1 of FIG. 6A is provided, and some components are omitted in FIG. 6B. Hereinafter, an embodiment of the present disclosure will be described with reference to FIGS. 6A and 6B. In addition, the same components as described with reference to FIGS. 1A-5C will be indicated by the same reference numerals or designators, and the descriptions thereto will be omitted for the purpose of ease and convenience in description and illumination.

As illustrated in FIG. 6A, a sensing unit 220_1 according to an embodiment of the present disclosure may include 16 first sensing electrodes RP1_1 to RP16_1 and 64 second sensing electrodes TP11_1 to TP164_1. The first sensing electrodes RP1_1 to RP16_1 and the second sensing electrodes TP11_1 to TP164_1 may correspond to the first sensing electrodes RP1 to RP16 and the second sensing electrodes TP11 to TP164 of FIG. 5B, and thus detailed descriptions thereto are omitted.

In the present embodiment, the opening area HA_1 may overlap with a single sensing group. In the present embodiment, the opening area HA_1 may overlap with a first sensing group SG1_1, and an opening MH_1 may penetrate the first sensing group SG1_1 and may be spaced apart from a second sensing group SG2_1.

FIG. 6B illustrates one first sensing electrode RP1_1 and four second sensing electrodes TP11_1, TP12_1, TP13_1 and TP14_1, which constitute the first sensing group SG1_1, and one first sensing electrode RP2_1 and four second sensing electrodes TP21_1, TP22_1, TP23_1 and TP24_1, which constitute the second sensing group SG2_1. Hereinafter, the second sensing electrodes TP11_1, TP12_1, TP13_1 and TP14_1 of the first sensing group SG1_1 may be referred to as first to fourth row sensing electrodes of the first sensing group.

As illustrated in FIG. 6B, the opening area HA_1 may overlap with only the second row sensing electrode TP12_1 of the first sensing group from among the sensing electrodes constituting the first sensing group SG1_1. A size of the opening area HA_1 according to the present embodiment may be less than that of the opening area HA illustrated in FIG. 5C. Alternatively, the opening area HA_1 may have the same size as the opening area HA illustrated in FIG. 5C, and sizes of the first and second sensing groups SG1_1 and SG2_1 may be greater than sizes of the first and second sensing groups SG1 and SG2 illustrated in FIG. 5C. The shape of the sensing unit 220_1 may be variously suitably modified, and the subject matter of present disclosure is not limited to one embodiment.

The second row sensing electrode TP12_1 of the first sensing group SG1_1 may overlap with the opening area HA_1 at a right side of the opening MH_1. The second row sensing electrode TP12_1 of the first sensing group SG1_1 may include a main pattern TM1, an opening pattern TH1, and a connection pattern TB1.

The main pattern TM1 may be spaced apart from the opening area HA_1. A shape of the main pattern TM1 may correspond to a shape where a portion of the second sensing electrode (e.g., the first row sensing electrode T12_1) overlapping with the opening area HA_1 is removed. The main pattern TM1 may face an edge of the opening area HA_1. The main pattern TM1 may correspond to the main pattern TM of the second sensing electrode illustrated in FIG. 5C.

The opening pattern TH1 may be spaced apart from the main pattern TM1 and may be disposed in the opening area HA_1. The opening pattern TH1 may face the opening MH_1. The opening pattern TH1 may extend along at least a portion of the edge of the opening MH_1. The opening pattern TH1 may have a semicircular arc shape with respect to a center of the opening MH_1. The opening pattern TH1 may correspond to the opening pattern TH of the second sensing electrode illustrated in FIG. 5C.

The connection pattern TB1 may connect the main pattern TM1 and the opening pattern TH1 via the opening area HA_1. The main pattern TM1 and the opening pattern TH1 may be electrically connected to each other through the connection pattern TB1 and may transmit/receive the same electrical signal through one sensing line TL2.

According to the present embodiment, the sensing unit 220_1 may include the opening pattern TH1 overlapping with the opening area HA_1 and extending along the edge of the opening MH_1, and thus it is possible to compensate an area (or size) of the second row sensing electrode TP12_1, which is reduced by the opening MH_1. As a result, it is possible to reduce or prevent a reduction in sensitivity to an external input in the opening area HA_1, and substantially uniform sensitivity may be provided in the whole active area of the sensing unit 220_1.

Figure 7A:
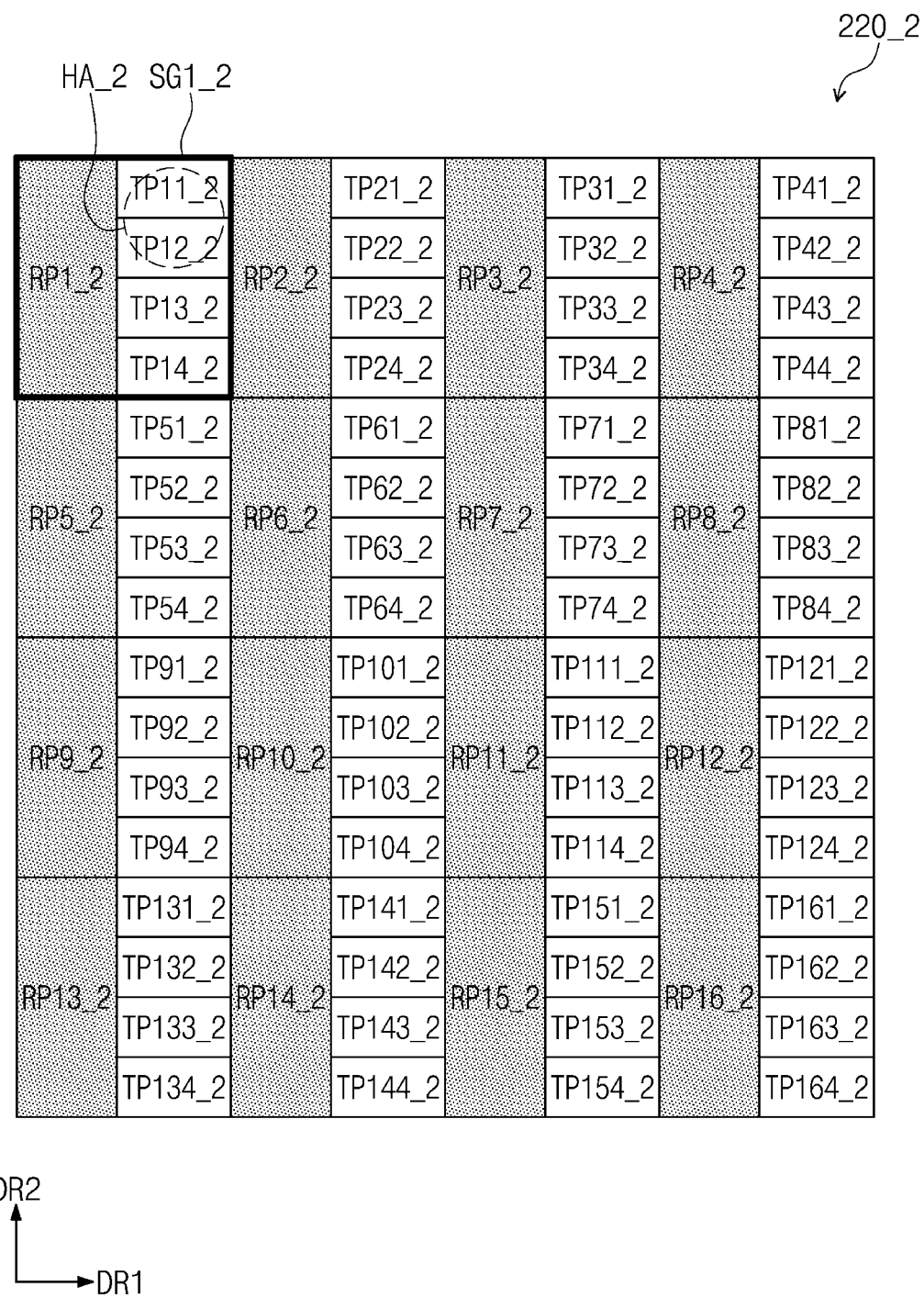
FIG. 7A is a plan view schematically illustrating a sensing unit according to an embodiment of the present disclosure.
Figure 7B:
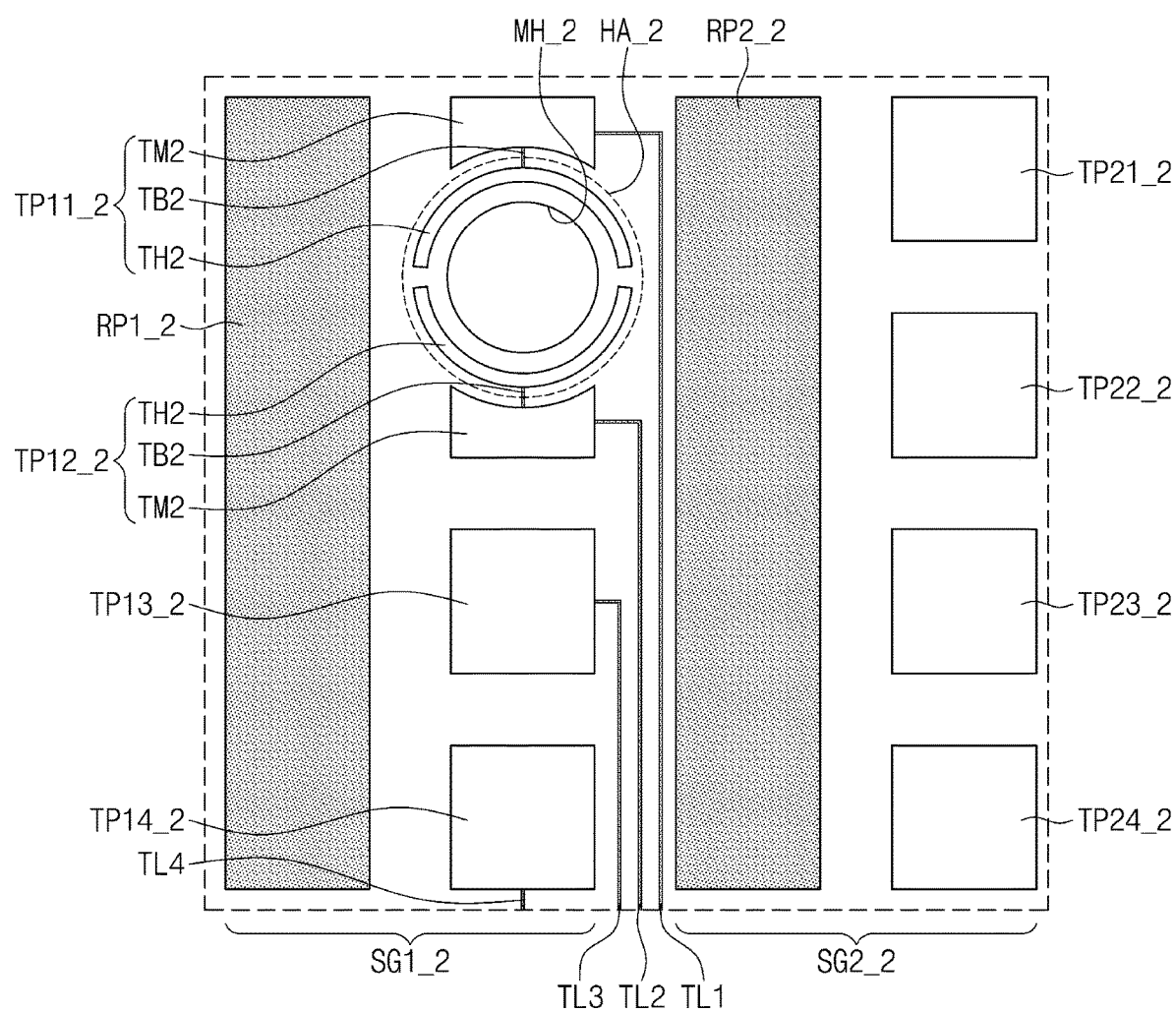
FIG. 7B is an enlarged plan view illustrating a portion of FIG. 7A.

FIG. 7A is a plan view schematically illustrating a sensing unit according to an embodiment of the present disclosure. FIG. 7B is an enlarged plan view illustrating a portion of FIG. 7A. FIG. 7A illustrates a schematic view corresponding to FIG. 5B. FIG. 7B illustrates a partial area in which an opening area HA_2 of FIG. 7A is provided, and some components are omitted in FIG. 7B. Hereinafter, an embodiment of the present disclosure will be described with reference to FIGS. 7A and 7B. In the present embodiment, the same components as described with reference to FIGS. 1A-6B will be indicated by the same reference numerals or designators, and the descriptions thereto will be omitted for the purpose of ease and convenience in description.

As illustrated in FIG. 7A, a sensing unit 220_2 according to an embodiment of the present disclosure may include 16 first sensing electrodes RP1_2 to RP16_2 and 64 second sensing electrodes TP11_2 to TP164_2. The first sensing electrodes RP1_2 to RP16_2 and the second sensing electrodes TP11_2 to TP164_2 may correspond to the first sensing electrodes RP1 to RP16 and the second sensing electrodes TP11 to TP164 of FIG. 5B, and thus detailed descriptions thereto are omitted.

In the present embodiment, the opening area HA_2 may overlap with a single sensing group. In the present embodiment, an opening MH_2 may penetrate a first sensing group SG1_2 and may be spaced apart from a second sensing group SG2_2. Also, the opening area HA_2 may overlap with a plurality of the second sensing electrodes.

FIG. 7B illustrates one first sensing electrode RP1_2 and four second sensing electrodes TP11_2, TP12_2, TP13_2 and TP14_2, which constitute the first sensing group SG1_2, and one first sensing electrode RP2_2 and four second sensing electrodes TP21_2, TP22_2, TP23_2 and TP24_2, which constitute the second sensing group SG2_2. Hereinafter, the second sensing electrodes TP11_2, TP12_2, TP13_2 and TP14_2 of the first sensing group SG1_2 may be referred to as first to fourth row sensing electrodes of the first sensing group. In the present embodiment, the opening area HA_2 may overlap with the first and second row sensing electrodes TP11_2 and TP12_2 of the first sensing group from among the sensing electrodes of the first sensing group SG1_2.

The first row sensing electrode TP11_2 of the first sensing group may overlap with the opening area HA_2 at a top side of the opening MH_2, and the second row sensing electrode TP12_2 of the first sensing group may overlap with the opening area HA_2 at a bottom side of the opening MH_2.

Each of the first and second row sensing electrodes TP11_2 and TP12_2 of the first sensing group SG1_2 may include a main pattern TM2, an opening pattern TH2, and a connection pattern TB2. The main pattern TM2, the opening pattern TH2 and the connection pattern TB2 may correspond to the main pattern TM, the opening pattern TH and the connection pattern TB of the second sensing electrode of FIG. 5C, respectively. Thus, duplicated descriptions are omitted.

According to the present embodiment, the sensing unit 220_2 may include the opening patterns TH2 overlapping with the opening area HA_2 and extending along the edge of the opening MH_2, and thus it is possible to compensate areas (or sizes) of the first and second row sensing electrodes TP11_2 and TP12_2, which are reduced by the opening MH_2. As a result, it is possible to reduce or prevent a reduction in sensitivity to an external input in the opening area HA_2, and substantially uniform sensitivity may be provided in the whole active area of the sensing unit 220_2.

Figure 8A:
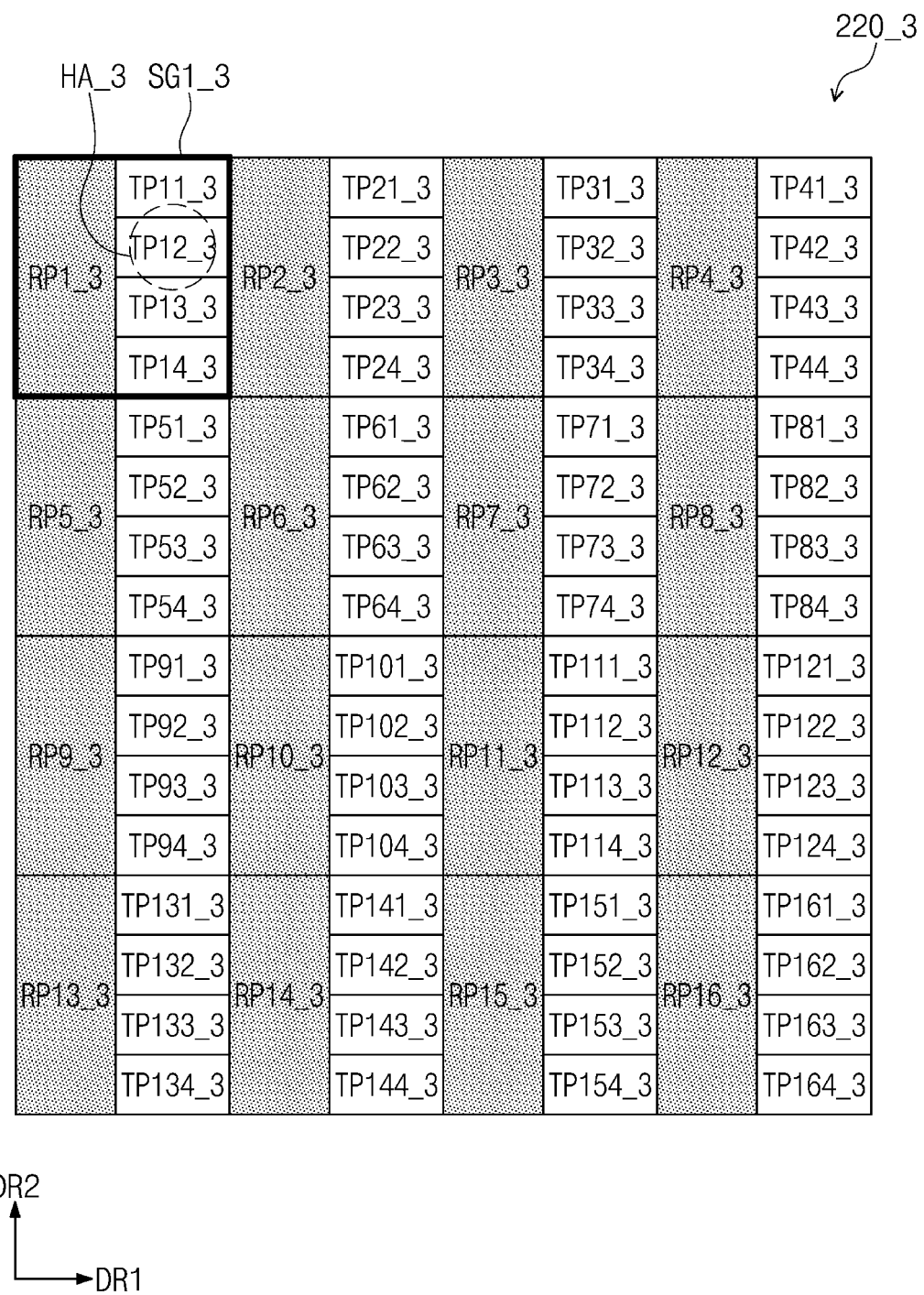
FIG. 8A is a plan view schematically illustrating a sensing unit according to an embodiment of the present disclosure.
Figure 8B:
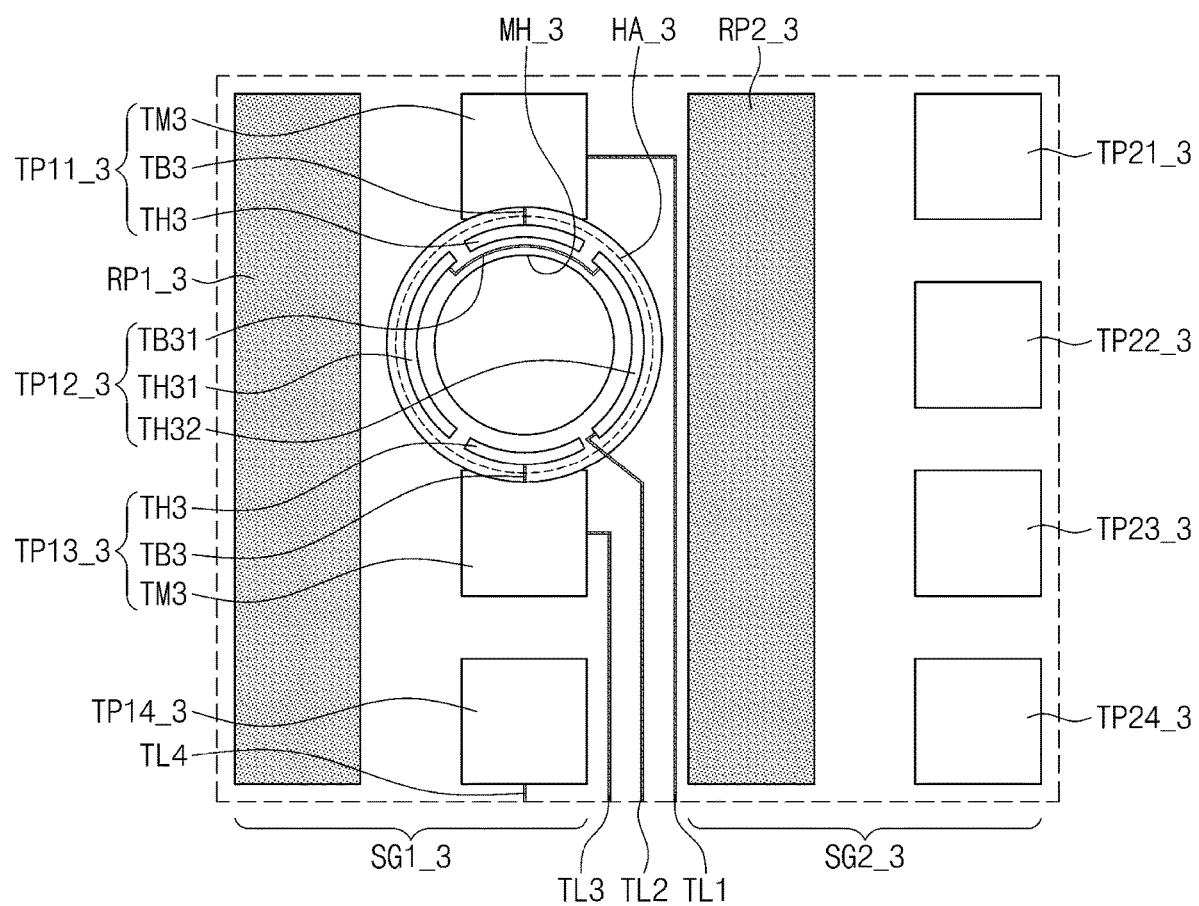
FIG. 8B is an enlarged plan view illustrating a portion of FIG. 8A.

FIG. 8A is a plan view schematically illustrating a sensing unit according to an embodiment of the present disclosure. FIG. 8B is an enlarged plan view illustrating a portion of FIG. 8A. FIG. 8A illustrates a schematic view corresponding to FIG. 5B. FIG. 8B illustrates a partial area in which an opening area HA_3 of FIG. 8A is provided, and some components are omitted in FIG. 8B. Hereinafter, an embodiment of the present disclosure will be described with reference to FIGS. 8A and 8B. In addition, the same components as described with reference to FIGS. 1A-7B will be indicated by the same reference numerals or designators, and the descriptions thereto will be omitted for the purpose of ease and convenience in description.

As illustrated in FIG. 8A, a sensing unit 220_3 according to an embodiment of the present disclosure may include 16 first sensing electrodes RP1_3 to RP16_3 and 64 second sensing electrodes TP11_3 to TP164_3. The first sensing electrodes RP1_3 to RP16_3 and the second sensing electrodes TP11_3 to TP164_3 may correspond to the first sensing electrodes RP1 to RP16 and the second sensing electrodes TP11 to TP164 of FIG. 5B, and thus detailed descriptions thereto are omitted.

In the present embodiment, the opening area HA_3 may overlap with a single sensing group. In the present embodiment, an opening MH_3 may penetrate a first sensing group SG1_3 and may be spaced apart from a second sensing group SG2_3. Also, the opening area HA_3 may overlap with a plurality of the second sensing electrodes.

FIG. 8B illustrates one first sensing electrode RP1_3 and four second sensing electrodes TP11_3, TP12_3, TP13_3 and TP14_3, which constitute the first sensing group SG1_3, and one first sensing electrode RP2_3 and four second sensing electrodes TP21_3, TP22_3, TP23_3 and TP24_3, which constitute the second sensing group SG2_3. Hereinafter, the second sensing electrodes TP11_3, TP12_3, TP13_3 and TP14_3 of the first sensing group SG1_3 may be referred to as first to fourth row sensing electrodes of the first sensing group. In the present embodiment, the opening area HA_3 may overlap with the first to third row sensing electrodes TP11_3, TP12_3 and TP13_3 of the first sensing group from among the sensing electrodes of the first sensing group SG1_3.

The first row sensing electrode TP11_3 of the first sensing group may overlap with the opening area HA_3 at a top side of the opening MH_3, and the third row sensing electrode TP13_3 of the first sensing group may overlap with the opening area HA_3 at a bottom side of the opening MH_3.

Each of the first and third row sensing electrodes TP11_3 and TP13_3 of the first sensing group SG1_3 may include a main pattern TM3, an opening pattern TH3, and a connection pattern TB3. The main pattern TM3, the opening pattern TH3 and the connection pattern TB3 may correspond to the main pattern TM, the opening pattern TH and the connection pattern TB of the second sensing electrode of FIG. 5C, respectively. Thus, duplicated descriptions are omitted.

In the present embodiment, the whole second row sensing electrode TP12_3 of the first sensing group SG1_3 may overlap with the opening area HA_3. Here, the second row sensing electrode TP12_3 of the first sensing group SG1_3 may include a plurality of opening patterns TH31 and TH32 and a connection pattern TB31.

The opening patterns TH31 and TH32 may be disposed in the opening area HA_3. The opening patterns TH31 and TH32 may be spaced apart from each other with the opening MH_3 interposed therebetween. In the present embodiment, the opening patterns TH31 and TH32 may be spaced apart from each other in the first direction DR1 and may face the opening MH_3.

Each of the opening patterns TH31 and TH32 may extend along a portion of an edge of the opening MH_3. Each of the opening patterns TH31 and TH32 may have an arc shape. However, embodiments of the present disclosure are not limited thereto. When the opening MH_3 has a polygonal shape or an elliptical shape in a plan view, the shapes of the opening patterns TH31 and TH32 may be variously suitably modified to correspond thereto.

The connection pattern TB31 may be disposed in the opening area HA_3 to connect the opening patterns TH31 and TH32. The connection pattern TB31 may extend along a portion of the edge of the opening MH_3. The opening patterns TH31 and TH32 spaced apart from each other with the opening MH_3 interposed therebetween may be electrically connected to each other through the connection pattern TB31.

Also, the opening patterns TH31 and TH32 and the connection pattern TB31 may be spaced apart from the opening patterns TH3 of the first and third row sensing electrodes TP11_3 and TP13_3 and may be electrically insulated from the opening patterns TH3 of the first and third row sensing electrodes TP11_3 and TP13_3. Thus, the first to third row sensing electrodes TP11_3, TP12_3 and TP13_3 may transmit/receive signals independent of each other.

According to the present embodiment, the sensing unit 220_3 may include the opening patterns TH3 overlapping with the opening area HA_3 and extending along the edge of the opening MH_3, and thus it is possible to compensate areas (or sizes) of the first and third row sensing electrodes TP11_3 and TP13_3, which are reduced by the opening MH_3. In addition, the sensing unit 220_3 may include the second row sensing electrode TP12_3 including the opening patterns TH31 and TH32 and the connection pattern TB31, and thus it is possible to reduce or prevent sensitivity to an external input from being reduced due to removal of one of the sensing electrodes by the opening MH_3. As a result, it is possible to reduce or prevent a reduction in sensitivity to an external input in the opening area HA_3, and substantially uniform sensitivity may be provided in the whole active area of the sensing unit 220_3.

Figure 9A:
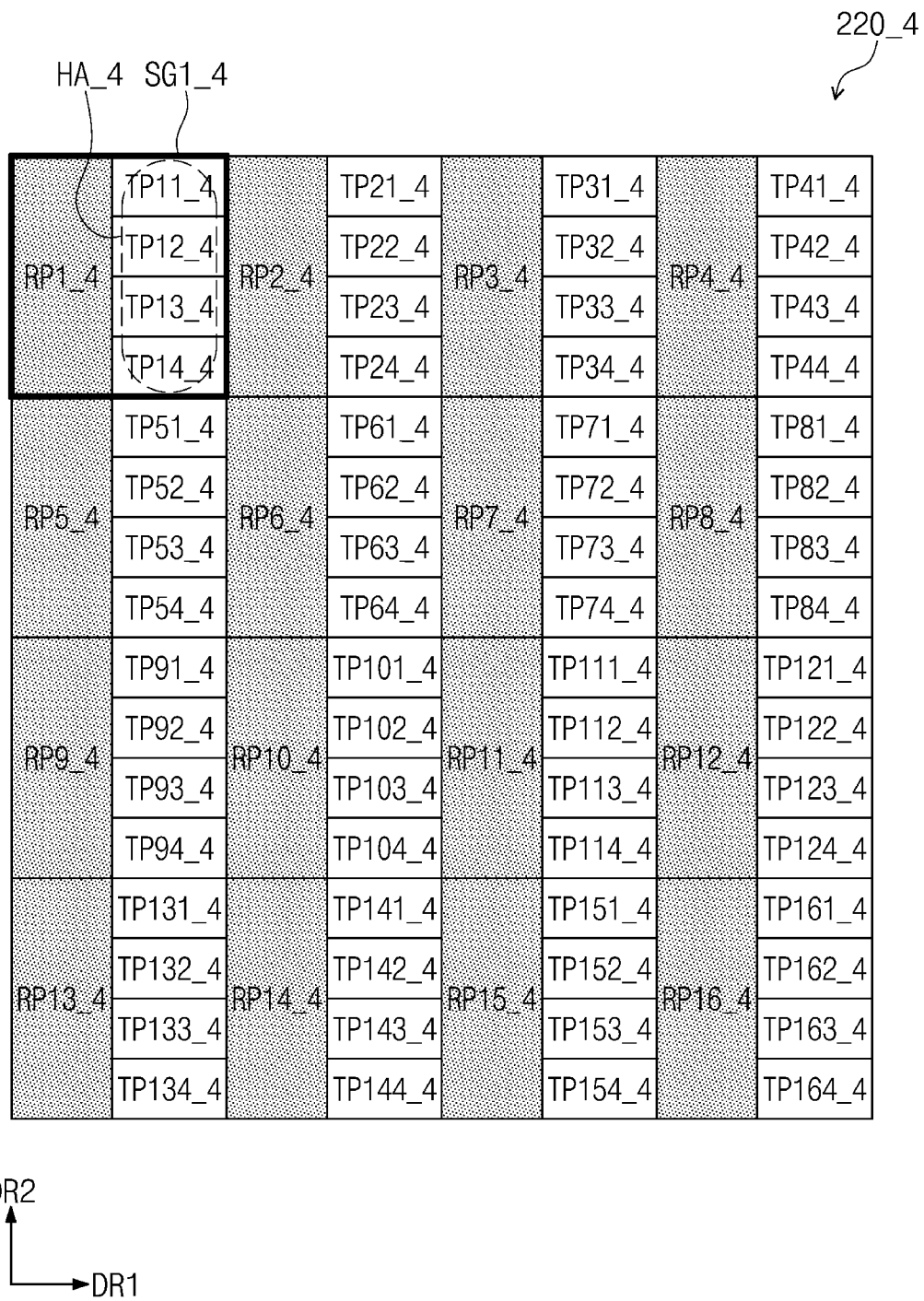
FIG. 9A is a plan view schematically illustrating a sensing unit according to an embodiment of the present disclosure.
Figure 9B:
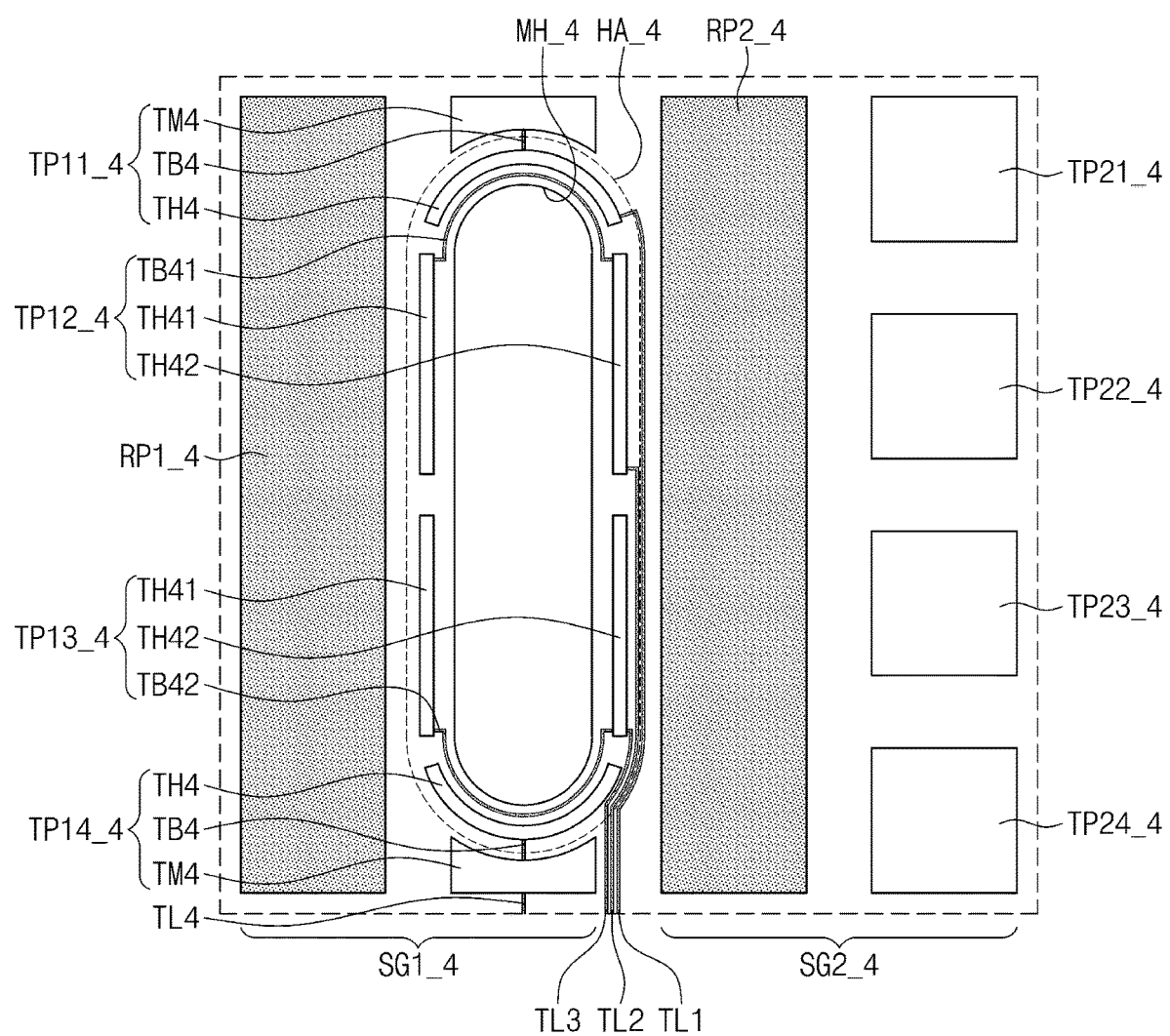
FIG. 9B is an enlarged plan view illustrating a portion of FIG. 9A.

FIG. 9A is a plan view schematically illustrating a sensing unit according to an embodiment of the present disclosure. FIG. 9B is an enlarged plan view illustrating a portion of FIG. 9A. FIG. 9A illustrates a schematic view corresponding to FIG. 5B. FIG. 9B illustrates a partial area in which an opening area HA_4 of FIG. 9A is provided, and some components are omitted in FIG. 9B. Hereinafter, an embodiment of the present disclosure will be described with reference to FIGS. 9A and 9B. In addition, the same components as described with reference to FIGS. 1A-8B will be indicated by the same reference numerals or designators, and the descriptions thereto will be omitted for the purpose of ease and convenience in description.

As illustrated in FIG. 9A, a sensing unit 220_4 according to an embodiment of the present disclosure may include 16 first sensing electrodes RP1_4 to RP16_4 and 64 second sensing electrodes TP11_4 to TP164_4. The first sensing electrodes RP1_4 to RP16_4 and the second sensing electrodes TP11_4 to TP164_4 may correspond to the first sensing electrodes RP1 to RP16 and the second sensing electrodes TP11 to TP164 of FIG. 5B, and thus detailed descriptions thereto are omitted.

In the present embodiment, the opening area HA_4 may overlap with a single sensing group. In the present embodiment, an opening MH_4 may penetrate a first sensing group SG1_4 and may be spaced apart from a second sensing group SG2_4. Also, the opening area HA_4 may overlap with a plurality of the second sensing electrodes.

FIG. 9B illustrates one first sensing electrode RP1_4 and four second sensing electrodes TP11_4, TP12_4, TP13_4 and TP14_4, which constitute the first sensing group SG1_4, and one first sensing electrode RP2_4 and four second sensing electrodes TP21_4, TP22_4, TP23_4 and TP24_4, which constitute the second sensing group SG2_4. Hereinafter, the second sensing electrodes TP11_4, TP12_4, TP13_4 and TP14_4 of the first sensing group SG1_4 may be referred to as first to fourth row sensing electrodes of the first sensing group. In the present embodiment, the opening area HA_4 may overlap with the first to fourth row sensing electrodes TP11_4, TP12_4, TP13_4 and TP14_4 of the first sensing group from among the sensing electrodes of the first sensing group SG1_4.

The first row sensing electrode TP11_4 of the first sensing group may overlap with the opening area HA_4 at a top side of the opening MH_4, and the fourth row sensing electrode TP14_4 of the first sensing group may overlap with the opening area HA_4 at a bottom side of the opening MH_4.

Each of the first and fourth row sensing electrodes TP11_4 and TP14_4 of the first sensing group SG1_4 may include a main pattern TM4, an opening pattern TH4, and a connection pattern TB4. The main pattern TM4, the opening pattern TH4 and the connection pattern TB4 may correspond to the main pattern TM, the opening pattern TH and the connection pattern TB of the second sensing electrode of FIG. 5C, respectively. Thus, duplicated descriptions are omitted.

In the present embodiment, each of the whole second and third row sensing electrodes TP12_4 and TP13_4 of the first sensing group SG1_4 may overlap with the opening area HA_4. Here, each of the second and third row sensing electrodes TP12_4 and TP13_4 of the first sensing group SG1_4 may include a plurality of opening patterns TH41 and TH42 and a connection pattern TB41 or TB42. The opening patterns TH41 and TH42 of the second row sensing electrode TP12_4 may be connected to each other through the connection pattern TB41 extending along the top side of the opening MH_4 in a plan view, and the opening patterns TH41 and TH42 of the third row sensing electrode TP13_4 may be connected to each other through the connection pattern TB42 extending along the bottom side of the opening MH_4 in a plan view.

The opening patterns TH41 and TH42 and the connection pattern TB41 or TB42 of each of the second and third row sensing electrodes TP12_4 and TP13_4 may correspond to the opening patterns TH31 and TH32 and the connection pattern TB31 of the second row sensing electrode TP12_3 of the first sensing group illustrated in FIG. 8B, respectively, and thus detailed descriptions thereto are omitted.

According to the present embodiment, the sensing unit 220_4 may include the opening patterns TH41 and TH42 overlapping with the opening area HA_4 and extending along an edge of the opening MH_4, and thus it is possible to compensate areas (or sizes) of the sensing electrodes, which are reduced by the opening MH_4. According to the embodiments of the present disclosure, even though the size and/or the shape of the opening is variously suitably modified, a reduction in sensitivity to an external input in the opening area HA_4 may be (e.g., easily) reduced or prevented, and substantially uniform sensitivity may be provided in the whole active area of the sensing unit 220_4.

Figure 10A:
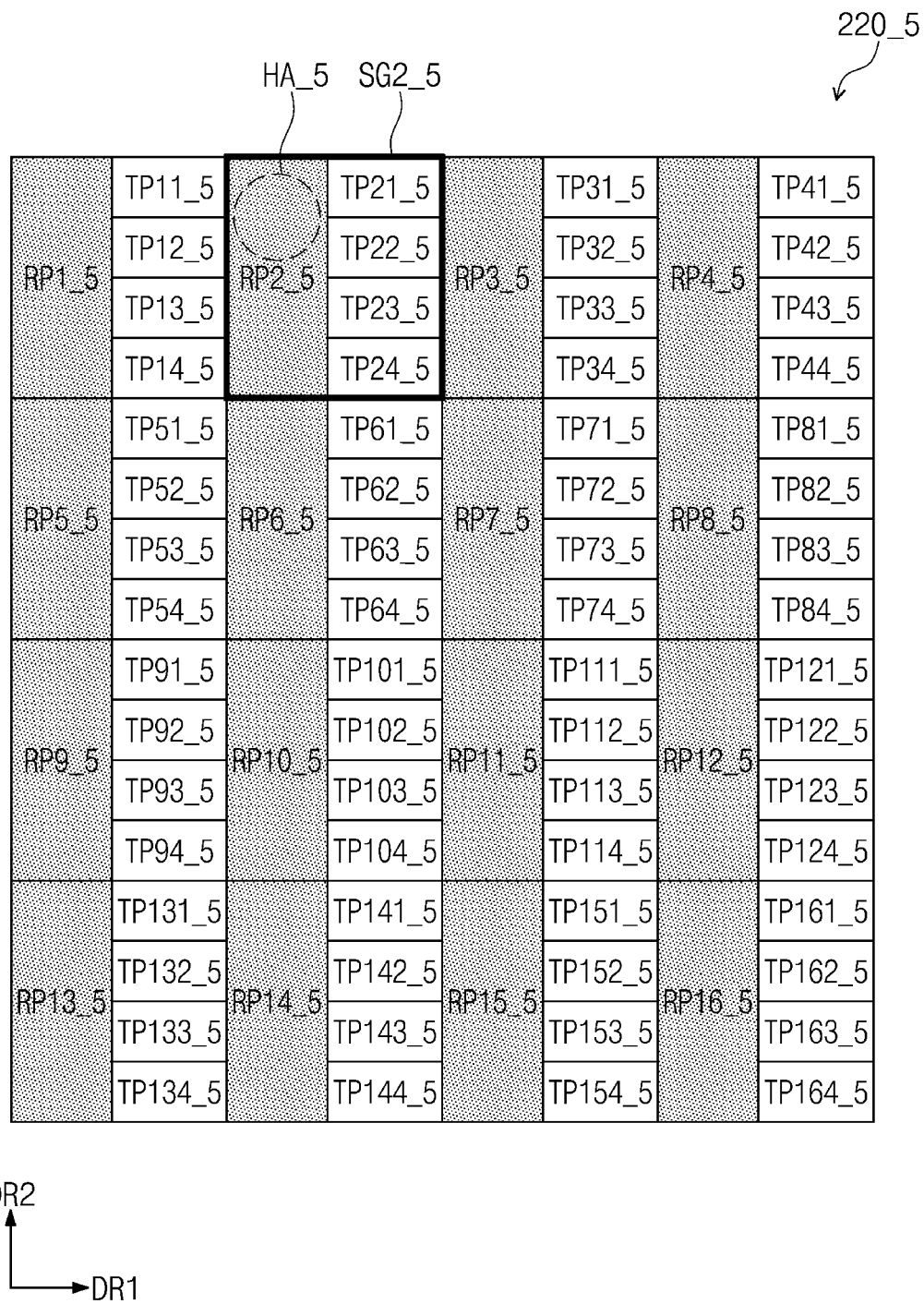
FIG. 10A is a plan view schematically illustrating a sensing unit according to an embodiment of the present disclosure.
Figure 10B:
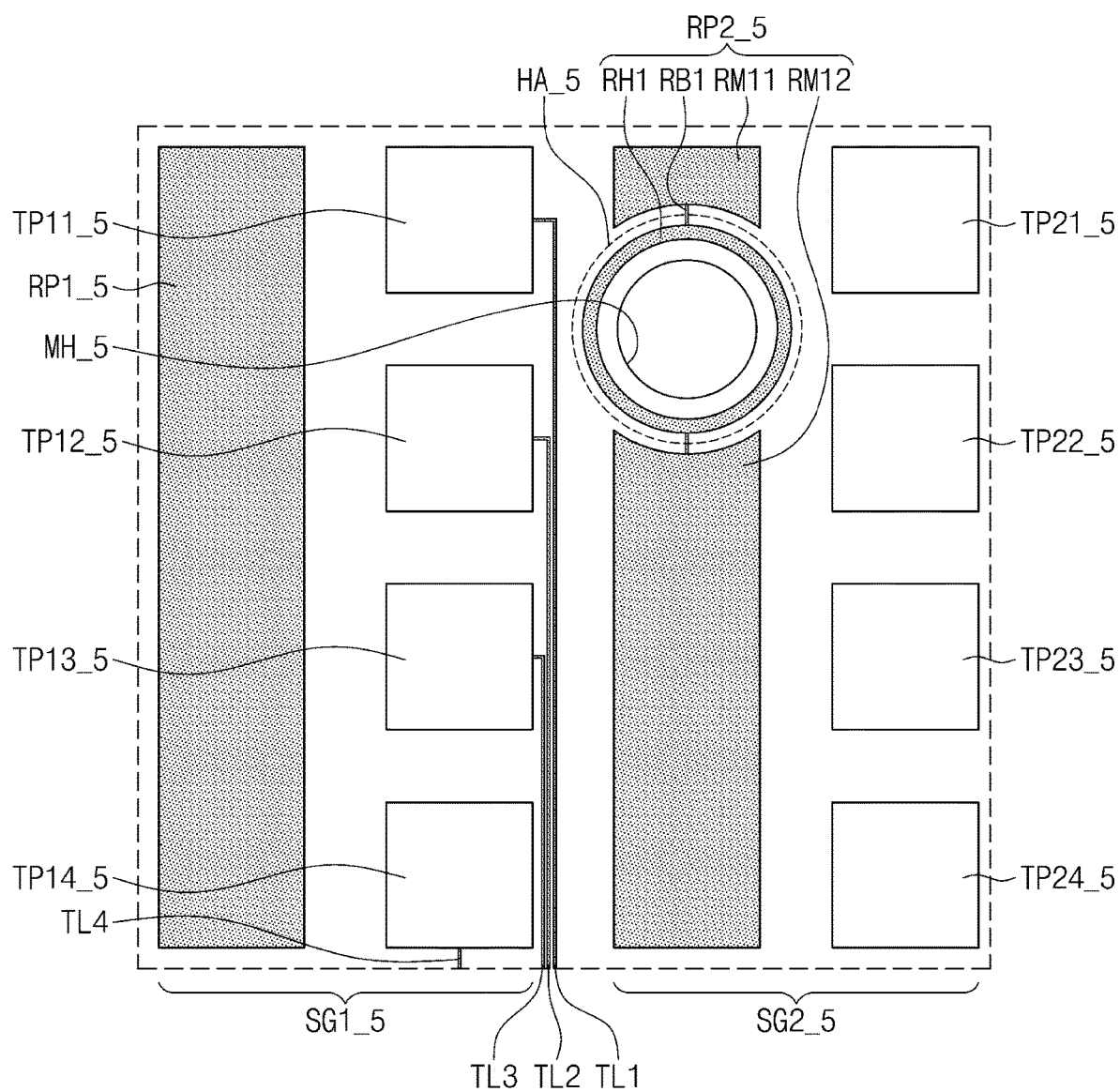
FIG. 10B is an enlarged plan view illustrating a portion of FIG. 10A.

FIG. 10A is a plan view schematically illustrating a sensing unit according to an embodiment of the present disclosure. FIG. 10B is an enlarged plan view illustrating a portion of FIG. 10A. FIG. 10A illustrates a schematic view corresponding to FIG. 5B. FIG. 10B illustrates a partial area in which an opening area HA_5 of FIG. 10A is provided, and some components are omitted in FIG. 10B. Hereinafter, an embodiment of the present disclosure will be described with reference to FIGS. 10A and 10B. In addition, the same components as described with reference to FIGS. 1A-9B will be indicated by the same reference numerals or designators, and the descriptions thereto will be omitted for the purpose of ease and convenience in description.

As illustrated in FIG. 10A, a sensing unit 220_5 according to an embodiment of the present disclosure may include 16 first sensing electrodes RP1_5 to RP16_5 and 64 second sensing electrodes TP11_5 to TP164_5. The first sensing electrodes RP1_5 to RP16_5 and the second sensing electrodes TP11_5 to TP164_5 may correspond to the first sensing electrodes RP1 to RP16 and the second sensing electrodes TP11 to TP164 of FIG. 5B, and thus detailed descriptions thereto are omitted.

According to some embodiments of the present disclosure, a position of the opening area HA_5 may be variously suitably changed. In the present embodiment, an opening MH_5 may penetrate a second sensing group SG2_5 and may be spaced apart from a first sensing group SG1_5.

FIG. 10B illustrates one first sensing electrode RP1_5 and four second sensing electrodes TP11_5, TP12_5, TP13_5 and TP14_5, which constitute the first sensing group SG1_5, and one first sensing electrode RP2_5 and four second sensing electrodes TP21_5, TP22_5, TP23_5 and TP24_5, which constitute the second sensing group SG2_5. In the present embodiment, the opening area HA_5 may overlap with the first sensing electrode RP2_5 of the sensing electrodes of the second sensing group SG2_5.

The opening MH_5 may penetrate a portion of the first sensing electrode RP2_5 of the second sensing group SG2_5. The opening area HA_5 may be spaced apart from the second sensing electrodes TP21_5, TP22_5, TP23_5 and TP24_5 of the second sensing group SG2_5 and may overlap with only the first sensing electrode RP2_5 of the second sensing group SG2_5. The first sensing electrode RP2_5 of the second sensing group SG2_5 may include a plurality of main patterns RM11 and RM12, an opening pattern RH1, and a connection pattern RB1.

The main patterns RM11 and RM12 may be spaced apart from the opening area HA_5. The main patterns RM11 and RM12 may be spaced apart from each other in the second direction DR2 with the opening MH_5 interposed therebetween. The main patterns RM11 and RM12 may face an edge of the opening area HA_5 at a top side and a bottom side of the opening MH_5, respectively, when viewed in a plan view.

The opening pattern RH1 may be spaced apart from the main patterns RM11 and RM12 and may be disposed in the opening area HA_5. The opening pattern RH1 may extend along at least a portion of the edge of the opening MH_5. In an embodiment, the opening pattern RH1 may have a closed loop shape surrounding the opening MH_5 when viewed in a plan view. In the present embodiment, for example, the opening pattern RH1 has a ring shape surrounding the edge of the opening MH_5 having a circular shape.

The connection pattern RB1 may connect each of the main patterns RM11 and RM12 to the opening pattern RH1 via the opening area HA_5. The connection pattern RB1 may be provided in plurality, and the plurality of connection patterns RB1 may be disposed at the top side and the bottom side of the opening MH_5, respectively. However, embodiments of the present disclosure are not limited thereto. In the sensing unit 220_5 according to another embodiment, the connection pattern RB1 may be omitted and the opening pattern RH1 may be connected directly to the main patterns RM11 and RM12.

According to the present embodiment, the sensing unit 220_5 may include the opening pattern RH1 overlapping with the opening area HA_5 and extending along the edge of the opening MH_5, and thus it is possible to compensate an area (or size) of the first sensing electrode RP2_5, which is reduced by the opening MH_5. As a result, it is possible to reduce or prevent a reduction in sensitivity to an external input in the opening area HA_5, and substantially uniform sensitivity may be provided in the whole active area of the sensing unit 220_5.

Figure 11A:
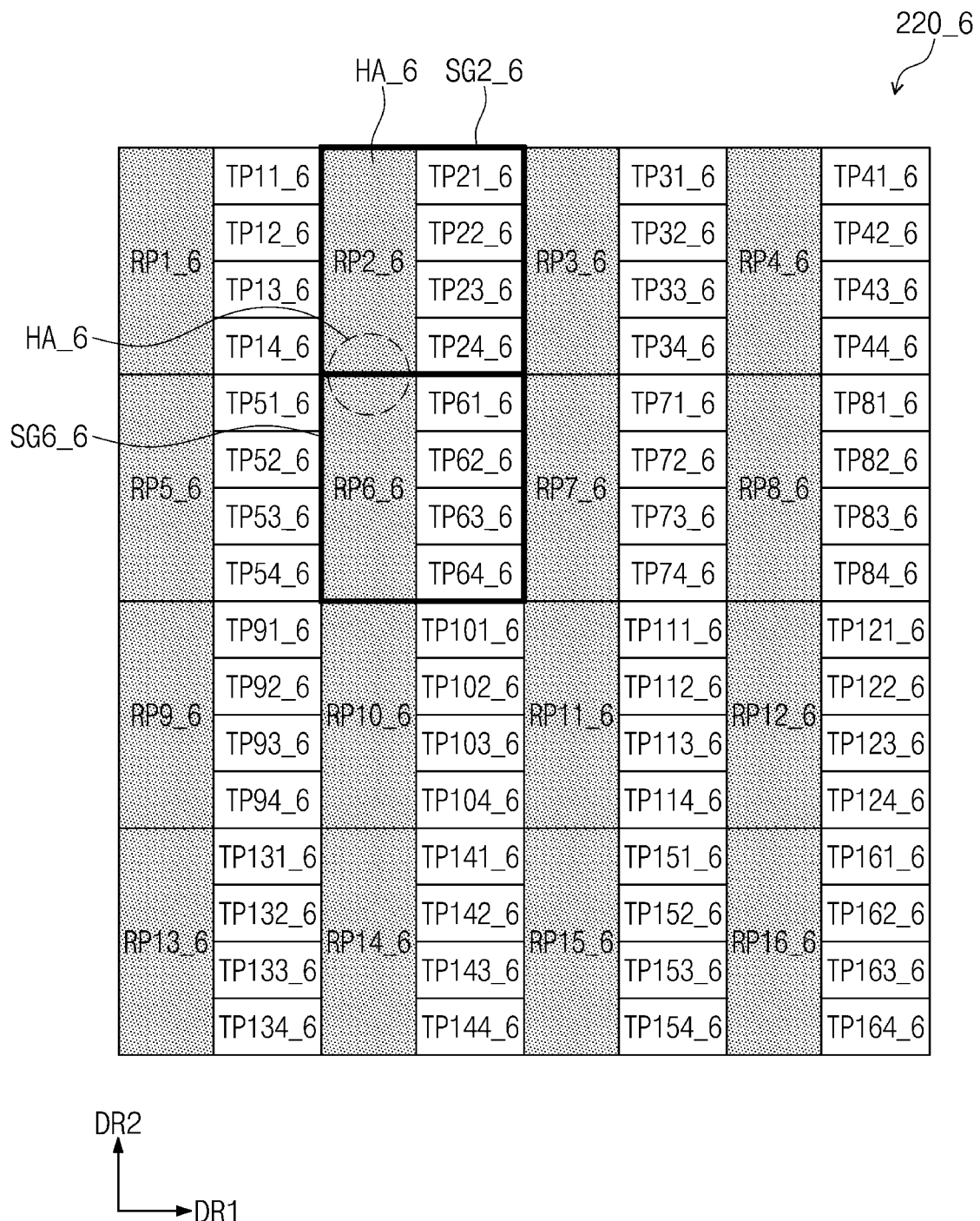
FIG. 11A is a plan view schematically illustrating a sensing unit according to an embodiment of the present disclosure.
Figure 11B:
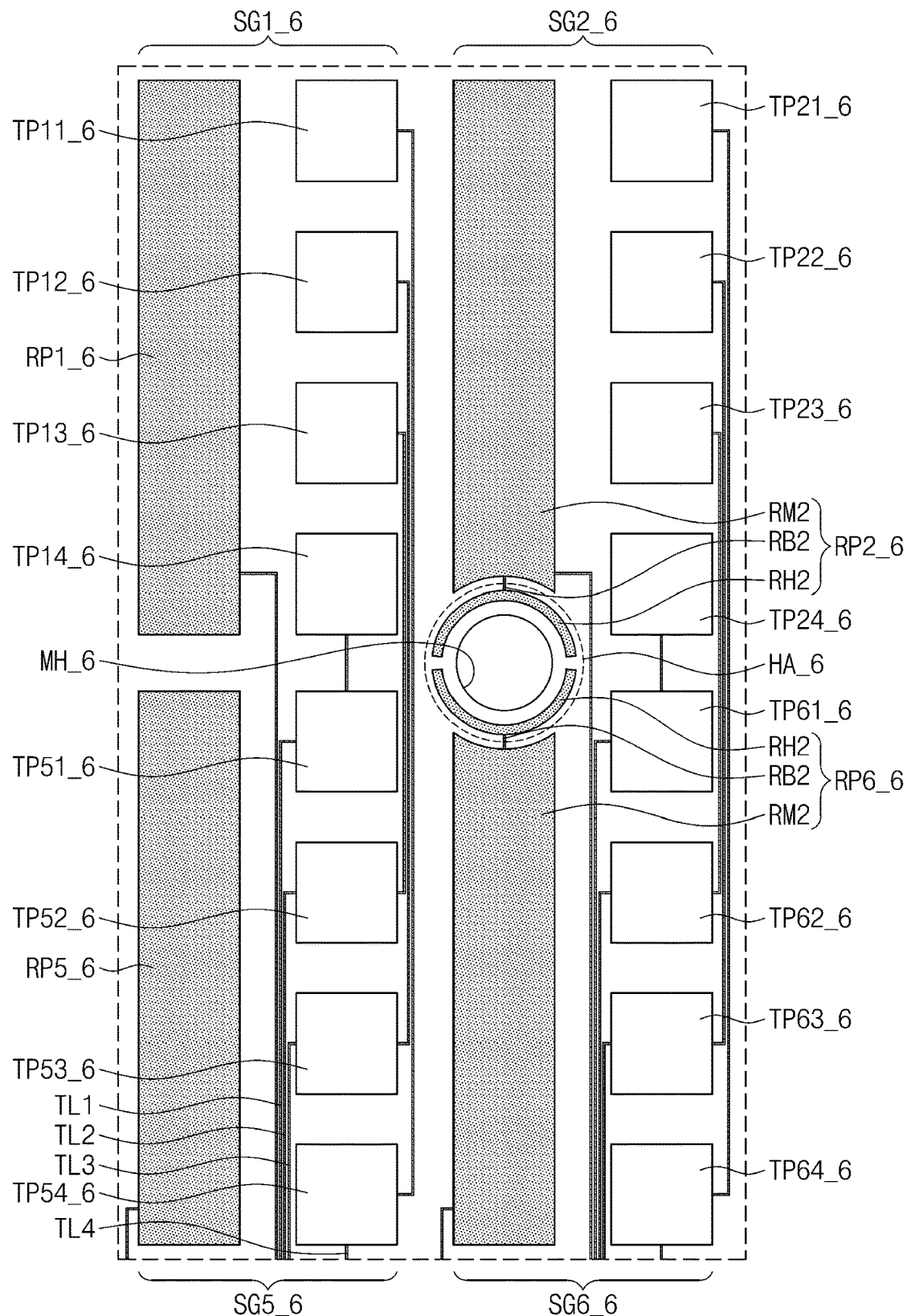
FIG. 11B is an enlarged plan view illustrating a portion of FIG. 11A.

FIG. 11A is a plan view schematically illustrating a sensing unit according to an embodiment of the present disclosure. FIG. 11B is an enlarged plan view illustrating a portion of FIG. 11A. FIG. 11A illustrates a schematic view corresponding to FIG. 5B. FIG. 11B illustrates a partial area in which an opening area HA_6 of FIG. 11A is provided, and some components are omitted in FIG. 11B. Hereinafter, an embodiment of the present disclosure will be described with reference to FIGS. 11A and 11B. In addition, the same components as described with reference to FIGS. 1A-10B will be indicated by the same reference numerals or designators, and the descriptions thereto will be omitted for the purpose of ease and convenience in description.

As illustrated in FIG. 11A, a sensing unit 220_6 according to an embodiment of the present disclosure may include 16 first sensing electrodes RP1_6 to RP16_6 and 64 second sensing electrodes TP11_6 to TP164_6. The first sensing electrodes RP1_6 to RP16_6 and the second sensing electrodes TP11_6 to TP164_6 may correspond to the first sensing electrodes RP1 to RP16 and the second sensing electrodes TP11 to TP164 of FIG. 5B, and thus detailed descriptions thereto are omitted.

According to some embodiments of the present disclosure, a position of the opening area HA_6 may be variously suitably changed. In the present embodiment, an opening MH_6 may penetrate both a second sensing group SG2_6 and a sixth sensing group SG6_6.

FIG. 11B illustrates one first sensing electrode RP1_6 and four second sensing electrodes TP11_6, TP12_6, TP13_6 and TP14_6, which constitute a first sensing group SG1_6, and one first sensing electrode RP2_6 and four second sensing electrodes TP21_6, TP22_6, TP23_6 and TP24_6, which constitute the second sensing group SG2_6. In addition, FIG. 11B illustrates one first sensing electrode RP5_6 and four second sensing electrodes TP51_6, TP52_6, TP53_6 and TP54_6, which constitute a fifth sensing group SG5_6, and one first sensing electrode RP6_6 and four second sensing electrodes TP61_6, TP62_6, TP63_6 and TP64_6, which constitute the sixth sensing group SG6_6.

In the present embodiment, the opening area HA_6 may overlap with the first sensing electrode RP2_6 of the second sensing group SG2_6 and the first sensing electrode RP6_6 of the sixth sensing group SG6_6. The opening MH_6 may penetrate a portion of the first sensing electrode RP2_6 of the second sensing group SG2_6 and a portion of the first sensing electrode RP6_6 of the sixth sensing group SG6_6. Each of the first sensing electrode RP2_6 of the second sensing group SG2_6 and the first sensing electrode RP6_6 of the sixth sensing group SG6_6 may include a main pattern RM2, an opening pattern RH2, and a connection pattern RB2.

The main patterns RM2 of the first sensing electrode RP2_6 of the second sensing group SG2_6 and the first sensing electrode RP6_6 of the sixth sensing group SG6_6 may be spaced apart from each other in the second direction DR2 with the opening MH_6 interposed therebetween. The opening patterns RH2 of the first sensing electrode RP2_6 of the second sensing group SG2_6 and the first sensing electrode RP6_6 of the sixth sensing group SG6_6 may be disposed in the opening area HA_6 and may be spaced apart from each other in the second direction DR2 with the opening MH_6 interposed therebetween. The opening patterns RH2 of the first sensing electrode RP2_6 of the second sensing group SG2_6 and the first sensing electrode RP6_6 of the sixth sensing group SG6_6 may have shapes extending along the edge of the opening MH_6 and may be electrically insulated from each other.

According to the present embodiment, the sensing unit 220_6 may include the opening patterns RH2 overlapping with the opening area HA_6 and extending along the edge of the opening MH_6, and thus it is possible to compensate areas (or sizes) of the sensing electrodes, which are reduced by the opening MH_6. According to the present embodiment, even though the opening MH_6 penetrates the plurality of sensing groups, a reduction in sensitivity to an external input in the opening area HA_6 may be (e.g., easily) reduced or prevented, and substantially uniform sensitivity may be provided in the whole active area of the sensing unit 220_6.

Figure 12A:
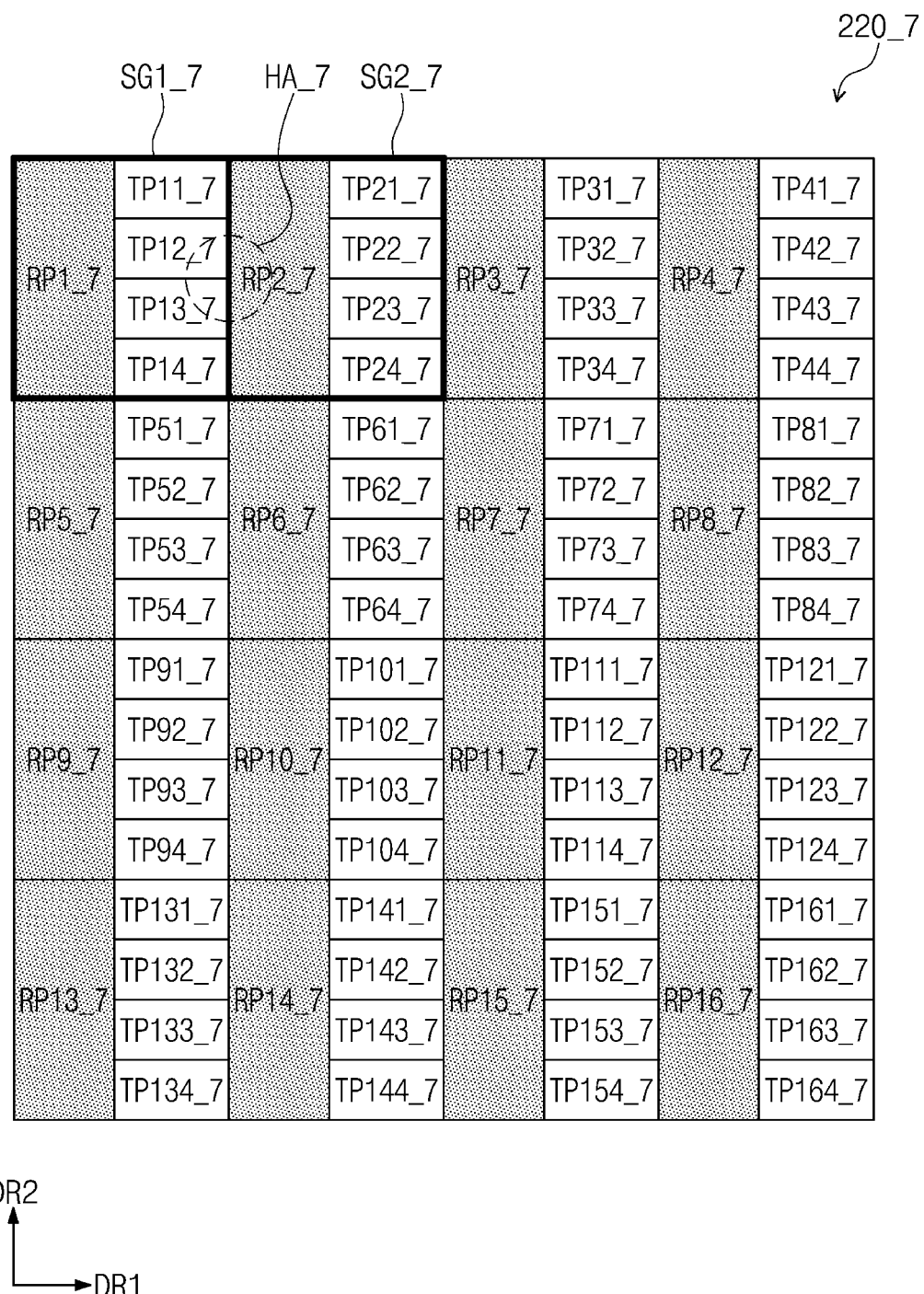
FIG. 12A is a plan view schematically illustrating a sensing unit according to an embodiment of the present disclosure.
Figure 12B:
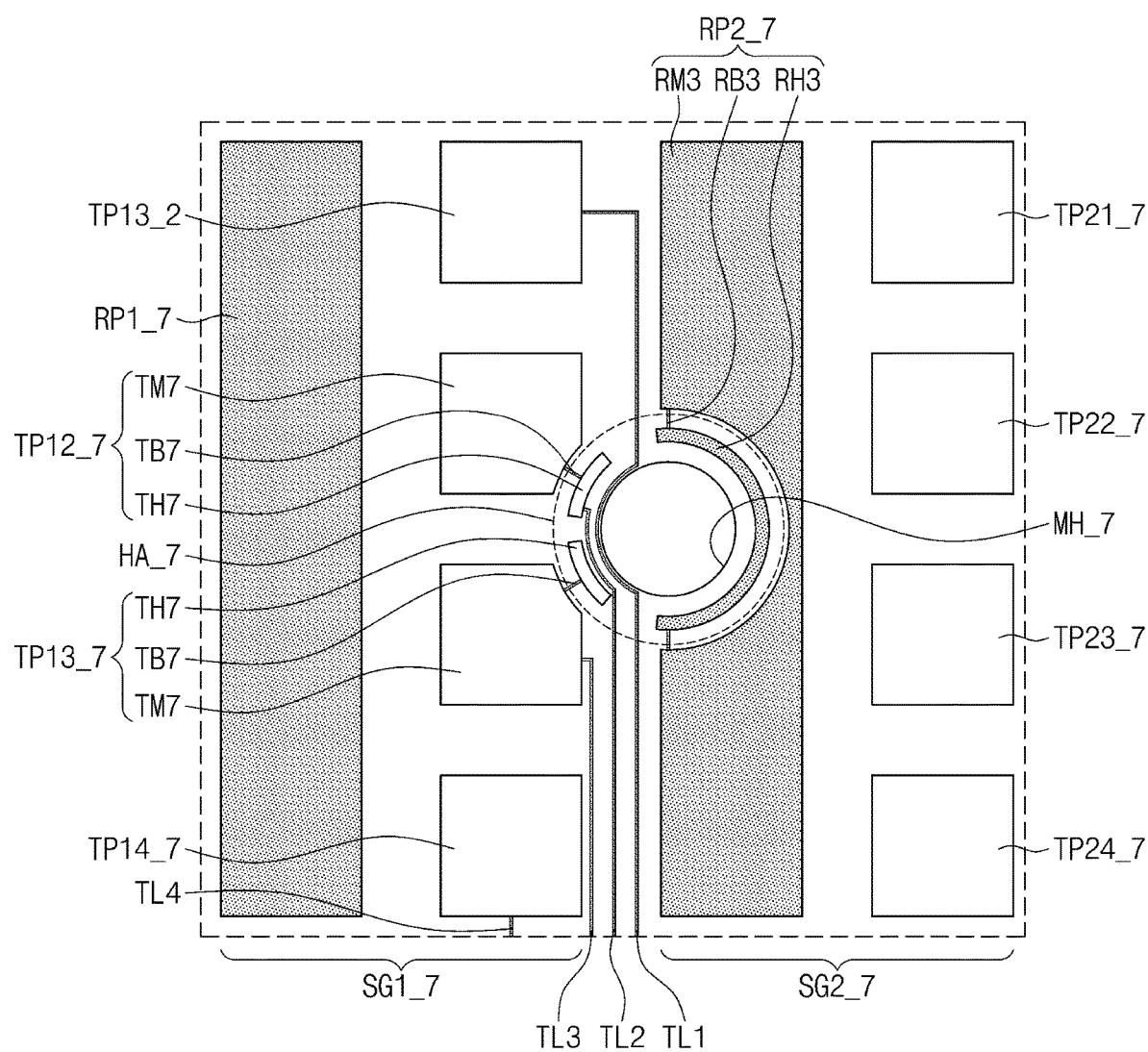
FIG. 12B is an enlarged plan view illustrating a portion of FIG. 12A.

FIG. 12A is a plan view schematically illustrating a sensing unit according to an embodiment of the present disclosure. FIG. 12B is an enlarged plan view illustrating a portion of FIG. 12A. FIG. 12A illustrates a schematic view corresponding to FIG. 5B. FIG. 12B illustrates a partial area in which an opening area HA_7 of FIG. 12A is provided, and some components are omitted in FIG. 12B. Hereinafter, an embodiment of the present disclosure will be described with reference to FIGS. 12A and 12B. In addition, the same components as described with reference to FIGS. 1A-11B will be indicated by the same reference numerals or designators, and the descriptions thereto will be omitted for the purpose of ease and convenience in description.

As illustrated in FIG. 12A, a sensing unit 220_7 according to an embodiment of the present disclosure may include 16 first sensing electrodes RP1_7 to RP16_7 and 64 second sensing electrodes TP11_7 to TP164_7. The first sensing electrodes RP1_7 to RP16_7 and the second sensing electrodes TP11_7 to TP164_7 may correspond to the first sensing electrodes RP1 to RP16 and the second sensing electrodes TP11 to TP164 of FIG. 5B, and thus detailed descriptions thereto are omitted.

According to some embodiments of the present disclosure, a position of the opening area HA_7 may be variously suitably changed. In the present embodiment, an opening MH_7 may penetrate both a first sensing group SG1_7 and a second sensing group SG2_7. For example, the opening area HA_7 may overlap with second and third row sensing electrodes TP12_7 and TP13_7 of the first sensing group SG1_7 and a first sensing electrode RP2_7 of the second sensing group SG2_7.

According to the present embodiment, each of the second and third row sensing electrodes TP12_7 and TP13_7 of the first sensing group SG1_7 may include a main pattern TM7, an opening pattern TH7, and a connection pattern TB7, and the first sensing electrode RP2_7 of the second sensing group SG2_7 may include a main pattern RM3, an opening pattern RH3, and a connection pattern RB3.

The opening patterns TH7 of the second and third row sensing electrodes TP12_7 and TP13_7 of the first sensing group SG1_7 and the opening pattern RH3 of the first sensing electrode RP2_7 of the second sensing group SG2_7 may compensate areas (or sizes) of the second and third row sensing electrodes TP12_7 and TP13_7 and the first sensing electrode RP2_7 of the second sensing group SG2_7, which are reduced by the opening MH_7. Thus, substantially uniform sensitivity may be provided in the whole active area of the sensing unit 220_7.

Figure 13A:
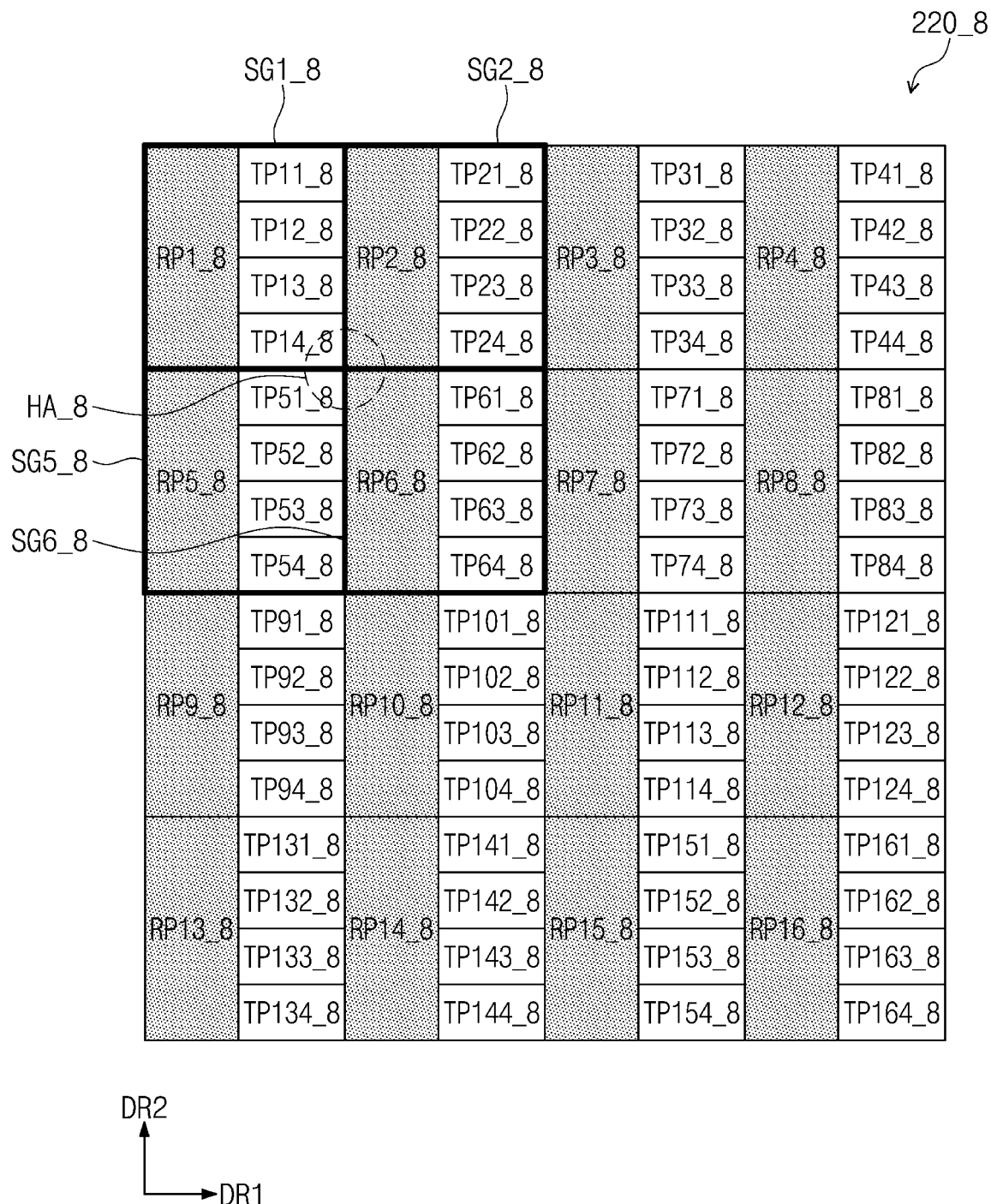
FIG. 13A is a plan view schematically illustrating a sensing unit according to an embodiment of the present disclosure.
Figure 13B:
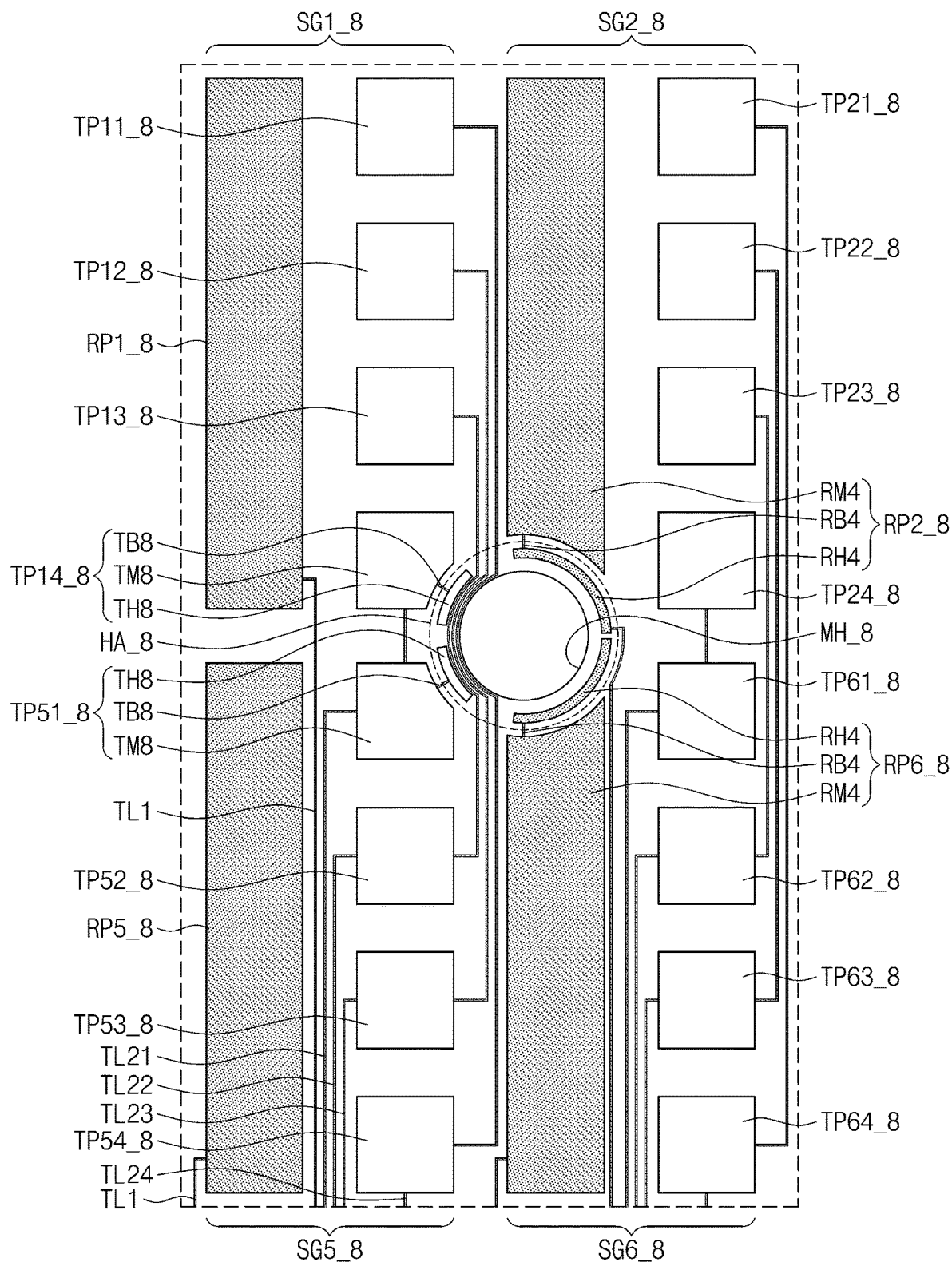
FIG. 13B is an enlarged plan view illustrating a portion of FIG. 13A.

FIG. 13A is a plan view schematically illustrating a sensing unit according to an embodiment of the present disclosure. FIG. 13B is an enlarged plan view illustrating a portion of FIG. 13A. FIG. 13A illustrates a schematic view corresponding to FIG. 5B. FIG. 13B illustrates a partial area in which an opening area HA_8 of FIG. 13A is provided, and some components are omitted in FIG. 13B. Hereinafter, an embodiment of the present disclosure will be described with reference to FIGS. 13A and 13B. In addition, the same components as described with reference to FIGS. 1A-12B will be indicated by the same reference numerals or designators, and the descriptions thereto will be omitted for the purpose of ease and convenience in description.

As illustrated in FIG. 13A, a sensing unit 220_8 according to an embodiment of the present disclosure may include 16 first sensing electrodes RP1_8 to RP16_8 and 64 second sensing electrodes TP11_8 to TP164_8. The first sensing electrodes RP1_8 to RP16_8 and the second sensing electrodes TP11_8 to TP164_8 may correspond to the first sensing electrodes RP1 to RP16 and the second sensing electrodes TP11 to TP164 of FIG. 5B, and thus detailed descriptions thereto are omitted.

According to some embodiments of the present disclosure, a position of the opening area HA_8 may be variously suitably changed. In the present embodiment, an opening MH_8 may penetrate four sensing groups. For example, the opening area HA_8 may overlap with a fourth row sensing electrode TP14_8 of a first sensing group SG1_8, a first sensing electrode RP2_8 of a second sensing group SG2_8, a first row sensing electrode TP51_8 of a fifth sensing group SG5_8, and a first sensing electrode RP6_8 of a sixth sensing group SG6_8.

According to the present embodiment, the four sensing groups SG1_8, SG2_8, SG5_8 and SG6_8 may include opening patterns TH8 and RH4, respectively, and thus it is possible to compensate areas (or sizes) of the sensing electrodes, which are reduced by the opening MH_8. According to the embodiments of the present disclosure, substantially uniform sensitivity may be provided in the whole active area of the sensing unit 220_8 regardless of a position of the opening area HA_8.

Figure 14A:
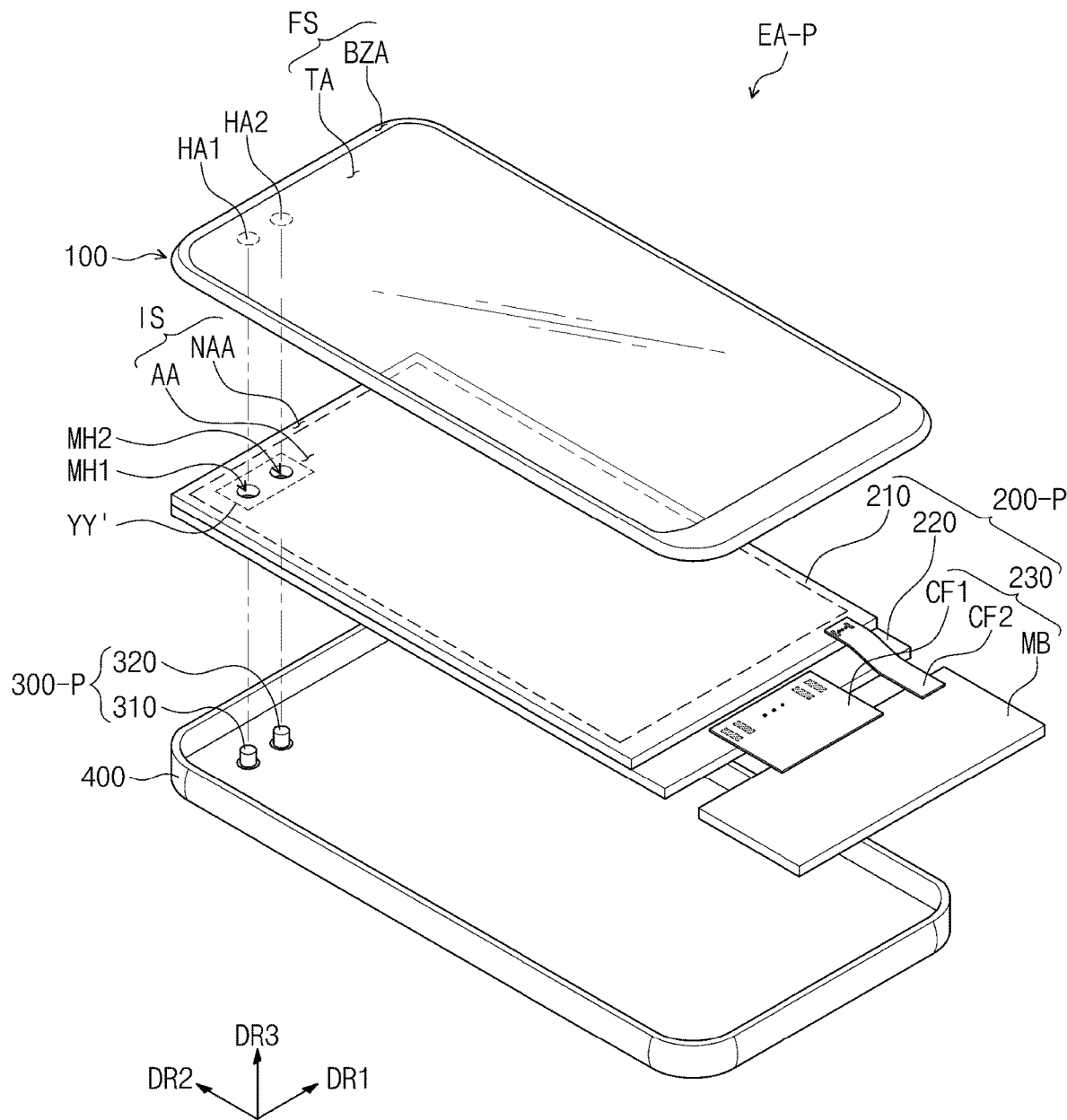
FIG. 14A is an exploded perspective view illustrating an electronic apparatus according to an embodiment of the present disclosure.
Figure 14B:
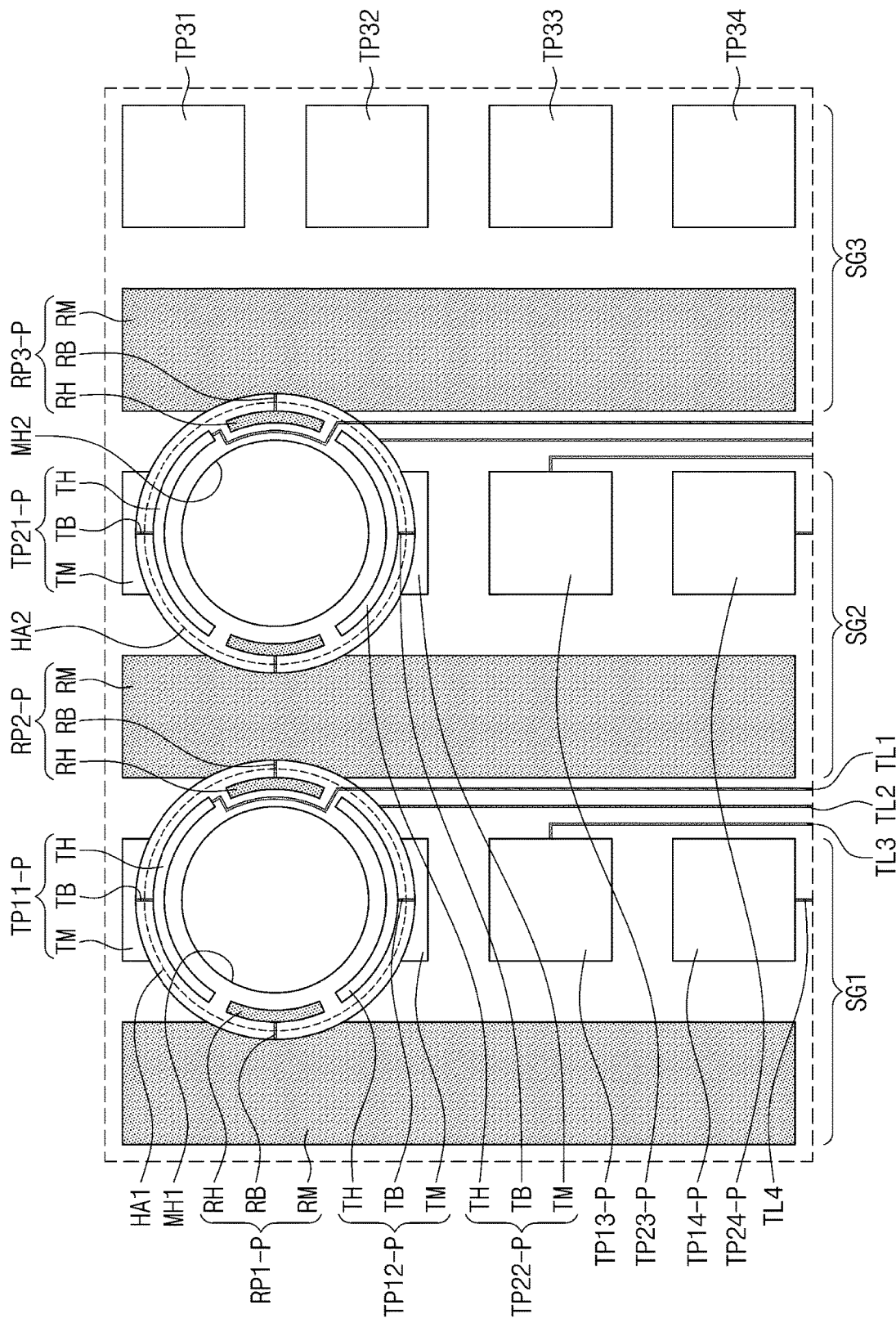
FIG. 14B is a plan view illustrating some components of FIG. 14A.

FIG. 14A is an exploded perspective view illustrating an electronic apparatus according to an embodiment of the present disclosure. FIG. 14B is a plan view illustrating some components of FIG. 14A. For the purpose of ease and convenience in description and illustration, FIG. 14B illustrates an area YY' of FIG. 14A and some components are omitted in FIG. 14B. Hereinafter, an embodiment of the present disclosure will be described with reference to FIGS. 14A and 14B. In addition, the same components as described with reference to FIGS. 1A-13B will be indicated by the same reference numerals or designators, and the descriptions thereto will be omitted.

As illustrated in FIG. 14A, an electronic apparatus EA-P may include an electronic panel 200-P in which a plurality of openings MH1 and MH2 is defined. The openings MH1 and MH2 may include a first opening MH1 and a second opening MH2. The first opening MH1 and the second opening MH2 may be spaced apart from each other in the first direction DR1.

An electronic module 300-P may include a first module 310 and a second module 320. The first module 310 may overlap with the first opening MH1, and the second module 320 may overlap with the second opening MH2. The first module 310 may be exposed through the first opening MH1 even though the first module 310 overlaps with the active area AA, and thus the first module 310 may receive an external signal through a first opening area HA1 and/or may provide a processed signal to the outside through the first opening area HA1. In addition, the second module 320 may be exposed through the second opening MH2 even though the second module 320 overlaps with the active area AA, and thus the second module 320 may receive an external signal through a second opening area HA2 and/or may provide a processed signal to the outside through the second opening area HA2.

FIG. 14B illustrates some components of a sensing unit 220-P. FIG. 14B illustrates one first sensing electrode RP1-P and four second sensing electrodes TP11-P, TP12-P, TP13-P and TP14-P, which constitute a first sensing group SG1, one first sensing electrode RP2-P and four second sensing electrodes TP21-P, TP22-P, TP23-P and TP24-P, which constitute a second sensing group SG2, and one first sensing electrode RP3-P and four second sensing electrodes TP31, TP32, TP33 and TP34, which constitute a third sensing group SG3.

The components illustrated in FIG. 14B may substantially correspond to an embodiment in which the plurality of openings MH1 and MH2 and the plurality of opening areas HA1 and HA2 are defined in the first and second sensing groups SG1 and SG2 illustrated in FIG. 5C. The first opening MH1 and the first opening area HA1 according to the present embodiment may correspond to the opening MH and the opening area HA of FIG. 5C, and thus detailed descriptions thereto are omitted.

Also, according to the present embodiment, the second opening MH2 may further penetrate the second sensing group SG2. In other words, the second sensing group SG2 may overlap with both the first opening area HA1 and the second opening area HA2.

Thus, the first sensing electrode RP2-P of the second sensing group SG2 may include an opening pattern RH which faces the first opening MH1 at a left side of a main pattern RM and is disposed in the first opening area HA1, and an opening pattern RH which faces the second opening MH2 at a right side of the main pattern RM and is disposed in the second opening area HA2. The opening patterns RH of the first sensing electrode RP2-P may be connected to one main pattern RM of the first sensing electrode RP2-P through connection patterns RB.

According to the present embodiment, the electronic panel 200-P in which the plurality of openings MH1 and MH2 is defined may include the opening patterns corresponding to each of the opening areas HA1 and HA2, and thus reductions in sensitivity in the opening areas HA1 and HA2 may be reduced or prevented and substantially uniform sensitivity may be provided in the whole active area AA.

Figure 15A:
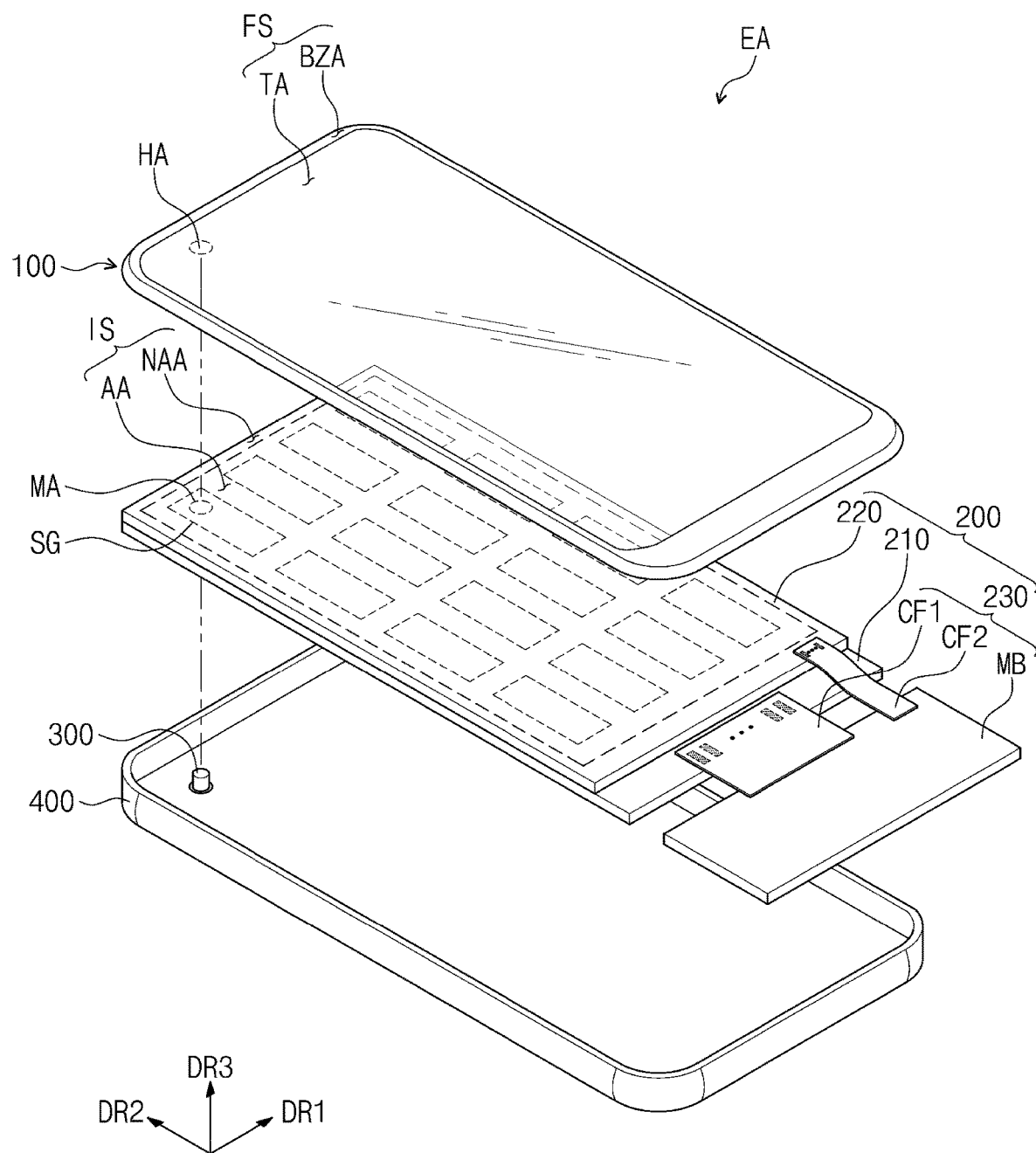
FIG. 15A is an exploded perspective view illustrating an electronic apparatus according to an embodiment of the present disclosure.
Figure 15B:
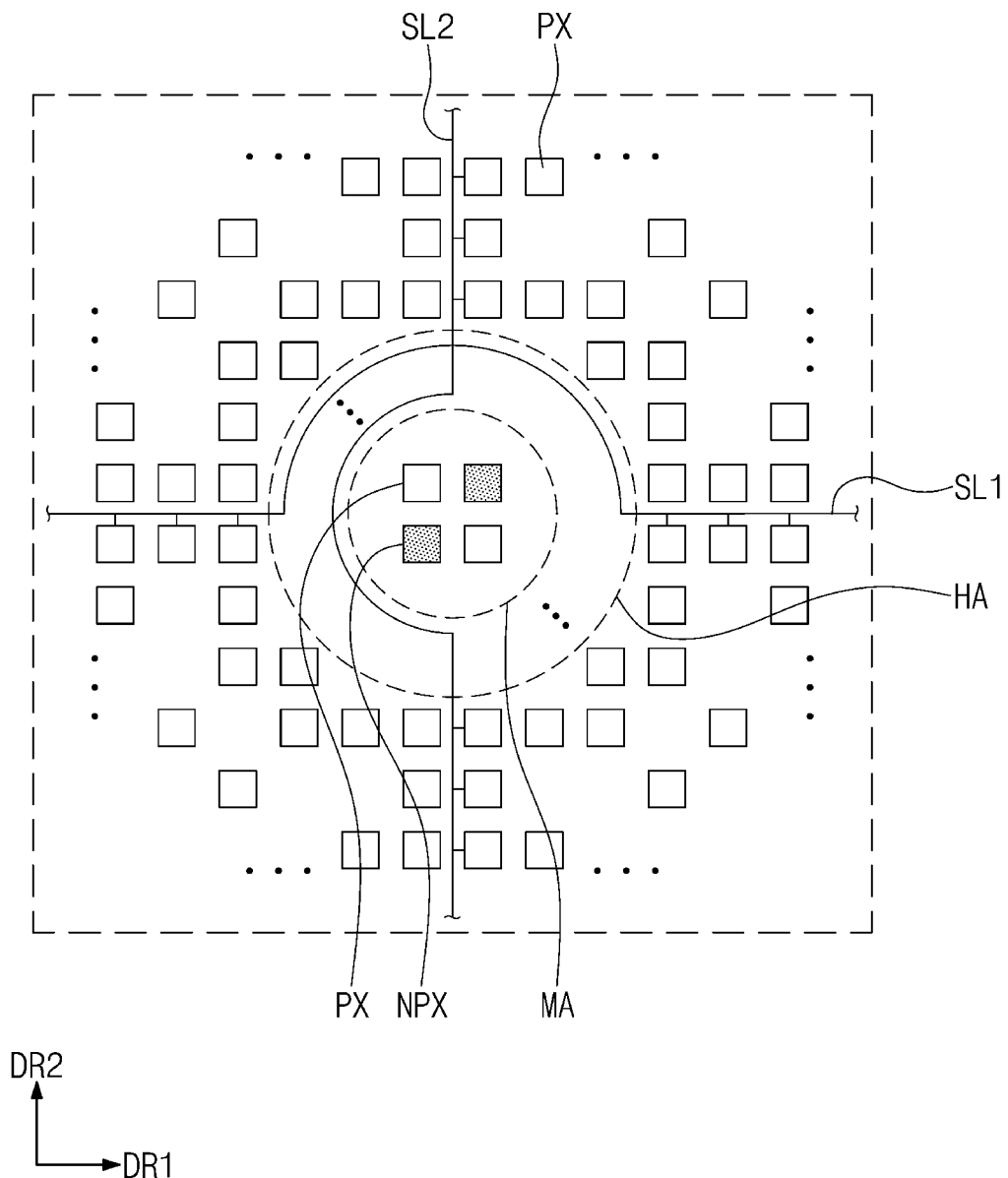
FIG. 15B is a plan view schematically illustrating the electronic panel of FIG. 15A.
Figure 16A:
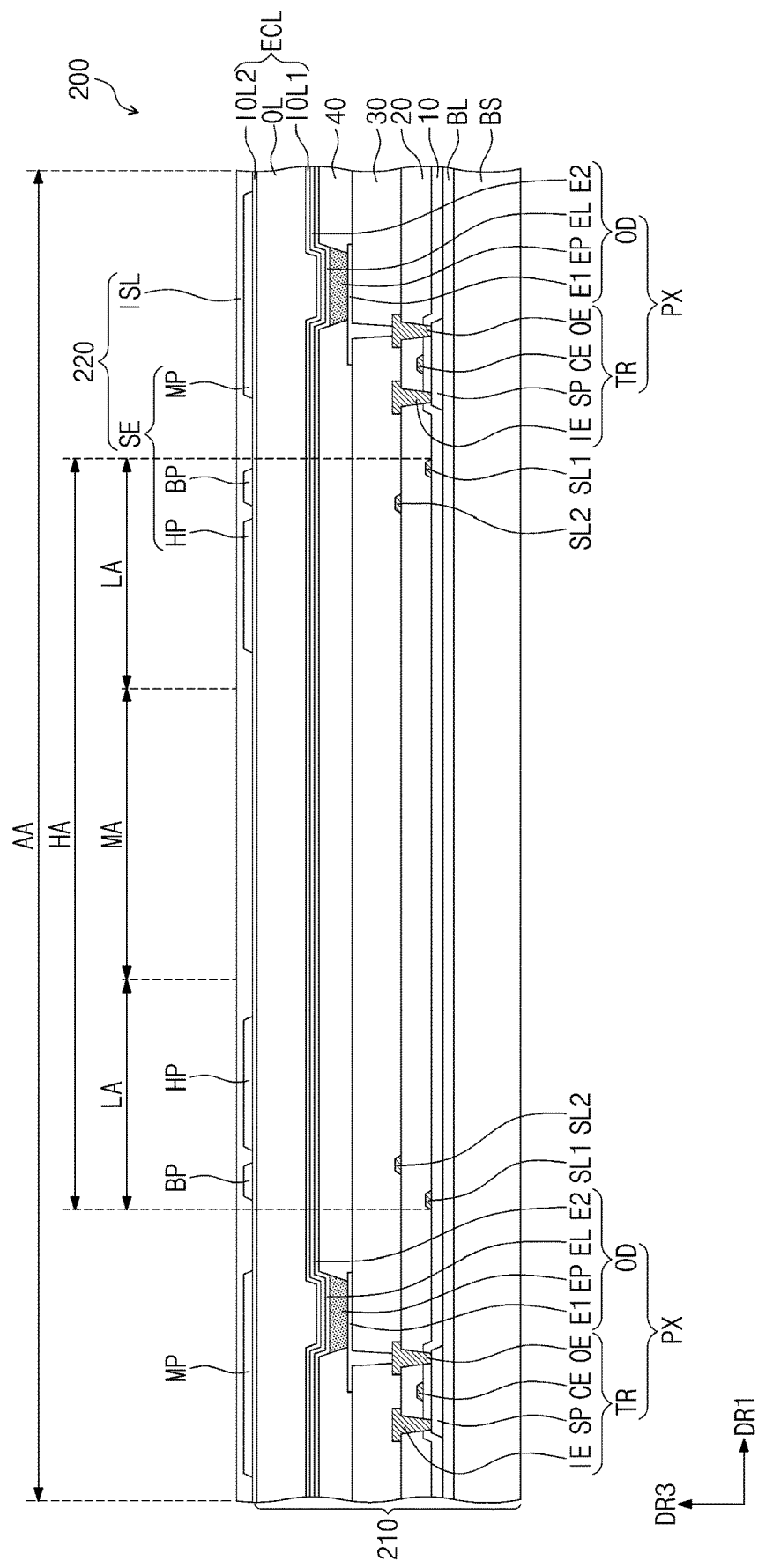
FIGS. 16A and 16B are cross-sectional views illustrating electronic panels according to some embodiments of the present disclosure.
Figure 16B:
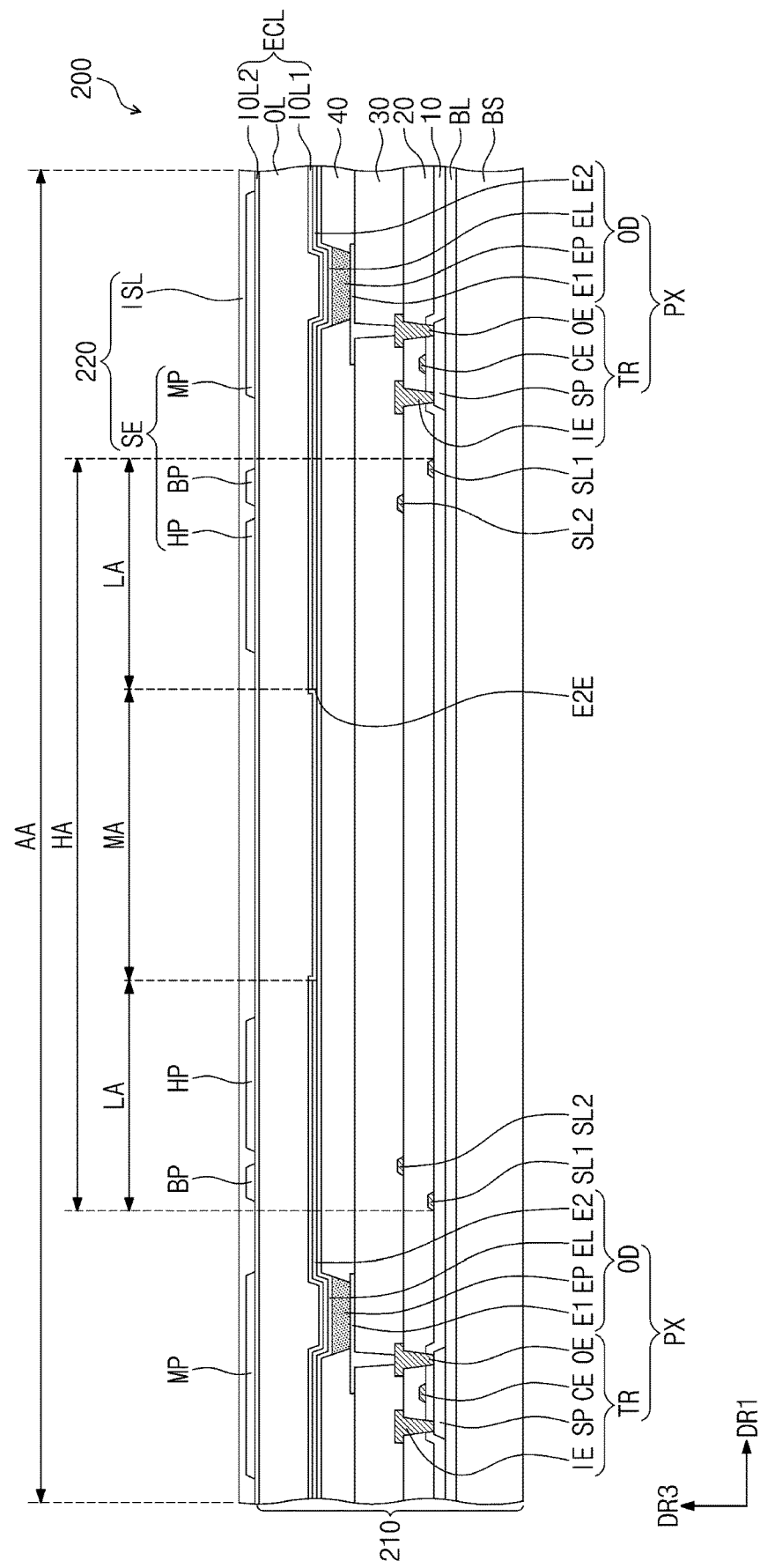

FIG. 15A is an exploded perspective view illustrating an electronic apparatus according to an embodiment of the present disclosure, and FIG. 15B is a plan view schematically illustrating electronic panel of FIG. 15A. FIGS. 16A and 16B are cross-sectional views illustrating electronic panels according to some embodiments of the present disclosure. FIG. 15B illustrates area corresponding to FIG. 3B and FIGS. 16A and 16B illustrate areas corresponding to FIG. 4B. Hereinafter, embodiments of the present disclosure will be described with reference to FIGS. 15A-16B. In addition, the same components as described with reference to FIGS. 1A-14B will be indicated by the same reference numerals or designators, and the descriptions thereto will be omitted for the purpose of ease and convenience in description.

In an electronic apparatus EA according to an embodiment of the present disclosure, an electronic panel 200 may include a module area MA overlapping with the electronic module 300. In the present embodiment, the module area MA may be defined in the active area AA. The module area MA may overlap with the opening area HA of the window 100 described above.

The line area LA described above may be defined along an edge of the module area MA. The line area LA may surround the edge of the module area MA when viewed in a plan view. The opening area HA may correspond to an area including the module area MA and the line area LA.

In the present embodiment, the module area MA may have a shape corresponding to the shape of the opening MH described above. For example, the module area MA may have a circular shape, an elliptical shape, a polygonal shape, or a polygonal shape of which at least one side is curved, when viewed in a plan view.

A transmittance of the module area MA may be higher than a transmittance of an area of the active area AA in which the pixels PX are disposed. The electronic module 300 may sense an external object through the module area MA and/or may (e.g., easily) provide an outputted optical signal to the outside through the module area MA.

At least one non-light emitting pixel NPX may be disposed in the module area MA according to the present embodiment. In FIG. 151B, two non-light emitting pixels NPX and two pixels PX are illustrated for the purpose of ease and convenience in description and illustration. A light transmittance of the non-light emitting pixel NPX may be higher than that of the pixel PX. The non-light emitting pixel NPX may be formed by removing at least a portion of the components of the pixel PX.

For example, the non-light emitting pixel NPX may be formed by removing the thin film transistor TR and the emission pattern EP of the pixel PX. In other embodiments, the non-light emitting pixel NPX may be formed by removing only the emission pattern EP (of the components) of the pixel PX, by removing one or more components of the thin film transistor TR, or by removing only the first electrode E1 (of the components) of the pixel PX. In still other embodiments, the non-light emitting pixel NPX may be formed by removing all of the components of the pixel PX. In this case, the non-light emitting pixel NPX may be defined as a portion in which (e.g., only) insulating layers are stacked.

The non-light emitting pixel NPX may be variously suitably modified under the condition that the transmittance of the non-light emitting pixel NPX is higher than that of the pixel PX. In addition, the module area MA may have a plurality of the pixels PX and one non-light emitting pixel NPX or may have only a plurality of the non-light emitting pixels NPX, as long as the transmittance of the module area MA is higher than that of a surrounding area.

For example, as illustrated in FIG. 16A, the module area MA may be formed by removing the thin film transistor TR, the first electrode E1 and the emission pattern EP of the pixel PX. The insulating layers may continuously extend in the module area MA. In the opening area HA, the base substrate BS, the auxiliary layer BL, the first to fourth insulating layers 10, 20, 30 and 40, the control layer EL, the encapsulation layer ECL and the sensing insulating layer ISL may not be cut and may overlap with the module area MA. The base substrate BS, the auxiliary layer BL, the first to fourth insulating layers 10, 20, 30 and 40, the control layer EL, the encapsulation layer ECL and the sensing insulating layer ISL may be fully formed in the active area AA via (e.g., including) the module area MA.

In the present embodiment, the second electrode E2 may also overlap with the module area MA. When the second electrode E2 is formed as a transparent or semi-transparent electrode, the module area MA having a higher transmittance than that of the area in which the pixel PX is disposed may be formed even though the second electrode E2 overlaps with the module area MA.

As described above, the sensing unit 220 may include the opening pattern HP disposed in the opening area HA and the main pattern MP spaced apart from the module area MA. The connection pattern BP may be disposed on the same layer as the opening pattern HP and may connect the opening pattern HP and the main pattern MP. In the present embodiment, the opening pattern HP may have a shape extending along the edge of the module area MA. Because the opening pattern HP according to the present embodiment extends along the edge of the module area MA, the transmittance of the module area MA may be improved.

Also, as illustrated in FIG. 16B, the module area MA may be formed by further removing the second electrode E2 (of the components) of the pixel PX. An end portion E2E which defines an opening overlapping with the module area MA may be formed at the second electrode E2.

Thus, even though the second electrode E2 is formed as a non-transparent electrode, the module area MA having an improved transmittance may be provided. In addition, even though the second electrode E2 is formed as a semi-transparent electrode, the module area MA having a relatively high transmittance may be provided.

According to the embodiments of the present disclosure, an electronic module not requiring a high transmittance (e.g., an electronic module utilizing infrared light) may (e.g., easily) transmit/receive a signal to/from the outside through the module area MA formed by removing the opaque components. Even though the electronic module 300 overlaps with the electronic panel 200, signal input/output with the outside may be stably performed. In addition, the electronic module 300 may be covered by the electronic panel 200, and thus the electronic module 300 may be stably protected from an external impact and/or an external contaminant.

According to the embodiments of the present disclosure, it is possible to reduce or prevent a reduction in sensitivity of the sensing unit to an external input by the opening in the active area in which the opening is defined. In addition, the whole active area including the opening may have substantially uniform sensitivity.

While the present disclosure have been described with reference to example embodiments, it will be apparent to those skilled in the art that various changes and modifications may be made without departing from the spirits and scopes of the present disclosure. Therefore, it should be understood that the above embodiments are not limiting, but illustrative. Thus, the scopes of the present disclosure are to be determined by the broadest permissible interpretation of the following claims and their equivalents, and shall not be restricted or limited by the foregoing description.

What is claimed is:

1. An electronic apparatus comprising:
   a sensing unit comprising sensing groups that are spaced apart from each other, arranged in a first direction and a second direction crossing the first direction, and extending in the second direction, and sensing lines connected to the sensing groups;
   a display unit comprising a first area and a second area adjacent to the first area and having a light transmittance higher than that of the first area;
   wherein each of the sensing groups comprises:
   a first sensing electrode extending in the second direction; and
   second sensing electrodes spaced from each other in the second direction, wherein each of the second sensing electrodes is spaced from the first sensing electrode,
   wherein at least one selected from the first sensing electrode and the second sensing electrodes comprises:
   a main pattern overlapping the first area and spaced from the second area;
   a hole pattern spaced from the main pattern and located in the second area; and
   a connection pattern that connects the main pattern and the hole pattern via the second area and is at a same layer as the hole pattern.

2. The electronic apparatus of claim 1, wherein the connection pattern overlaps boundaries of the first area and the second area.

3. The electronic apparatus of claim 2, wherein the hole pattern and the connection pattern comprise a same material.

4. The electronic apparatus of claim 1, wherein the main pattern and the hole pattern are electrically connected to each other and transmit a same electrical signal.

5. The electronic apparatus of claim 1, wherein the hole pattern has an area different from an area of the main pattern.

6. The electronic apparatus of claim 1, further comprising a hole penetrating the display unit and the sensing unit overlapping the second area.

7. The electronic apparatus of claim 6, wherein a planar area of the second area is greater than a planar area of the hole.

8. The electronic apparatus of claim 6, wherein the hole penetrates more than two second sensing electrodes which adjacent along the second direction.

9. The electronic apparatus of claim 1, further comprising a recess pattern defined by at least a portion of an upper surface of the display unit being recessed in a direction toward a lower surface of the display unit in the second area.

10. The electronic apparatus of claim 9, wherein the recess pattern overlaps the main pattern.

11. The electronic apparatus of claim 1, wherein the connection pattern and the hole pattern comprise a same material.

12. The electronic apparatus of claim 1, wherein the hole pattern and the main pattern are at a same layer.

13. The electronic apparatus of claim 1, wherein the sensing unit further comprising a sensing insulating layer, and the sensing insulating layer covers the hole pattern, the connection pattern, and the main pattern.

14. The electronic apparatus of claim 13, wherein the sensing insulation layer is entirely located in the second area.

15. An electronic apparatus comprising:

a sensing unit comprising sensing groups spaced from each other, arranged in a first direction and a second direction crossing the first direction and extending in the second direction, and sensing lines connected to the sensing groups;

a display unit comprising a first area and a second area adjacent to the first area and having a light transmittance higher than that of the first area;

wherein each of the sensing groups comprises:

a first sensing electrode extending in the second direction; and second sensing electrodes spaced from each other in the second direction, wherein each of the second sensing electrodes is spaced from the first sensing electrode, wherein at least one selected from the first sensing electrode and the second sensing electrodes comprises:

a main pattern overlapping the first area and spaced from the second area;

a hole pattern spaced from the main pattern and located in the second area; and wherein the hole pattern is curved along a boundary between the first area and the second area.

16. The electronic apparatus of claim 15, further comprising a hole penetrating the display unit and the sensing unit overlapping the second area.

17. The electronic apparatus of claim 16, wherein the hole pattern has a closed line shape surrounding the hole.

18. The electronic apparatus of claim 16, wherein an edge of the hole is surrounded by an edge of the second area.

19. The electronic apparatus of claim 15, wherein the hole pattern has an arc shape.

20. The electronic apparatus of claim 15, wherein the hole pattern comprises a plurality of hole patterns, and wherein each of the plurality of hole patterns is connected to the main pattern through a corresponding one of a plurality of connection patterns.

* * * * *

UNITED STATES PATENT AND TRADEMARK OFFICE
CERTIFICATE OF CORRECTION

PATENT NO. : 12,299,246 B2
APPLICATION NO. : 18/535708
DATED : May 13, 2025
INVENTOR(S) : Joo-Hyeon Jeong et al.

Page 1 of 1

It is certified that error appears in the above-identified patent and that said Letters Patent is hereby corrected as shown below:

In the Claims

In Column 38, Line 41, in Claim 1, before "from" delete "apart".

Signed and Sealed this
Twenty-ninth Day of July, 2025

Coke Morgan Stewart
*Acting Director of the United States Patent and Trademark Office*